United States Patent
Kurozumi et al.

(10) Patent No.: US 7,873,521 B2
(45) Date of Patent: Jan. 18, 2011

(54) SOUND SIGNAL DETECTION SYSTEM, SOUND SIGNAL DETECTION SERVER, IMAGE SIGNAL SEARCH APPARATUS, IMAGE SIGNAL SEARCH METHOD, IMAGE SIGNAL SEARCH PROGRAM AND MEDIUM, SIGNAL SEARCH APPARATUS, SIGNAL SEARCH METHOD AND SIGNAL SEARCH PROGRAM AND MEDIUM

(75) Inventors: Takayuki Kurozumi, Zama (JP); Hidehisa Nagano, Sagamihara (JP); Kunio Kashino, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1010 days.

(21) Appl. No.: 10/579,128

(22) PCT Filed: Jul. 8, 2005

(86) PCT No.: PCT/JP2005/012667

§ 371 (c)(1),
(2), (4) Date: Feb. 13, 2007

(87) PCT Pub. No.: WO2006/006528

PCT Pub. Date: Jan. 19, 2006

(65) Prior Publication Data

US 2007/0143108 A1 Jun. 21, 2007

(30) Foreign Application Priority Data

| Jul. 9, 2004 | (JP) | P 2004-203198 |
| Jul. 9, 2004 | (JP) | P 2004-203199 |
| Mar. 17, 2005 | (JP) | P 2005-077726 |
| Mar. 22, 2005 | (JP) | P 2005-082107 |
| Mar. 24, 2005 | (JP) | P 2005-086280 |

(51) Int. Cl.
*G10L 11/00* (2006.01)
*G10L 15/00* (2006.01)
*G06F 17/30* (2006.01)

(52) U.S. Cl. .............. 704/270; 704/231; 707/705
(58) Field of Classification Search .............. None
See application file for complete search history.

(56) References Cited

U.S. PATENT DOCUMENTS 5,097,520 A 3/1992 Bessho et al. ............. 382/51

(Continued)

FOREIGN PATENT DOCUMENTS

EP 0 871 157 A2 10/1998

(Continued)

OTHER PUBLICATIONS

Kunio Kashiwano et al., "Histogram Tokucho o Mochiita Oto ya Eizo no Kosoku and/or Tansaku", The Transactions of the Institute of Electronics, Information and Communication Engineers D-II, vol. J83-D-II, No. 12, Dec. 2000, pp. 2735 to 2744.

(Continued)

*Primary Examiner*—Brian L Albertalli
(74) *Attorney, Agent, or Firm*—Harness, Dickey & Pierce, P.L.C.

(57) ABSTRACT

A sound signal detection system of the present invention that searches for a portion of stored sound signals similar to a target sound signal, includes a stored feature calculation portion that calculates a stored feature from time-series data of the stored sound signals; a target feature calculation portion that calculates a target feature from time-series data of the target sound signal; a stored feature area selection portion that selects elements corresponding to statistics larger than a threshold from stored features and calculates stored area selection features generated from the selected elements; a target feature area selection portion that selects elements corresponding to statistics larger than a threshold from a target feature and calculates a target area selection feature generated from the selected element; and a feature comparison portion that sets a comparison segment in the stored area selection features and calculates a degree of similarity between comparison segments of both the target and stored area selection features.

21 Claims, 17 Drawing Sheets

U.S. PATENT DOCUMENTS

| | | | | |
|---|---|---|---|---|
| 5,210,820 | A | 5/1993 | Kenyon | 395/2 |
| 6,772,117 | B1 | 8/2004 | Laurila et al. | |
| 6,941,275 | B1* | 9/2005 | Swierczek | 705/26 |
| 6,990,453 | B2* | 1/2006 | Wang et al. | 704/270 |
| 7,328,153 | B2* | 2/2008 | Wells et al. | 704/231 |
| 7,487,180 | B2* | 2/2009 | Holm et al. | 1/1 |
| 2001/0049664 | A1 | 12/2001 | Kashino et al. | 705/52 |
| 2003/0023421 | A1 | 1/2003 | Finn et al. | |
| 2003/0205124 | A1* | 11/2003 | Foote et al. | 84/608 |

FOREIGN PATENT DOCUMENTS

| | | |
|---|---|---|
| EP | 1 397 756 A2 | 3/2004 |
| JP | 5-19782 A | 1/1993 |
| JP | 10-288996 A | 10/1998 |
| JP | 10-289320 A | 10/1998 |
| JP | 2000-312343 | 11/2000 |
| JP | 2002-044610 | 2/2002 |
| JP | 2003-022084 A | 1/2003 |
| JP | 2003-030657 A | 1/2003 |
| JP | 2003-248494 A | 9/2003 |
| JP | 2003-529091 A | 9/2003 |
| JP | 2004-102023 | 4/2004 |
| JP | 2004-193983 A | 7/2004 |
| WO | WO-01/11496 A2 | 2/2001 |
| WO | WO-02/11123 | 2/2002 |

PUBLICATIONS

Naoko Kosugi et al., "Humming o Mochiita Ongaku Kensaku System", The Institute of Electronics, Information and Communication Engineers Gijutsu Kenkyu Hokoku DE99-18, Jul. 1999, pp. 49 to 54.

Kurozumi, T, et al.: "A Robust Audio Searching Method for Cellular-Phone-Based Music Information Retrieval" Pattern Recognition, 2002, Proceedings. 16th International Conference on Quebec City, Que., Canada Aug. 11-15, 2002, Los Alamitos, CA, USA, IEEE Comput. Soc., US, vol. 3, Aug. 11, 2002, pp. 991-994.

Kashinko, K., et al.: "Feature Fluctuation Absorption for a Quick Audio Retrieval from Long Recordings" Pattern Recognition, 2000, Proceedings. 15th International Conference on Sep. 3-7, 2000; [Proceedings of the International Conference on Pattern Recognition. (ICPR)], Los Alamitos, CA, USA, IEEE Comput. Soc., US, col. 3, Sep. 3, 2000, pp. 98-101.

"A Quick Search Algorithm for Acoustic Signals Using Histogram Features—Time-Search Active Search", Kashino, et al., The Transactions of the Institute of Electronics, Information and Communication Engineers D-11, vol. J82-D-II No. 9, pp. 1365-1373, Sep. 1999.

"Self-Optimized Spectral Correlation Method for Background Music Identification", Abe, et al., The Institute of Electronics, Information and Computer Engineers, Technical Report of IEICE, No. PRMU2001-209, pp. 25-30, Jan. 18, 2002.

"Self-Optimized Spectral Correlation Method for Background Music Identification", Abe, et al., Proc IEEE ICME '02, Lausanne, vol. 1, 333/336 (2002.

"A Search Algorithm for Background Music Signals Based on the Search for Numerous Small Area Signals", Nagano, et al., The Institute of Electronics, Information and Computer Engineers, Technical Report of IEICE, No. PRMU2002-86, WIT2002-29, pp. 37-41, Sep. 20, 2002.

* cited by examiner

| $(x_{i,1}, x_{i,2}, x_{i,3})$ | $(x_{i,4}, x_{i,5}, x_{i,6})$ | $(x_{i,7}, x_{i,8}, x_{i,9})$ |
|---|---|---|
| $(x_{i,10}, x_{i,11}, x_{i,12})$ | $(x_{i,13}, x_{i,14}, x_{i,15})$ | $(x_{i,16}, x_{i,17}, x_{i,18})$ |
| $(x_{i,19}, x_{i,20}, x_{i,21})$ | $(x_{i,22}, x_{i,23}, x_{i,24})$ | $(x_{i,25}, x_{i,26}, x_{i,27})$ |

FRAME (-M), FRAME (-M+1), FRAME (-M+2), FRAME (-M+3), ...... FRAME (M-1)

2M

FRAME (−M), FRAME (−M+1), FRAME (−M+2) ... FRAME (i+j) ... FRAME (M−1)

2M

| $(x_{i,1}, x_{i,2}, x_{i,3})$ | $(x_{i,4}, x_{i,5}, x_{i,6})$ | $(x_{i,7}, x_{i,8}, x_{i,9})$ |
|---|---|---|
| ... | ... | ... |
| ... | ... | $(x_{i,(3n-2)}, x_{i,(3n-1)}, x_{i,3n})$ |

| $(x_{i,1}, x_{i,2}, x_{i,3})$ | $(x_{i,4}, x_{i,5}, x_{i,6})$ | $(x_{i,7}, x_{i,8}, x_{i,9})$ |
|---|---|---|
| ... | ... | ... |
| ... | ... | $(x_{i,(3n-2)}, x_{i,(3n-1)} 26, x_{i,3n})$ |

SOUND SIGNAL DETECTION SYSTEM, SOUND SIGNAL DETECTION SERVER, IMAGE SIGNAL SEARCH APPARATUS, IMAGE SIGNAL SEARCH METHOD, IMAGE SIGNAL SEARCH PROGRAM AND MEDIUM, SIGNAL SEARCH APPARATUS, SIGNAL SEARCH METHOD AND SIGNAL SEARCH PROGRAM AND MEDIUM

TECHNICAL FIELD

The present invention relates to a signal detection system for detecting a position of a signal from stored sound signals similar to a target sound signal which is shorter than or the same as the stored sound signals. For example, the present invention is related to a sound signal detection system and a sound signal detection server applied to detecting sound signals in the real world.

In other words, in accordance with the present invention, after receiving sounds such as music played in the real world, CM (Commercial Message: advertisement on TV, radio and the like) and the like on a mobile terminal, by using the received sound signal, it is possible for the same music to be searched for from a very large CM music data base.

The present invention relates to an image signal search apparatus, an image signal search method and an image signal search program and medium which search a similar image signal to an image signal (target image signal) obtained in the real world and including characteristic distortion from image signals (stored image signals) stored in a data base.

The present invention relates to an signal search apparatus, a signal search method and a signal search program and medium which search for a similar signal to a signal (target signal) obtained in the real world and including characteristic distortion from signals (stored signals) stored in a data base.

Priority is claimed on Japanese Patent Application No. 2004-203198, filed Jul. 9, 2004, the content of which is incorporated herein by reference.

Priority is claimed on Japanese Patent Application No. 2004-203199, filed Jul. 9, 2004, the content of which is incorporated herein by reference.

Priority is claimed on Japanese Patent Application No. 2005-77726, filed Mar. 17, 2005, the content of which is incorporated herein by reference.

Priority is claimed on Japanese Patent Application No. 2005-82107, filed Mar. 22, 2005, the content of which is incorporated herein by reference.

Priority is claimed on Japanese Patent Application No. 2005-86280, filed Mar. 24, 2005, the content of which is incorporated herein by reference.

BACKGROUND ART

In recent years, it has become popular to exchange multimedia data such as sound, images and the like, and a search operation is required in order to obtain such multimedia data.

For example, it can be imagined that after receiving sounds such as music played in the real world, images or CM with a mobile terminal and the like, by using a received signal (a target sound signal or a target image signal), the same music, image or CM can be searched for from a very large CM music data base.

Therefore, a search operation is required of a stored sound signal or a stored image signal which is stored in the data base and which is similar to a sound or image signal as a target sound signal or a target image signal that is directly specified.

As a high speed search method for a time-series signal, for example, Japanese patent No. 3065314 is disclosed. It should be noted that the search operated here is a time-series search that needs to be operated at high speed and accurately.

However, it is believed that the sounds or the images recorded and obtained by a user in the real world include a variety of characteristic distortions, for example, a multiplicative distortion because of characteristics of the apparatus which is a signal source such as a speaker or a screen or because of a characteristic of the mobile terminal, and an additive noise because of elements in the real world (if a sound, it may be noise, echo or absorption, and if an image, it may be clearness of air, haze because of brightness and angle, reflection and so on). In respect to this point, a method in accordance with Japanese patent No. 3065314 makes an assumption such that the signal of a search target has less characteristic distortion, and therefore, if noises or distortions are included, search accuracy is reduced greatly.

In order to solve this problem, a method, by providing a fluctuation appending step in which a fluctuation is appended to an input signal, is proposed which detects signals accurately in respect to the characteristic distortion (for example, see Japanese Patent No. 3408800). However, there is another problem in that upon providing the fluctuation appending step as described above, if multiple noises or distortions are to be considered, multiple target features need to be prepared for these, therefore, the amount of information increases.

A method is proposed in which after detecting the peak level of the input target signal of the sounds or the images, by applying a frequency at the peak level, a signal detection is performed accurately in respect to the noises and the distortions.

However, this method has a problem in that it fails to detect the peak level of the actual signal and the accuracy of searching is decreased because it uses the peak level of the input signal and it is influenced by high noise level around the peak level of the actual signal.

Therefore, a method of signal detection is desired with high accuracy against distortions by normalizing the input target signals of sounds or images using the statistics of local feature. In other words, in this signal detection method, in order to reduce the fluctuations of the target signals of the sounds or the images because of the characteristic distortions, after extracting the frequency characteristics, a data conversion to a coordinate system with high accuracy against distortions is performed by normalizing the target signals at every local area on a time-frequency coordinate system, and based on this coordinate system a comparison between the sounds or the images and the stored data is made.

However, the data conversion method to the coordinate system with high accuracy against characteristic distortions described above cannot reduce the characteristic distortions enough upon noise, interruptions or accidental distortions by using only the normalization, therefore, it has a problem in that the reliability of searching is decreased.

The present invention was devised in light of the above problems, and has as an object of developing the search accuracy by converting the sound signals or image signals to be searched for (target signal: target sound signal and target image signal) to data with high accuracy against the additive noise or interruptions, and of reducing searching time greatly.

The present invention has as an object of developing the search accuracy by converting the signals including the multiplicative distortions to data with high accuracy, and of providing a system which can execute a process with high speed and high accuracy.

The present invention has as an object of providing a signal search apparatus, a signal search method and a signal search program and medium which can develop overall search accuracy by applying a method of quantization that increases reliability of values after quantization rather than before linear quantization.

DISCLOSURE OF INVENTION

In order to achieve the objects above the sound signal detection system of the present invention that searches for a part of a stored sound signal similar to a target sound signal having a shorter or same length as the stored sound signal, including: a stored feature calculation portion that calculates a stored feature from time-series data of the stored sound signal; a target feature calculation portion that calculates a target feature from time-series data of the target sound signal; a stored feature area selection portion that calculates predetermined statistics from the stored feature, selects an element from the stored features corresponding to the statistics larger than a predetermined threshold, and calculates a stored area selection feature generated from a vector of the selected element; a target feature area selection portion that calculates predetermined statistics from the target feature, selects an element from the target features corresponding to the statistics larger than a predetermined threshold, and calculates a target area selection feature generated from a vector of the selected element; and a feature comparison portion that sets a comparison segment in the stored area selection feature, calculates a degree of similarity between the target area selection feature and the comparison segment of the stored area selection feature, repeats calculating while shifting the comparison segment one by one in the stored area selection feature, and searches for an area of the stored area selection feature similar to the target area selection feature.

Especially, compared to "HIGH SPEED SIGNAL DETECTION METHOD, APPARATUS AND MEDIUM FOR THE SAME" (Japanese Patent No. 3065314) and "SIGNAL DETECTION METHOD, APPARATUS AND PROGRAM OF THE SAME" (Japanese Patent No. 3408800), a stored feature area selection portion and a target feature area selection portion are newly provided, elements with strong features are selected from feature vectors, and only such selected elements are compared, therefore, compared to Japanese Patent No. 3065314 and Japanese Patent No. 3408800, detection of sound signals with high accuracy is possible.

In respect to a method of normalizing the target signals and stored signals and simply compared to "SIGNAL DETECTION METHOD, APPARATUS, PROGRAM AND MEDIUM OF THE SAME" (Japanese Patent First Publication No. 2003-022084), the stored feature area selection portion and the target feature area selection portion are newly provided, elements with strong features are selected, and only such selected elements are compared, therefore, compared to the method, it is possible to detect sound signals with high accuracy against noise and interruptions.

Compared to "SYSTEM AND METHODS FOR RECOGNIZING SOUND AND MUSIC SIGNAL IN HIGH NOISE AND DISTORTION" (PCT Publication No. WO 02/11123 A2), a stored feature area selection portion and a target feature area selection portion are newly provided, elements with strong features are selected from feature vectors, and only such selected elements are compared, therefore, compared to the method, it is possible to detect sound signals with high accuracy against noise and interruptions.

In accordance with the present invention, in order to reduce the influence from the noises and the interruptions, only the elements with statistically strong features are selected from the stored signals and the target sound signals and compared. By using multidimensional vectors generated from the selected elements, it is possible to calculate the degree of similarity among them after comparing more characteristic patterns of the stored signals and the target sound signals, and it does not include processing of comparing meaningless parts, therefore, it is possible to reduce the influence greatly from the noise and the interruptions overlapping the target sound signals and to detect the sound signals with high accuracy.

From stored features and target features obtained from the stored sound signals and the target sound signals, stored area selection features and target area selection features generated from more characteristic elements upon statistical evaluation are extracted, therefore, it is possible to reduce the amount of data to be compared greatly. Therefore, it is possible to make the calculation operation of the degree of similarity faster, it is possible to reduce the amount of data of the stored signals per one file to be stored, it is possible to store more stored sound signal data in the same amount of a storage portion than in the prior art, and in accordance with this point, it is possible to develop accuracy of searching of the similar stored sound signals.

In order to achieve the above objects, a sound signal detection system of the present invention that searches for a part of a stored sound signal similar to a target sound signal having shorter or same length as the stored sound signal, including: a stored feature calculation portion that calculates a stored feature from time-series data of the stored sound signal: a target feature calculation portion that calculates a target feature from time-series data of the target sound signal; a stored feature normalization portion that calculates predetermined statistics from the stored feature, normalizes the statistics per the elements of the vector of the stored feature and calculates a stored area selection feature generated from a vector including elements of the normalized values; a target feature normalization portion that calculates predetermined statistics from the target feature, normalizes the statistics per the elements of the vector of the target feature and calculates a target area selection feature generated from a vector including elements of the normalized values; a stored feature quantization portion that calculates a stored quantized feature generated from elements calculated by quantizing the stored normalized feature; a target feature quantization portion that calculates a target quantized feature generated from elements calculated by quantizing the target normalized feature; and a feature comparison portion that sets a comparison segment in the stored quantized feature, calculates a degree of similarity between the target quantized feature and the comparison segment of the stored quantized feature, repeats calculating while shifting the comparison segment one by one in the stored quantized feature, and searches for an area of the stored quantized feature similar to the target quantized feature.

Especially, compared to "HIGH SPEED SIGNAL DETECTION METHOD, APPARATUS AND MEDIUM FOR THE SAME" (Japanese Patent No. 3065314) and "SIGNAL DETECTION NETHOD, APPARATUS AND PROGRAM OF THE SAME" (Japanese Patent No. 3408800), a target feature normalization portion, a stored feature normalization portion, a target feature quantization portion and a stored feature quantization portion are newly provided and each element of the feature vector is quantized based on a specific threshold after normalizing, therefore, compared to Japanese Patent No. 3065314 and Japanese Patent No. 3408800, detection of sound signals with high accuracy against distortions is possible.

In addition to a method of normalizing the target signals and stored signals and simply compared to "SIGNAL DETECTION NETHOD, APPARATUS, PROGRAM AND MEDIUM OF THE SAME" (Japanese Patent First Publication No. 2003-022084), the target feature quantization portion and the stored feature quantization portion are newly provided, and each element of the feature vector is quantized, therefore, it is possible to detect sound signals with high accuracy against characteristic distortions.

Compared to "SYSTEM AND METHODS FOR RECOGNIZING SOUND AND MUSIC SIGNAL IN HIGH NOISE AND DISTORTION" (PCT Publication No. WO 02/11123 A2), a target feature normalization step and a stored feature normalization step are newly provided and features are normalized, therefore, compared to the method above, it is possible to detect sound signals with high accuracy against characteristic distortions.

In accordance with the present invention, characteristic distortions are reduced and a quantization portion (step) in which a scalar quantization is operated on sound signals is provided, therefore, it is possible to reduce the amount of data to be compared greatly. Therefore, it is possible to make the calculation operation of the degree of similarity faster, it is possible to reduce the amount of data of the stored signals per one file to be stored, it is possible to store more stored sound signal data in the same amount of a storage portion as in the prior art, and in accordance with this point, it is possible to develop accuracy of searching of the similar stored sound signals.

In accordance with the present invention, feature vectors in the comparison segment are searched for as an overall pattern by providing the above-described quantization portion (step) away from detailed comparison and detection of data of each element, therefore, it is possible to develop the accuracy of searching and to prevent detection omission. Therefore, compared to the prior arts, it is possible to operate the signal detection process with high accuracy against various characteristic distortions, and it is possible to operate the sound signal detection with high accuracy against more general characteristic distortions.

In order to solve the problems above, the present invention is an image signal search apparatus that searches for a stored image signal similar to a target image signal including: a target feature calculation unit that calculates a target feature from the target image signal; a target statistics calculation unit that calculates target statistics from the target feature; a target feature area selection unit that operates a threshold operation on the target statistics using a predetermined threshold, selects the target statistics and calculates a target area selection feature generated from a vector or a matrix including elements that are the selected target statistics; a stored statistics calculation unit that calculates stored statistics from a stored feature; a stored feature area selection unit that operates a threshold operation on the stored statistics using a predetermined threshold, selects the stored statistics and calculates a stored area selection feature generated from a vector or a matrix including elements that are the selected statistics; a feature comparison unit that sets a comparison segment in the stored area selection feature, calculates a degree of similarity between the stored area selection features in the comparison segment and at least a portion of the target area selection feature, and repeats calculating the degree of similarity while shifting the comparison segment one by one.

The present invention is the above-described image signal search apparatus, wherein: the target feature area selection unit and the stored feature area selection unit calculate average values of the stored feature and the target feature in a first predetermined time division, and select the element if an absolute value of a value by subtracting the average value from the element is larger than a predetermined threshold.

The present invention is the above-described image signal search apparatus, wherein: the target feature calculation unit and the stored feature calculation unit calculate average values and the standard deviation of the stored feature and the target feature in a second predetermined time division, and calculate the target statistic and the stored statistic by normalizing the target statistic and the stored statistic using the average value and the standard deviation.

The present invention is an image signal search method that searches for a stored image signal similar to a target image signal, including the steps of: a target feature calculation step that calculates a target feature from the target image signal; a target statistics calculation step that calculates target statistics from the target feature; a target feature area selection step that operates a threshold operation on the target statistics using a predetermined threshold, selects the target statistics and calculates a target area selection feature generated from a vector or a matrix including elements that are the selected target statistics; a stored statistics calculation step that calculates a predetermined stored statistics from the stored features; and a stored feature area selection unit that operates a threshold operation on the stored statistics using a predetermined threshold, selects the stored statistics and calculates a stored area selection feature generated from a vector or a matrix including elements that are the selected stored statistics, wherein: the feature comparison step sets a comparison segment in the stored area selection feature, calculates a degree of similarity between the stored area selection features in the comparison segment and at least a portion of the target area selection feature, and repeats calculating the degree of similarity while shifting the comparison segment one by one.

The present invention is a computer program that operates a computer as one of the above-described image signal search apparatus.

The present invention is a computer readable medium that stores the above-described computer program.

In accordance with the present invention, the influence from interruptions or reflections is reduced, and therefore, only elements with statistically strong features are selected and compared from the stored image signals and the target image signals. By using multidimensional vectors generated from the selected elements, it is possible to compare more characteristic patterns of the stored image signals and the target image signals and to calculate the degree of similarity among them, and comparison process of meaningless parts is not operated. Therefore, it is possible to reduce the influence from the reflections and the interruptions of the images overlapping the target image signals greatly and to detect the image signals with high accuracy against noises.

From stored features and target features obtained from the stored image signals and the target image signals, stored area selection features and target area selection features generated from elements with stronger features upon statistical evaluation are extracted, therefore, it is possible to reduce the amount of data to be compared greatly. Therefore, it is possible to make the calculation operation of the degree of similarity faster, it is possible to reduce the amount of data of the stored image signals per one file to be stored, it is possible to store more stored image signal data in the same amount of a storage portion as in the prior art.

In other words, by providing the stored feature selection portion and the target feature selection portion, it is possible to exclude images with reflections of any objects on them or images interrupted because of capture failure, and to compare features between the target image signal and the stored image signal each other. Therefore, compared to a case of comparison without selecting an area, the degree of similarity increases relatively and it is possible to develop accuracy of searching.

In order to solve the problems above, the present invention is an image signal detection apparatus that searches for a stored image signal similar to a target image signal, including: a target feature calculation unit that calculates a target feature from the target image signal; a target statistics calculation unit that calculates target statistics from the target feature; a target feature normalization unit that calculates a target normalized feature using the target statistics and the target feature; a target quantization unit that quantizes elements of the target normalized feature using a predetermined threshold, calculates elements of the target quantized feature and generates a target vector; a stored statistics calculation unit that calculates stored statistics from a stored feature based on the stored signal; a stored feature normalization unit that calculates a stored normalized feature using the stored statistics and the stored feature: a stored quantization unit that quantizes elements of the stored normalized feature using a predetermined threshold, calculates elements of the stored quantized feature and generates a stored vector; and a feature comparison unit that sets a comparison segment in the stored vector, calculates a degree of similarity between the elements of the stored vector in the comparison segment and at least a portion of the elements of the target vector, and repeats calculating the degree of similarity while shifting the comparison segment one by one.

In order to solve the problems above, the present invention is an image signal search method that searches for a stored image signal similar to a target image signal, including the steps of: a target feature calculation step that calculates a target feature from the target image signal; a target statistics calculation step that calculates target statistics from the target feature; a target feature normalization step that calculates a target normalized feature using the target statistics and the target feature; a target quantization step that quantizes elements of the target normalized feature using a predetermined threshold, calculates elements of the target quantized feature and generates a target vector; a stored statistics calculation step that calculates stored statistics from the stored feature; a stored feature normalization step that calculates a stored normalized feature using the stored statistics and the stored feature; a stored quantization step that quantizes elements of the stored normalized feature using a predetermined threshold, calculates elements of the stored quantized feature and generates a stored vector; and the feature comparison step that sets a comparison segment in the stored vector, calculates a degree of similarity between the elements of the stored vector in the comparison segment and at least a portion of the elements of the target vector, and repeats calculating the degree of similarity while shifting the comparison segment one by one.

The present invention is an image signal search program that operates a computer as the above-described image signal search apparatus.

The present invention is a computer readable medium that stores the above-described image signal search program.

In accordance with the present invention, characteristic distortions are reduced and a quantization portion in which a scalar quantization is operated on image signals is provided, therefore, it is possible to reduce the amount of data to be compared greatly. Therefore, it is possible to make the calculation operation of the degree of similarity faster, it is possible to reduce the amount of data of the stored image signals per one file to be stored, it is possible to store more stored image signal data in the same amount of a storage portion as in the prior art, and in accordance with this point, it is possible to develop accuracy of searching of the similar stored image signals.

In accordance with the present invention, feature vectors in the comparison segment are searched for as an overall pattern by providing the above-described quantization portion away from detailed comparison and detection of data of each element, therefore, it is possible to develop the accuracy of searching and to prevent detection omissions. Therefore, compared to the prior arts, it is possible to operate the signal detection process with high accuracy against various characteristic distortions, and it is possible to operate the image signal detection with high accuracy against more general characteristic distortions.

In order to solve the problems above, the present invention is a signal search apparatus that searches for a stored signal similar to a target signal, including: a target feature calculation unit that calculates a target feature from the target signal; a target statistics calculation unit that calculates target statistics from the target feature; a target feature normalization unit that calculates a target normalized feature using the target statistics and the target feature; a target area selection nonlinear quantization unit that inputs the element of the target normalized feature, calculates an element of a selected target nonlinear quantized feature, and generates a target vector; a stored statistics calculation unit that calculates stored statistics from a stored feature; a stored feature normalization unit that calculates a stored normalized feature using the stored statistics and the stored feature; and a stored area selection nonlinear quantization unit that inputs the stored normalized feature, calculates an element of a selected stored nonlinear quantized feature and generates a stored vector, wherein the feature comparison unit sets a comparison segment in the stored vector, calculates a degree of similarity between the elements of the stored vector in the comparison segment and at least a portion of the elements of the target vector, and repeats calculating the degree of similarity while shifting the comparison segment one by one.

The present invention is the above-described signal search apparatus, wherein the target area selection nonlinear quantization unit and the stored area selection nonlinear quantization unit operate Voronoi tessellation upon a multi dimensional vector, and operates nonlinear quantization upon a distance from a Voronoi boundary surface to which the multidimensional vector belongs.

The present invention is the above-described signal search apparatus, wherein the target area selection nonlinear quantization unit includes: a target feature area selection unit that selects elements corresponding to statistics larger than a predetermined threshold and calculates a target area selection feature generated from a vector including the elements; and a target feature nonlinear quantization unit that operates nonlinear quantization upon a feature vector.

The present invention is the above-described signal search apparatus, wherein the stored area selection nonlinear quantization unit includes: a stored feature area selection unit that selects elements corresponding to statistics larger than a predetermined threshold and calculates a stored area selection feature generated from a vector including the elements; and a stored feature nonlinear quantization unit that operates nonlinear quantization upon a feature vector.

The present invention is a signal detection method that searches for a part of stored signal similar to a target signal, including the steps of: a target feature calculation step that calculates a target feature from the target signal; a target statistics calculation step that calculates target statistics from the target feature; a target feature normalization step that calculates a target normalized feature using the target statistics and the target feature; a target area selection nonlinear quantization step that inputs the element of the target normalized feature, calculates an element of a selected target nonlinear quantized feature, and generates a target vector; a stored statistics calculation step that calculates stored statistics from the stored feature; a stored feature normalization step that calculates a stored normalized feature using the stored statistics and the stored feature; a stored area selection nonlinear quantization step that inputs the stored normalized feature, calculates an element of a selected stored nonlinear quantized feature and generates a stored vector; and a feature comparison step that sets a comparison segment in the stored vector, calculates a degree of similarity between the elements of the stored vector in the comparison segment and at least a portion of the elements of the target vector and repeats calculating the degree of similarity while shifting the comparison segment one by one.

The present invention is a signal search program that operates a computer as the above-described signal search apparatus.

The present invention is a computer readable medium that stores the above-described signal search computer program.

In accordance with present invention, in order to reduce the influence from the noises and the distortions, only the elements with statistically strong features are selected from the stored signals and the target sound signals and compared. By using multidimensional vectors generated from the selected elements, it is possible to calculate the degree of similarity including more characteristic patterns of the stored signals and the target signals, and moreover, by applying nonlinear-quantization to the statistics calculated in accordance with statistical operation, reliability of the quantized value is developed and it, is possible to reduce the influence greatly from the noises and the distortions overlapping the target signals and to detect the signals with high accuracy.

Stored area selection features and target area selection features generated from elements with stronger features upon statistical evaluation are extracted and stored area selection features and target area selection features are nonlinear-quantized. Therefore it is possible to reduce the amount of data to be compared greatly, it is possible to make the calculation operation of the degree of similarity faster, and it is possible to reduce the amount of data of the stored signals per one file to be stored. In other words, it is possible to store more stored signal data in the same amount of a storage portion than in the prior art, and in accordance with this point, it is possible to develop accuracy of searching of the similar stored signals.

BEST MODE FOR CARRYING OUT THE INVENTION

Hereafter, referring to the figures, preferable embodiments of the present invention are explained. It should be noted that the scope of the present invention is not limited by the embodiments explained below. For example, any components in the following embodiments can be combined appropriately.

First Embodiment

Figure 1:
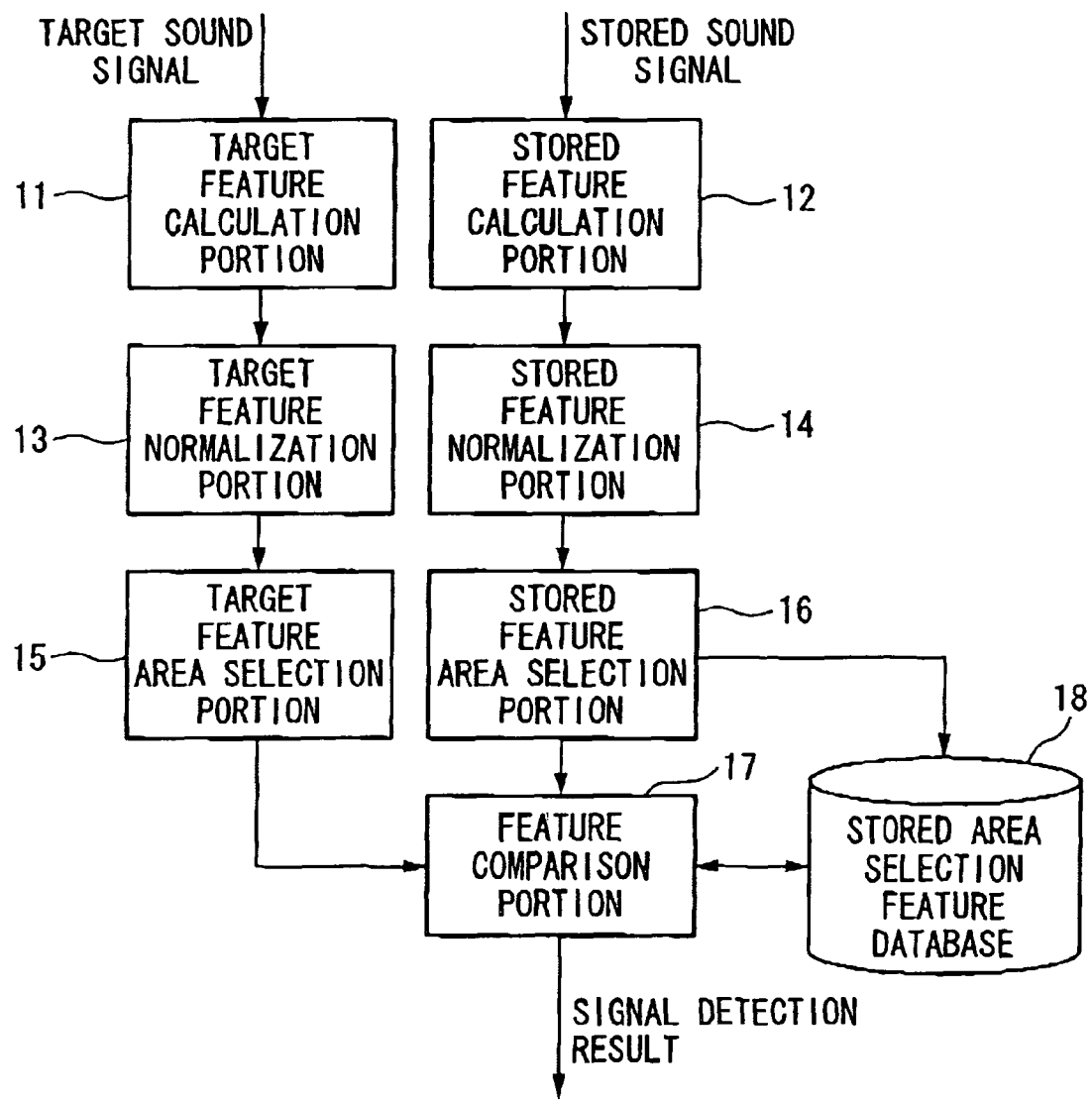
FIG. 1 is a block diagram of a structure example of a sound signal detection system in one embodiment of the present invention.

FIG. 1 shows the first embodiment of the present invention and is a block diagram showing a structure of a sound signal detection system for sound signals with high accuracy against characteristic distortions.

The sound signal detection system shown in FIG. 1 realizes signal detection with high accuracy against characteristic distortions of the sound signals, and is constructed from a target feature calculation portion 11, a stored feature calculation portion 12, a target feature normalization portion 13, a stored feature normalization portion 14, a target feature area selection portion 15, a stored feature area selection portion 16, a feature comparison portion 17, and a stored area selection feature data base 18, inputs stored time-series signals (stored sound signals) which are required to be searched for and a target time-series signal (target sound signal) which is to be searched for, and outputs parts of stored time-series signals similar to the target time-series signal.

The target time-series signals are discrete values and are calculated by sampling the target sound signals with a predetermined interval in accordance with time-series. The target feature calculation portion 11, for example extracts power spectrum values and the like per frequency for each of samplings from the target time-series signal, obtains feature vectors by generating multidimensional vectors from the extracted features, and calculates target features constructed from the feature vectors.

The stored time-series signals are discrete values and are calculated by sampling the stored sound signals with a predetermined interval in accordance with time-series. Similar to the target feature calculation portion 11, the stored feature calculation portion 12, for example extracts power spectrum values and the like per frequency for each of samplings from the stored time-series signal, obtains feature vectors by generating multidimensional vectors from the extracted features, and calculates stored features constructed from the feature vectors.

The target feature normalization portion 13, based on the above-described target features, using statistics calculated from target features of surroundings including neighboring areas, normalizes elements of the feature vectors independently and respectively, and calculates target normalized features including multidimensional vectors constructed from normalized values.

The stored feature normalization portion 14, based on the above-described stored features, using statistics calculated from stored features of surroundings including neighboring areas, normalizes elements of the feature vectors independently and respectively, and calculates stored normalized features including multidimensional vectors constructed from normalized values.

The target feature area selection portion 15 calculates predetermined statistics based on the above-described target normalized features, selects the element from the target normalized features if the statistic is larger than a predetermined threshold, and calculates a target area selection feature constructed from a multidimensional vector of the selected elements.

The stored feature area selection portion 16 calculates predetermined statistics based on the above-described stored normalized features, selects the element from the stored normalized features if the statistic is larger than a predetermined threshold, and calculates a stored area selection feature constructed from a multidimensional vector of the selected elements.

For example, each of the area selection portions calculates differences of both the stored feature and the target feature normalized above from a boundary of "0" and "1", and can calculate each area feature by comparing it to the threshold. In this case, the threshold can be considered to be a value of 70% or 80% of the largest difference.

At each of frequency bands, the element is a characteristic element if a fluctuation of the power spectrum is large, therefore, as described above, the element with a large value is selected as a characteristic pattern.

In this case, it is recommended to provide a lower limit for each of the elements and to operate to decrease the threshold gradually until the element larger than the lower limit (1 or more than 1) is selected.

It is recommended that the target feature area selection portion 15, in respect to the target features above, calculates average values (average values of each frequency band) of each element of the feature vectors among a predetermined range in an array, selects elements from the target normalized features if an absolute value of the element divided by the average value is larger than a predetermined threshold, and calculates the target area selection feature constructed from a multidimensional vector of the selected elements.

Similarly, it is recommended that the stored feature area selection portion 16, in respect to the stored features above, calculates average values (average values of each frequency band) of each element of the feature vectors among a predetermined range in an array, selects elements from the stored normalized features if an absolute value of the element divided by the average value is larger than a predetermined threshold, and calculates the stored area selection feature constructed from a multidimensional vector of the selected elements.

In accordance with the above-described method, when each area selection portion calculates area selection features of the stored features or the target features by calculating values of differences of the stored features or the target features from the average values as the statistics and comparing with thresholds, the thresholds can be considered to be values of 70% or 80% of the largest difference.

In each frequency band, the element is the characteristic element if the fluctuation of the power spectrum is large, therefore, as described above, the element with a large value is selected as the characteristic pattern.

In this case, it is recommended to provide a lower limit for the elements and to operate to decrease the threshold gradually until the element larger than the lower limit is selected.

It is recommended that the target feature area selection portion 15 calculates the target area selection features constructed from a multidimensional vector of the selected elements by inputting the target features and the target normalized features, calculating a standard deviation (standard deviation of each frequency band) of each element of the feature vector in a predetermined range (a fixed division) in an array of the target features, multiplying the standard deviations above by the elements of the target normalized features at the corresponding position of the array, calculating the absolute value of the multiplied values as a statistic, and selecting the maximum element or multiple elements from the maximum element (for example, 2) from the target normalized features.

Similarly, it is recommended that the stored feature area selection portion 16 calculate the stored area selection features constructed from a multidimensional vector of the selected elements by inputting the stored features and the stored area selection features, calculating a standard deviation (standard deviation of each frequency band) of each element of the feature vector in a predetermined range (a fixed division) in an array of the stored features, multiplying the standard deviations above by the elements of the stored normalized features at the corresponding position of the array, calculating the absolute value of the multiplied values as a statistic, and selecting the maximum element or multiple elements from the maximum element (for example, 2) from the stored normalized features.

In the target area selection features and the stored area selection features, in an order of time-series sampling, the feature vectors of each sampling are arranged. In respect to the number of arrays (length of arrays), the target area selection features are shorter than the stored area selection features or the same.

A feature check portion 17, in respect to the feature vectors which are arranged in an array of time series in the stored area selection features above, sets a predetermined range of this array as a comparison segment, sets a comparison segment to be compared having the same length as the comparison segment in the target area selection features, calculates the degree of similarity between the comparison segment and the comparison segment to be compared, compares it to a predetermined search threshold, and detects whether or not they are similar.

The feature check portion 17, after the comparison procedure of the comparison segment above, in order to set a new comparison segment, shifts to a neighboring region with the same time width in the array.

The stored area selection feature data base 18, in respect to for example, multiple regularly distributed music, stores the stored area selection features calculated beforehand with the stored feature calculation portion 12, the stored feature normalization portion 14, and the stored feature area selection portion 16, corresponding to the titles.

Figure 2:
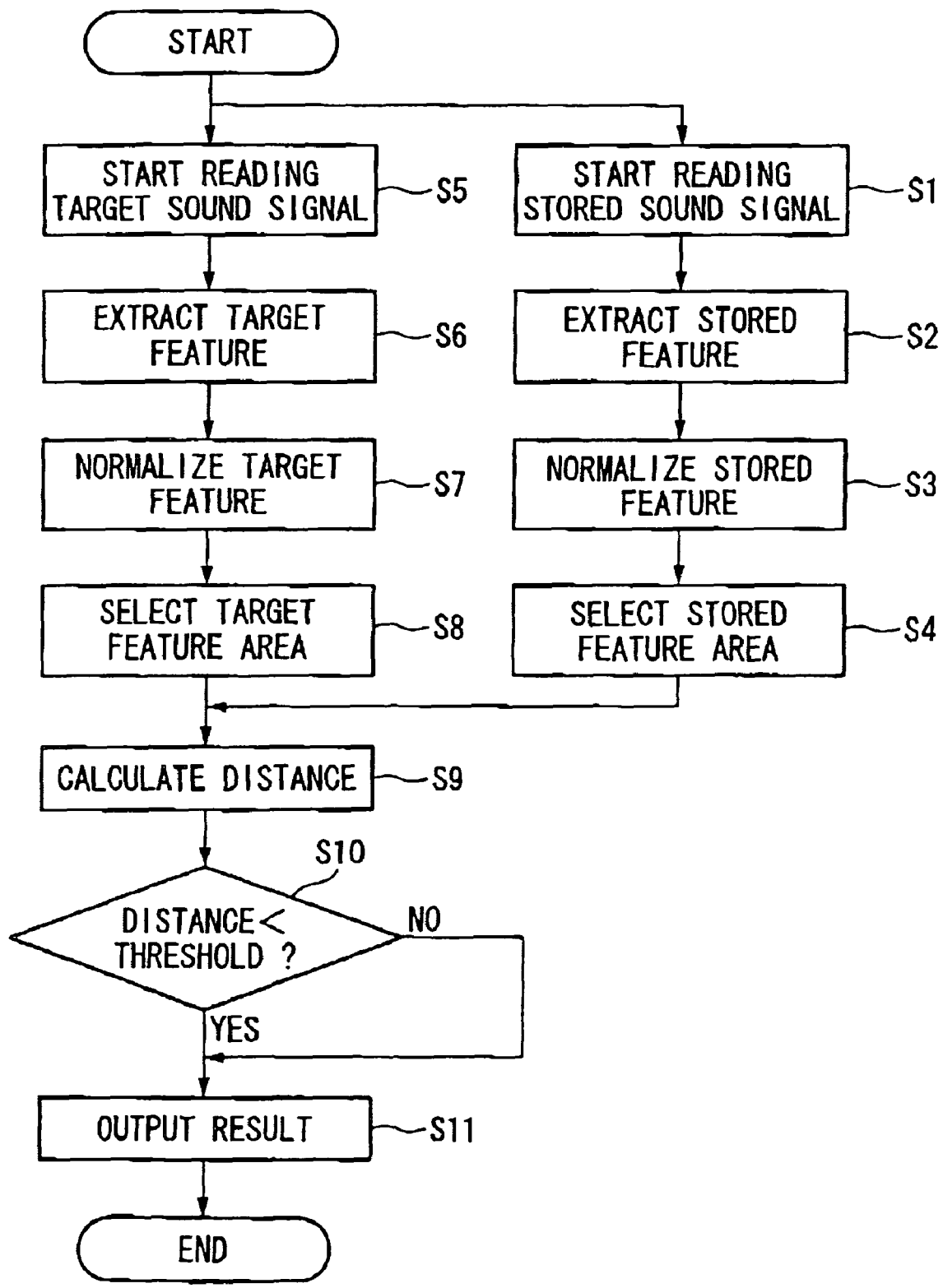
FIG. 2 is a flowchart showing an example of operation of the sound signal detection system shown in FIG. 1.

Next, referring to the figures, operation of the sound signal detection system of the present invention is explained. FIG. 2 is a flowchart showing an operation example of the sound detection system of FIG. 1.

The stored feature calculation portion 12 reads and inputs specified stored sound signals (step S1), and operates feature extraction to input stored sound signals.

The stored feature calculation portion 12, using the amplitude component of the Fourier-transformed sound signals (for example, sampling at 8000 Hz, operating Fourier transformation on a 1-second segment of the sound signals, dividing 0-4000 Hz into 32 frequency band segments, and arranging in an array per 0.1 second), extracts a multidimensional vector with 32 dimensions as a feature vector that is the stored feature and constructed from average power of the amplitude component in each segment (step S2).

The stored feature normalization portion 14 reads the stored feature from the stored feature calculation portion 12, and calculates an average value and a standard deviation of a predetermined and fixed division in respect to each element of the feature vector of this stored feature.

For example, the stored feature normalization portion 14 calculates an average value and a standard deviation from a value of a certain time division per each frequency band (element), and normalizes using the calculated average value and standard deviation.

A k-th element of a frequency characteristic y(i) after normalization by the stored feature normalization portion 14 is shown as formula (1).

$$y(i, k) = \frac{1}{\sigma(i, k)}(x(i, k) - m(i, k)) \quad (1)$$

It should be noted that in the formula (1), m(i, k) is an average value and is calculated in accordance with formula (2) below, and σ(i, k) is a standard deviation calculated in accordance with formula (3) below.

$$m(i, k) = \frac{1}{2M} \sum_{i=-M}^{M-1} x(i, k) \quad (2)$$

$$\sigma(i, k)^2 = \frac{1}{2M} \sum_{i=-M}^{M-1} (x(i, k) - m(i, k))^2 \quad (3)$$

In the formulas (2) and (3), M is a half value of a time window for calculating the average value and the standard deviation of the frequency characteristic during local time.

An array of the multidimensional vector in time series (in an order shown by k) calculated in accordance with the formulas (1)-(3) is the stored normalized feature (step S3).

The stored feature area selection portion 16 reads and inputs the stored features from the stored features calculation portion 12 and the stored normalized features from the stored features normalization portion 14, and calculates the standard deviation σ(i, k) of each element of the multidimensional vector of the stored feature at the fixed division of the array of the element (the feature vector constructed from the power spectrum of the frequency bands) by using the formulas (2) and (3) above.

The-stored feature area selection portion 16, as shown in formula (5) below, multiplies each element y(I, k) by σ(i, k) and calculates its absolute value.

$$z(i,k)=|y(i,k)\cdot\sigma(i,k)| \quad (4)$$

The stored feature area selection portion 16, based on a statistic z(i, k) calculated by multiplication between each element and the standard deviation, selects multiple vectors from the largest per fixed division and per element, for example the largest two.

The stored feature area selection portion 16, in respect to the fixed division above, outputs multidimensional vectors generated from vectors selected per element from the stored normalized features as stored area selection features (step S4).

The stored feature area selection portion 16 operates one procedure of outputting the stored area selection features obtained by calculation to the feature comparison portion 17 directly, or storing in the stored area selection feature data base 18 once.

When the feature comparison portion 17 compares the stored area selection features with the target area selection feature in real time, the stored feature area selection portion 16 outputs the inputted stored area selection features of the stored sound signals to the feature comparison portion 17, and when data of the stored sound signals is stored in the stored area selection feature data base 18, the stored feature area selection portion 16 stores the stored area selection features in the stored area selection feature data base 18 making correspondence to the title without outputting to the feature comparison portion 17.

The target feature calculation portion 11 reads and inputs specified target sound signals (step S5) and operates a feature extraction on the inputted target sound signal.

The target feature calculation portion 11, as with the stored feature calculation portion 12, using the amplitude component of Fourier transformation of the sound signals (for example, sampling at 8000 Hz, operating Fourier transformation on a 1-second segment of the sound signals, dividing 0-4000 Hz into 32 frequency band segments, and arranging in an array per 0.1 second), extracts a multidimensional vector with 32 dimensions as a feature vector that is the target feature, constructed from average power of the amplitude component in each segment (step S6).

The target feature normalization portion 13 reads the target feature from the target feature calculation portion 11, and calculates an average value and a standard deviation of a predetermined and fixed division in respect to each element of the feature vector of this target feature.

That is, the target feature normalization portion 13, as with the stored feature normalization portion 14, has an array of the multidimensional vector in time series (in an order shown by k) calculated in accordance with the formulas (1)-(3) as the target normalized feature (step S7).

The target feature area selection portion 15 reads and inputs the target features from the target features calculation portion 11 and the target normalized features from the target features normalization portion 13, and as with the stored feature area selection portion 16, takes the statistics by multiplying the standard deviations σ(i, k) calculated from the fixed division of the target feature per each element.

The target feature area selection portion 15, in respect to the array of each element, selects the largest two elements of the statistics above, and outputs the multidimensional vector generated from vectors of the elements selected from the target normalized feature per element (step S8).

The feature comparison portion 17 reads the target area selection feature and the stored area selection feature output from the target feature area selection portion 15 and the stored feature area selection portion 16 respectively.

The feature comparison portion 17 inputs the target sound signal and the stored sound signal simultaneously, except for determining the similarity in real time, and reads the stored area selection features for comparison from the stored area selection feature data base 18 one by one.

In this case, the feature comparison portion 17, in respect to the stored area selection feature, sets an array of the target vector having the same length as the target area selection feature given by the target feature area selection portion 15 as the comparison segment.

That is, the feature comparison portion 17 sets the target area selection feature generated from the multiple fixed divisions above as the comparison segment, in the stored area selection features, applies the length of the array generated from the same number of fixed regions as with the target area selection feature to the comparison segment to the target area selection feature, and compares both comparison segments in accordance with the degree of similarity one by one.

The feature comparison portion 17 operates calculation of the degree of similarity between the target area selection feature and a comparison area in the comparison segment of the stored area selection feature in accordance with a formula (5) below.

That is, the feature comparison portion 17 calculates the Euclid distance between the element yq(i, k) of the target area selection feature and the element ys(i, k) of the stored area selection feature if they match in the comparison segment, sums up values calculated by multiplying a predetermined fixed value "a" to a number of elements that do not match, and outputs them as the degree of similarity (step S9).

$$S = \sum_{k=q \cap s} (y_q(i, k) - y_s(i + j, k))^2 + a(\max(|q|, |s|) - |q \cap s|) \quad (5)$$

"q" and "p" are selected areas in the target feature and the stored feature respectively, x∩v is an intersection of x and y, |x| is a number of elements in the selected area x, and max(x, y) is a larger one between x and y.

For example, if the target area selection feature has 15 seconds length, then the feature comparison portion 17 extracts 150 feature vectors in all at intervals of 0.1 second as the elements of the array from the array of the feature vectors of this target area selection feature, applies the highest two power spectrums (extracted by the target feature area selection portion 15) in each frequency band from 150×32=4800 dimensions generated from these vectors because the frequency bands are divided into 32 at each sampling and generates a multidimensional vector generated from 64 elements as a target vector for comparing.

As with the target vector described above, the feature comparison portion 17 sets comparison segments applying 15 seconds as one unit from the top of data in the stored area selection feature, extracts 150 feature vectors in all at intervals of 0.1 second from the array of the feature vectors, applies the highest two power spectrums (extracted by the stored feature area selection portion 16) in each frequency band from 150×32=4800 dimensions generated from them because the frequency bands are divided into 32 at each sampling and generates a multidimensional vector generated from 64 elements as a stored vector for comparing.

The feature comparison portion 17 while shifting the comparison segment one by one from the top of the stored area selection feature, calculates the degree of similarity to the target area selection portion, in other words, calculates the degree of similarity between the target vector above and the stored vector using the formula (5), and operates the comparison procedure on the predetermined search threshold (step S10).

After operating the comparison procedure between the target area selection feature and the stored area selection features up to the end of the stored area selection features, the areas of the stored area selection features with the degree of similarity at each comparison segment lower than the predetermined search threshold are output as the search result (step S11).

It is recommended that the feature comparison portion 17 outputs the area of the comparison segments in the stored area selection features with the lowest degree of similarity in the comparison results as the search result.

It is possible that if the multiple comparison segments have degrees of similarity lower than the search threshold, then the feature comparison portion 17 outputs the highest N (from the bottom) comparison segments in respect to the degree of similarity.

It is recommended that if no comparison segment is lower than the search threshold, then the feature comparison portion 17 notifies the information indicating no such area, reads new stored area selection features of the stored sound signal from the stored area selection feature data base 18, and operates search procedures after step S9 continuously until the stored area selection feature including the comparison segment lower than the search threshold above is detected.

It is recommended to install the target feature calculation portion 11, the target feature normalization portion 13 and the target area selection portion 15 in FIG. 1 into user terminals (for example, personal computers) of all users beforehand, and to provide the sound signal detection server including the stored feature calculation portion 12, the stored feature normalization portion 14, the stored feature area selection portion 16, the feature comparison portion 17 and the stored area selection feature data base 18 at a service provider distributing the music.

The structure is designed such that the target area selection features are generated from the sound signals as the target sound signals which the user receives with a cellular phone and the like, these target area selection features are sent to the sound signal detection server above via Internet and the like, and it is requested to search for the stored sound signals similar to these target area selection features. In this case, same regulations, such as the length of the array of the feature vectors of the fixed segment for calculating the stored area selection features and the target area selection features, are applied to both the sound signal detection server and the terminals beforehand.

Next, an example is given of an operational experiment and its results of a case in which the sound signal detection system above is applied.

In order to check the effects of the sound signal detection system of the present invention, the search accuracy is compared between a case to which the present invention is applied and another case to which it is not applied.

In the experiment, as the stored sound signal, the sound signal by playing music in a CD (Compact disc) is directly input to the stored feature calculation portion 12 of the sound signal detection system in FIG. 1.

On the other hand, as the target sound signal, a predetermined part (a part of the stored sound signal) of the same music in the CD above is played via speakers in a cafe with loud noises, a PHS (registered trade mark) is called up from the cellular phone in the café, and the sound signal received from the sound output of the PHS is input to the target feature calculation portion 11 as the target sound signal.

The search accuracy is measured by operating the search procedure 200 times repeatedly in the same condition as the experiment above.

By adjusting the search threshold, the search accuracy is determined as a value when a precision rate and a recall rate are the same.

The precision rate is a ratio of correct cases in the output search results, and the recall rate is a ratio of the output search results in cases requested to search.

The precision rate and the recall rate are fluctuated in accordance with a setting of the search threshold. In this experiment, the search threshold (the threshold of the degree of similarity used in the formula (5)) is set in accordance with formula (6) below.

$$\theta = m + n \, v \quad (6)$$

In the formula (6), m and v are respectively an average value and a standard deviation of the degrees of similarity collected by sampling the input signals and preparatory calculating the degrees of similarity to the specified stored signals, and n is a coefficient obtained based on experiences.

It should be noted that, in the formula (6), when the search threshold $\theta$ is larger than 1, $\theta = 1$, and when $\theta$ is smaller than 0, $\theta = 0$.

In this experiment, n in the formula (6) is fixed while operating 200 times repeatedly, and its value of "t" is adjusted to be a value such that the precision rate and the recall rate are almost equal.

As a result of the experiment above, the accuracy is 15.0% when the stored and target area selection features calculated from the normalized features are not used, and 80.1% when the stored and target area selection features of the present invention are used (one embodiment).

In the search operation, Pentium (registered trademark) III 1133 MHz of Intel Co. Ltd. is used for the CPU, RedHat (registered trademark) 7.3 is used for the OS (Operating System), and GNU gcc is used for a compiler.

The executable file is compiled with the compiler optimizing option "-o3".

In accordance with the experiment above, it is possible to confirm that the search accuracy is developed because of the sound signal detection system of the present invention.

The sound signal detection system of the present invention can be applied, not only for using a piecemeal sound signal recorded in the real world with noises or interruptions and searching for the music, a title of the music in CM, or a broadcast time, but also for searching for information by combining with an optional information data base storing information of music or information related to the CM.

For example, the user receives the music or the CM from a TV or a radio with the cellular phone and transmits it to a sound signal search service and the like. It is possible to have a configuration such that a sound signal search service provider searches for sounds similar to or the same as this sound signal from a data base, and provide information related to the music or the CM (for example, a player, names of a composer or a songwriter, product information, product characteristics, services, filming location, actors, homepages and the like) to the user via a network such as Internet requiring a fee or for free.

In an input method of the sound, it is possible that the sound to be searched for is directly received with a microphone of the terminal, the mobile terminal accesses to the server and the target signals are generated. It is possible that the recorded sound is cut appropriately and sent.

As another example of the invention, it may be possible to be applied for cases such that the user searches for a phrase of the music similar to an image sound recorded with a household tape recorder from distributed CDs, movies or TV programs, uses the contents, collects the phrases corresponding to the image sound and edits them.

Second Embodiment

Figure 3:
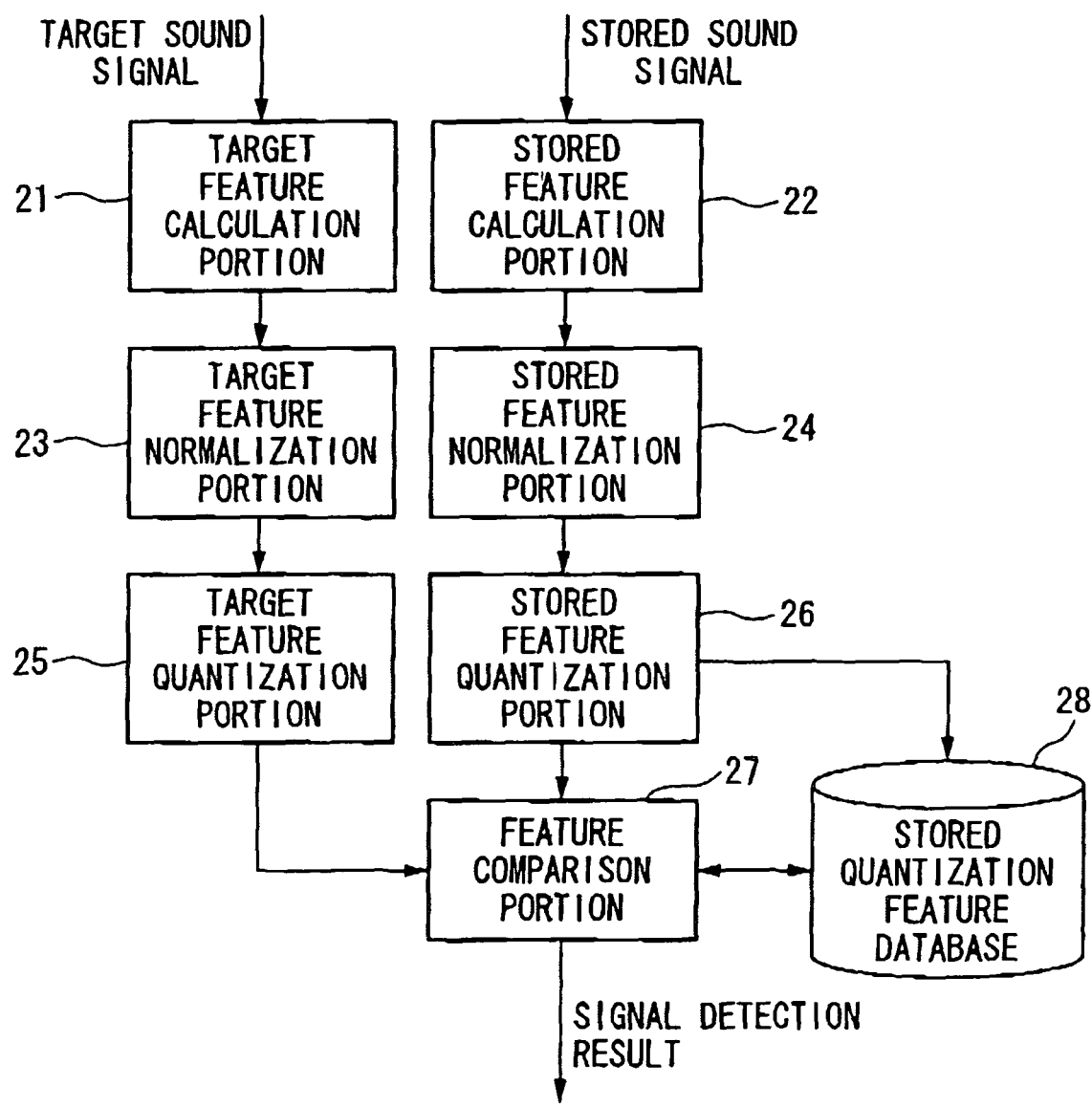
FIG. 3 is a block diagram of a structure example of a sound signal detection system in one embodiment of the present invention.

FIG. 3 shows a second embodiment of the present invention and is a block diagram of a structure of a sound signal detection system applied to sound signals with high accuracy against distortions.

The sound signal detection system shown in FIG. 3 realizes signal detection applied to the sound signals with high accuracy against characteristic distortions, and is constructed from a target feature calculation portion 21, a stored feature calculation portion 22, a target feature normalization portion 23, a stored feature normalization portion 24, a target feature quantization portion 25, a stored feature quantization portion 26, a feature comparison portion 27, and a target quantization feature database 28, inputs stored time-series signals (stored sound signals) which are required to be searched for and a target time-series signal (target sound signal) which is to be searched for, and outputs parts of time-series signals similar to the target time-series signals.

The target time-series signals are discrete values and are calculated by sampling the target sound signals with a predetermined interval in accordance with time-series. The target feature calculation portion 21, for example extracts power spectrum values and the like per frequency for each of samplings from the target time-series signal, obtains feature vectors by generating multidimensional vectors from the extracted features, and introduces (calculates) target features constructed from the feature vectors.

The stored time-series signals are discrete values and are calculated by sampling the stored sound signals with a predetermined interval in accordance with time-series. Similar to the target feature calculation portion 21, the stored feature calculation portion 22, for example extracts power spectrum values and the like per frequency for each of samplings from the stored time-series signal, obtains feature vectors by generating multidimensional vectors from the extracted features, and calculates stored features constructed from the feature vectors.

The target feature normalization portion 23, based on the above-described target features, using statistics calculated from target features of surroundings including neighboring areas, normalizes elements of the feature vectors independently and respectively, and calculates target normalized features including multidimensional vectors constructed from normalized values.

The stored feature normalization portion 24, based on the above-described stored features, using statistics calculated from stored features of surroundings including neighboring areas, normalizes elements of the feature vectors independently and respectively, and calculates stored normalized features including multidimensional vectors constructed from normalized values.

The target feature quantization portion 25 operates a scalar quantization on the above-described target normalized features using a predetermined threshold, and calculates a target quantized feature constructed from a multidimensional vector including elements having values calculated by this quantization.

The stored feature quantization portion 26 operates a scalar quantization on the above-described stored normalized features using a predetermined threshold, and calculates a stored quantization feature constructed from a multidimensional vector including elements having values calculated by this quantization.

The predetermined threshold above for the quantization can be calculated by, for example, binarizing the target normalized features and the stored normalized features, and selecting a point minimizing a mean square error between an element value after binarization and an original element value.

In these target quantization feature and the stored quantization feature, respectively in a time-series order by sampling, the feature vectors obtained by sampling are arranged in arrays sequentially. The stored quantization feature has a larger or the same number of arrays (length of arrays) than the target quantization feature.

It should be noted that, hereinafter, a degenerated vector of the stored feature is a vector calculated based on predetermined statistics such as the stored area selection features, stored normalized features and the like, and a degenerated vector of the target feature is a vector calculated based on predetermined statistics such as the target area selection features, target normalized features and the like The feature check portion 27, in respect to the feature vectors which are arranged in an array of time series in the stored quantization features above, sets a predetermined range of this array as a comparison segment, sets a comparison segment to be compared having the same length as the comparison segment in the target quantization features, calculates the degree of similarity between the comparison segment and the comparison segment to be compared, compares it to a predetermined search threshold, and detects whether or not they are similar.

The feature check portion 27, after the comparison procedure of the comparison segment above, in order to set a new comparison segment, shifts to a neighboring region with the same time width in the array.

The stored quantized feature data base 28, in respect to, for example, multiple regularly distributed music, stores the stored quantization features calculated beforehand with the stored feature calculation portion 22, the stored feature normalization portion 24, and the stored feature quantization portion 26, corresponding to the titles.

Figure 4:
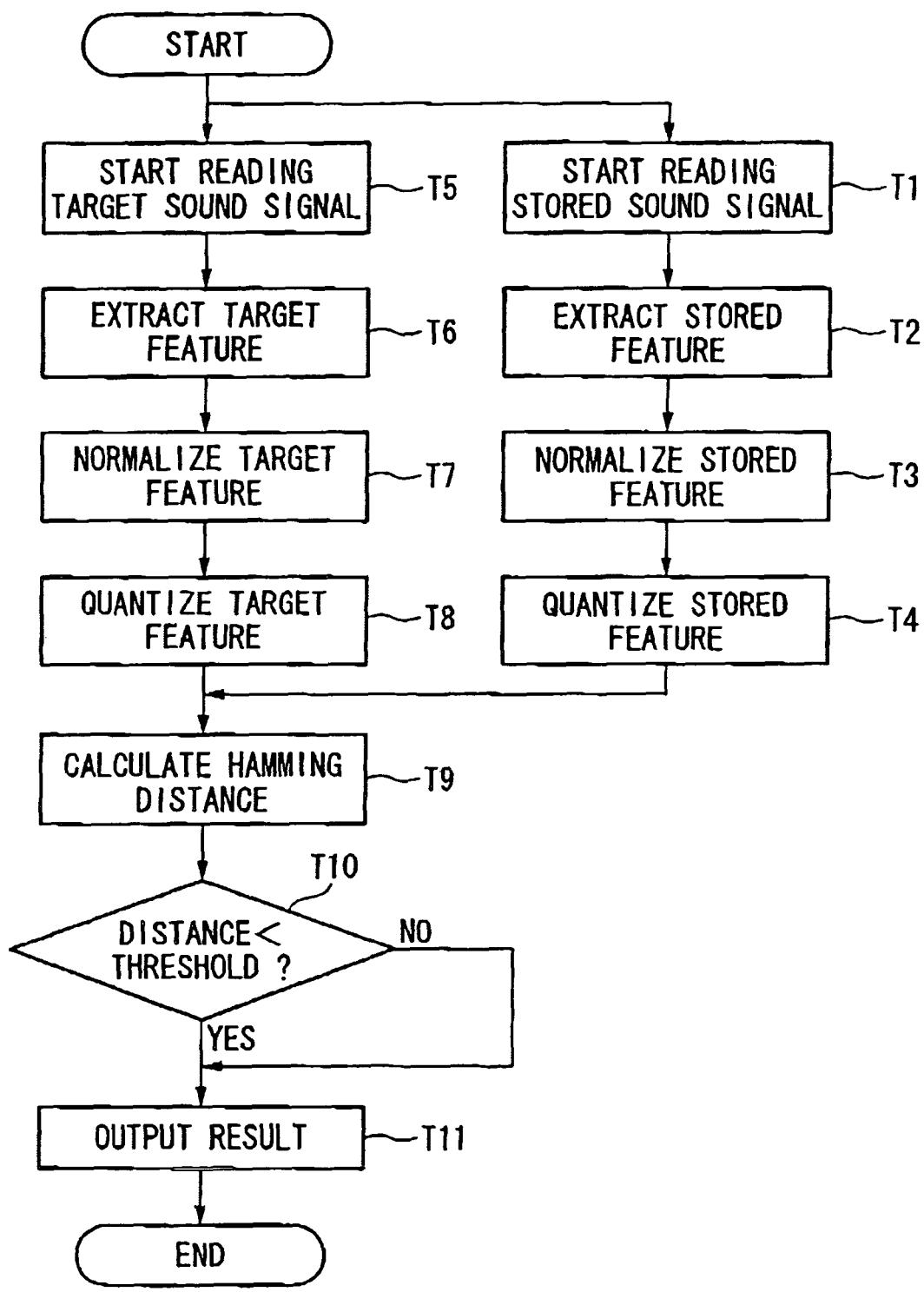
FIG. 4 is a flowchart showing an example of operation of the sound signal detection system shown in FIG. 3.

Next, referring to the figures, operation of the sound signal detection system of the present invention is explained. FIG. 4 is a flowchart showing an operation example of the sound detection system of FIG. 3.

The stored feature calculation portion 22 reads and inputs specified stored sound signals (step T1), and operates feature extraction to input stored sound signals.

The stored feature calculation portion 22, using the amplitude component of the Fourier-transformed sound signals, for example, sampled at 8000 Hz, operates Fourier transformation on a 1-second segment of the sound signals, divides 0-4000 Hz into 32 frequency band segments, and extracts a multidimensional vector with 32 dimensions per 0.1 second as a feature vector that is the stored feature and constructed from average power of the amplitude component in each segment (step T2).

The stored feature normalization portion 24 reads the stored feature from the stored feature calculation portion 22, and calculates an average value and a standard deviation of a predetermined and fixed division in respect to each element of the feature vector of this stored feature.

For example, the stored feature normalization portion 24 calculates an average value and a standard deviation from a value of a certain time division per each frequency band, and normalizes using the calculated average value and standard deviation.

A k-th element of a frequency characteristic y(i) after normalization by the stored feature normalization portion 24 is shown as formula (21).

$$y(i, k) = \frac{1}{\sigma(i, k)}(Q(i, k) - m(i, k)) \quad (21)$$

It should be noted that in the formula (21), m(i, k) is an average value and is calculated in accordance with formula (22) below, and σ(i, k) is a standard deviation calculated in accordance with formula (23) below.

$$m(i, k) = \frac{1}{2M} \sum_{i=-M}^{M-1} Q(i, k) \quad (22)$$

$$\sigma(i, k)^2 = \frac{1}{2M} \sum_{i=-M}^{M-1} (Q(i, k) - m(i, k))^2 \quad (23)$$

In the formulas (22) and (23), M is a half value of a time window for calculating the average value and the standard deviation of the frequency characteristic during local time.

An array of the multidimensional vector in time series (in an order shown by k) calculated in accordance with the formulas (21)-(23) is the stored normalized feature (step T3).

The stored feature quantization portion 26 reads and inputs the stored normalized features from the stored feature normalization portion 24, in respect to each element of the multidimensional vector of the stored normalized feature, and calculates a vector of quantized values by binarization with a boundary of a threshold specified beforehand.

For example, the stored feature quantization portion 26 quantizes each element of the stored normalized feature with a boundary of the calculated threshold t.

The stored feature quantization portion 26 calculates the k-th element of the frequency characteristic z(i) after quantization in accordance with a formula (24) below.

$$z(i, k) = \begin{cases} 1 & (\text{when } y(i, k) > t) \\ 0 & (\text{when } y(i, k) \le t) \end{cases} \quad (24)$$

The stored feature quantization portion 26 binarizes each element and outputs this multidimensional vector as the stored quantization feature (step T4).

The stored feature quantization portion 26 directly sends the calculated stored quantization features to the feature comparison portion 27 or registers it to the stored quantized feature data base 28.

When the feature comparison portion 27 compares the stored quantized features with the target quantized feature in real time, the stored feature quantization portion 26 outputs the inputted stored quantized features of the stored sound signals to the feature comparison portion 27, and when data of the stored sound signals is stored into the stored quantized feature data base 28, the stored feature quantization portion 26 stores the stored quantization features into the stored quantized feature data base 28 making correspondence to the title without outputting to the feature comparison portion 27.

The target feature calculation portion 21 reads and inputs the specified target sound signal (step T5), and operates the feature extraction on the inputted target sound signal.

The target feature calculation portion 21, similar to the stored feature calculation portion 22, using the amplitude component of the Fourier-transformed sound signals, for example, sampled at 8000 Hz, operates Fourier transformation on a 1-second segment of the sound signals, divides 0-4000 Hz into 32 frequency band segments, and extracts a multidimensional vector with 32 dimensions per 0.1 second as a feature vector that is the target feature and constructed from average power of the amplitude component in each segment (step T6).

The target feature normalization portion 23 reads the target feature from the target feature calculation portion 21, and calculates an average value and a standard deviation of a predetermined and fixed division in respect to each element of the feature vector of this target feature.

That is, in the target feature normalization portion 23, similar to the stored feature normalization portion 24, an array of the multidimensional vector in time series (in an order shown by k) calculated in accordance with the formulas (21)-(23) is the target normalized feature (step T7).

The target feature quantization portion 25 reads and inputs the target normalized features from the target feature normalization portion 23, in respect to each element of the multidimensional vector of the target normalized feature, and calculates a vector of quantized values by binarization, similar to the stored feature quantization portion 26, with a boundary of a threshold specified beforehand.

The target feature quantization portion 25 outputs this multidimensional vector as the stored quantization feature in which each element is binarized (step T8).

Next, the feature comparison portion 27 reads the target quantized feature and the stored quantized features calculated by the target feature quantization portion 25 and the stored feature quantization portion 26 respectively.

The feature comparison portion 27 inputs the target sound signal and the stored sound signal simultaneously, except for determining the similarity in real time, and reads the stored quantized features for comparison from the stored quantized feature data base 28 one by one.

In this case, the feature comparison portion 27, in respect to the stored quantized feature, sets an array of the target vector having the same length as the target quantized feature given by the target feature quantization portion 25 as the comparison segment.

The feature comparison portion 27 calculates the degree of similarity between the target quantized feature and the comparison segment above by calculating the Hamming distance between both feature vectors.

For example, if the target quantized feature has 15 seconds length, then the feature comparison portion 27 extracts 150 feature vectors at intervals of 0.1 second as the elements of the array from the array of the feature vectors of this target quantized feature, because the frequency bands are divided into 32 at each sampling, and applies 150×32=4800 dimensions generated from these vectors as the target vector for comparison.

As with the target vector described above, the feature comparison portion 27 sets comparison segments applying 15 seconds as one unit from the top of data in the stored quantized feature, extracts 150 feature vectors in all at intervals of 0.1 second from the array of the feature vectors, because the frequency bands are divided into 32 at each sampling, and applies 150×32=4800 dimensions generated from these vectors as the stored vector for comparison.

If the feature comparison portion 27 has the target vector by extracting the elements of multiple parts from the array of the feature vector of the target quantized feature, it can be appropriate that the target feature quantization portion 25 extracts the feature vector as an element of the array from the target normalized feature, that is, the target feature quantization portion 25 extracts 150 parts in all with 0.1 second intervals, operates the scalar quantization, and outputs as the target vector to the feature comparison portion 27.

The feature comparison portion 27 while shifting the comparison segment one by one from the top of the stored quantized features, and operates a comparison procedure by calculating the Hamming distance to the target quantized feature, in other words, calculates the Hamming distance between the target vector above and the stored vector.

After operating the comparison procedure up to the end of the stored quantized features, referring to Hamming distances, the feature comparison portion 27 outputs the area of the comparison segments with the minimum Hamming distance as the search result.

It can be appropriate that if a search threshold for the Hamming distance is given, the feature comparison portion 27 compares this search threshold and the Hamming distance of the selected comparison segment (step T10) and outputs only the area of the comparison segments lower than the search threshold as a search result (step T11).

It is possible that if the multiple comparison segments have Hamming distances lower than the search threshold, then the feature comparison portion 27 outputs the highest N (from the bottom) comparison segments in respect to the Hamming distance.

It is recommended that if no comparison segment is lower than the search threshold, then the feature comparison portion 27 notifies the information indicating no such area, reads new stored quantized features of the stored sound signal from the stored quantized feature data base 28, and operates search procedures after step T9 continuously until the stored quantized feature including the comparison segment lower than the search threshold above is detected.

It can be appropriate to install the target feature calculation portion 21, the target feature normalization portion 23 and the target quantization portion 25 in FIG. 3 into user terminals (for example, personal computers) of all users beforehand, and to provide the sound signal detection server including the stored feature calculation portion 22, the stored feature normalization portion 24, the stored feature quantization portion 26, the feature comparison portion 27 and the stored quantized feature data base 28 at a service provider distributing the music.

The structure is designed such that the target quantized features are generated from the sound signals as the target sound signals which are received by the users with their cellular phones and the like, these target quantized features are sent to the sound signal detection server above via internet and the like, and it is requested to search for the stored sound signals similar to these target quantized features.

Next, an example is given of an operational experiment and its results of a case in which the sound signal detection system above is applied.

In order to check the effects of the sound signal detection system of the present invention, the search accuracy is compared between a case to which the present invention is applied and another case to which it is not applied.

In the experiment, as the stored sound signal, the sound signal by playing music in a CD (Compact disc) is directly input to the stored feature calculation portion 22 of the sound signal detection system in FIG. 3.

On the other hand, as the target sound signal, a predetermined part (a part of the stored sound signal) of the same music in the CD above is played via speakers, a PHS (registered trade mark) is called up from the cellular phone in a cafe, and the sound signal received from the sound output of the PHS is input to the target feature calculation portion 21 as the target sound signal.

The search accuracy is measured by operating the search procedure 200 times repeatedly in the same condition as the experiment above.

By adjusting the search threshold, the search accuracy is determined as a value when a precision rate and a recall rate are the same.

The precision rate is a ratio of correct cases in the output search results, and the recall rate is a ratio of the output search results in cases requested to search.

The precision rate and the recall rate are fluctuated in accordance with a setting of the search threshold. In this experiment, the search threshold (the threshold of the Hamming distance) is set in accordance with a formula (25) below.

$$\theta = m + nv \quad (25)$$

In the formula (25), m and v are respectively an average value and a standard deviation of the degrees of similarity collected by sampling the input signals and preparatory calculating the degrees of similarity to the specified stored signals, and n is a coefficient obtained based on experiences.

It should be noted that, in the formula (25), when the search threshold $\theta$ is larger than 1, $\theta=1$, and when $\theta$ is smaller than 0, $\theta=0$.

In this experiment, n in the formula (25) is fixed while operating 200 times repeatedly, and its t is adjusted to be a value such that the precision rate and the recall rate are almost equal.

As a result of the experiment above, the accuracy is 60.0% when the normalized features are not quantized, and 85.77% when quantized (one embodiment).

In the search operation Pentium (registered trademark) III 1133 MHz of Intel Co. Ltd. is used for the CPU, RedHat (registered trademark) 7.3 is used for the OS (Operating System), and GNU gcc is used for a compiler.

The executable file is compiled with the compiler optimizing option "–o3".

In accordance with the experiment above, it is possible to confirm that the search accuracy is developed because of the sound signal detection system of the present invention.

The sound signal detection system of the present invention can be applied, not only for using a piecemeal sound signal recorded in the real world effected from distortions by characteristics of terminals or encoding characteristics and searching for the music, a title of the music in CM, or a broadcast time, but also for searching for information by combining with an optional information data base storing information of music or information related to the CM.

For example, the user receives the music or the CM from a TV or a radio with the cellular phone and transmits it to a sound signal search service and the like. It is possible to have a configuration such that a sound signal search service provider searches for sounds similar to or the same as this sound signal from a data base, and provides information related to the music or the CM (for example, a player, names of a composer or a songwriter, product information, product characteristics, services, filming location, actors, homepages and the like) to the user via a network such as Internet requiring a fee or for free.

In an input method of the sound, it is possible that the sound to be searched for is directly received with a microphone of the terminal, the mobile terminal accesses the server and the target signals are generated.

It is possible that the recorded sound is cut appropriately and sent.

As another example of the invention, it may be possible to be applied for cases such that the user searches for a phrase of the music similar to an image sound recorded with a household tape recorder from distributed CDs, movies or TV programs, uses the contents, collects the phrases corresponding to the image sound and edits them.

Third Embodiment

Hereafter, a third embodiment of the present invention is explained referring to the figures.

Figure 5:
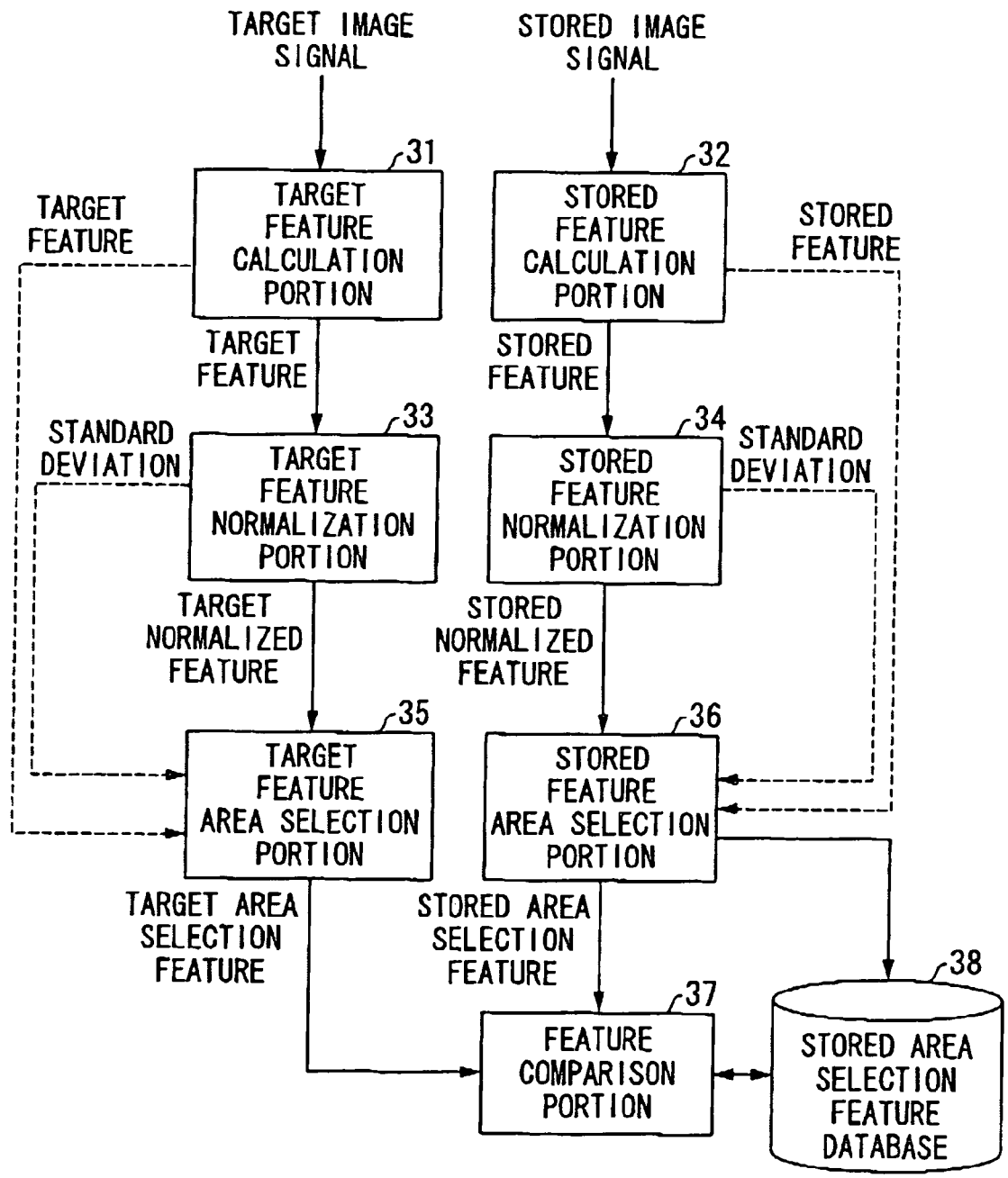
FIG. 5 is a block diagram of a structure example of an image signal search system in one embodiment of the present invention.

FIG. 5 is a block diagram of a structure of an image signal search system in one embodiment of the present invention applied to image signals with high accuracy against a reflection or an interruption.

The image signal detection system shown in FIG. 5 applied to image signals realizes signal detection with high accuracy against reflections and interruptions, and is constructed from a target feature calculation portion 31, a stored feature calculation portion 32, a target feature normalization portion 33, a stored feature normalization portion 34, a target feature area selection portion 35, a stored feature area selection portion 36, a feature comparison portion 37, and a stored area selection feature data base 38, inputs stored image signals (stored time-series signals) which are required to be searched for and a target image signal (target time-series signal) which is to be searched for, and outputs parts of stored time-series signals similar to the target time-series signal.

The target time-series signal is a discrete value and is calculated by sampling the target image signal with a predetermined interval in accordance with time-series. The target feature calculation portion 31, for example extracts power spectrum values and the like per frequency for each of samplings from the target time-series signal, obtains feature vectors by generating multidimensional vectors from the extracted features, and calculates target features constructed from the feature vectors.

The stored feature calculation portion 32, similar to the target feature calculation portion 31, extracts quantities of features from the stored time-series signals which are discrete data and are calculated by sampling the stored image signals with a predetermined interval in accordance with time-series, generates a multidimensional vector from them, and calculates stored features constructed from the feature vectors.

It should be noted that a matrix representation can be applied to the target feature and the stored features instead of applying the multidimensional vectors.

The target feature normalization portion 33, based on the above-described target features, using statistics calculated from multiple target features of surroundings including neighboring target features of the target features, normalizes elements of the feature vectors independently and respectively, and calculates target normalized features including the feature vectors constructed from normalized values.

The stored feature normalization portion 34, based on the above-described stored features, using statistics calculated from multiple stored features of surroundings including neighboring stored features to the stored features, normalizes elements of the feature vectors independently and respectively, and calculates stored normalized features including the feature vectors constructed from normalized values.

It should be noted that "neighboring" in "neighboring stored features to the stored features" expressed above is, for example, corresponding to "at a discrete time before or after" upon expressing frames at a discrete time before or after the frame which is a frame of the discrete time taken by sampling from the image signal in accordance with time. Using the example above, "multiple stored features of surroundings" corresponds to "at a discrete time".

The target feature area selection portion 35 calculates predetermined statistics based on the above-described target features, selects the element from the target normalized features if the statistic is larger than a predetermined threshold, and calculates a target area selection feature constructed from a multidimensional vector of the selected elements.

The stored feature area selection portion 36 calculates predetermined statistics based on the above-described stored features, selects the element from the stored normalized features if the statistic is larger than a predetermined threshold, and calculates a stored area selection feature constructed from a multidimensional vector of the selected elements.

The feature check portion 37, in the stored area selection features above, sets a predetermined range as a comparison segment, sets a comparison segment to be compared having the same length as the comparison segment in the target area selection features, calculates the degree of similarity between the comparison segment and the comparison segment to be compared, compares it to a predetermined search threshold, detects whether or not they are similar, and outputs a result as a result of signal detection.

The feature check portion 37, after a comparison procedure of the comparison segment above, in order to set a new comparison segment, operates a shifting procedure of the comparison segment to a neighboring region with the same time width in the array.

The stored area feature database 38 stores the stored area selection features calculated beforehand with the stored feature calculation portion 32, the stored feature normalization portion 34, and the stored feature area selection portion 36.

Using an example of multiple CM images as stored image signals, the stored area selection feature data base 38 stores the stored area selection features calculated beforehand and having correspondence with CM providers respectively.

In this example, the stored area selection feature calculated beforehand is stored in the stored area selection feature data base 38, however, it can be appropriate to provide a data base to store stored image signals (original image signals).

A threshold setting in the target feature area selection portion 35 and the stored feature area selection portion 36 is explained.

In respect to the threshold above, for example, when the elements with large absolute values of differences between values of elements of the normalized feature vector and a standard value (in this case, "0") calculated by a statistical operation are selected, it is one idea to have the threshold that is an 80% value of the maximum value of the absolute value of the differences between the values of the elements of the normalized feature vector and "0", and to select the elements larger than the threshold from the elements.

Figure 6:
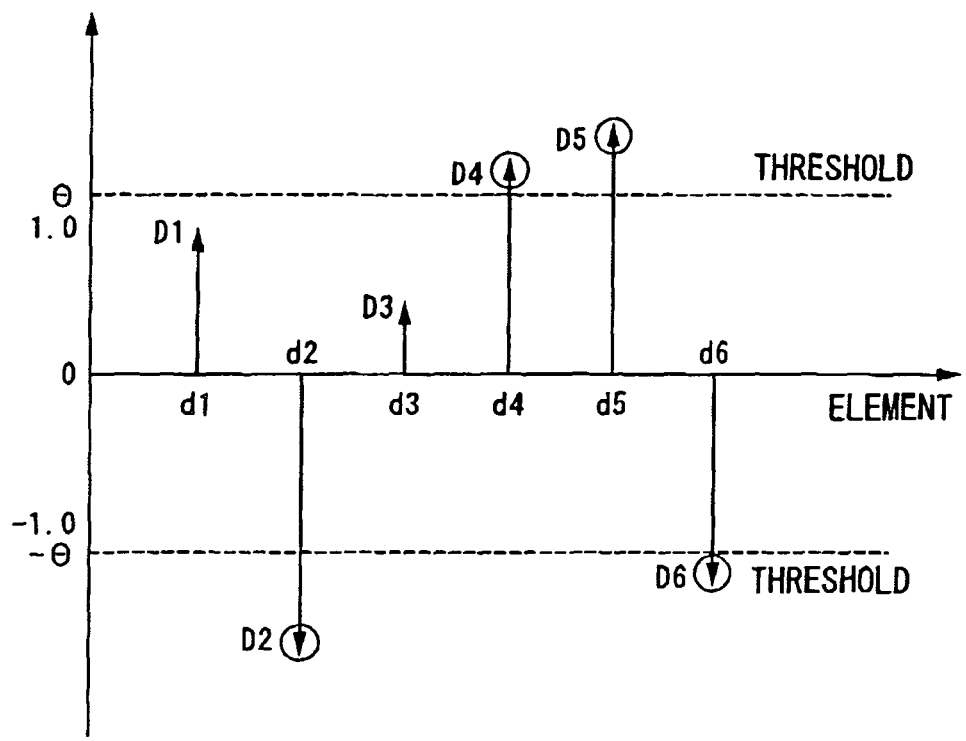
FIG. 6 is a graph used for an explanation of setting a threshold of the image signal search system in one embodiment of the present invention.

FIG. 6 shows this. In FIG. 6, the absolute values of the differences between the elements d1-d6 of the normalized feature vector and "0" are D1-D6. The maximum value of the absolute values D1-D6 of the differences is selected and the threshold is determined to be, for example, 80% of it.

As shown in FIG. 6, the maximum value of the absolute values of the differences is the absolute value D2 of the difference of the element d2. Therefore, |θ| is defined to be 80% of the absolute value of the difference from D2.

$|θ|=0.8*D2$

The absolute values D1-D6 of the differences from the elements d1-d6 and the threshold |θ| are compared and extracted if larger than the threshold. The selected values are checked with circles.

In FIG. 6, the absolute value D2 of the difference of the element d2, the absolute value D4 of the difference of the element d4, the absolute value D5 of the difference of the element d5, and the absolute value D6 of the difference of the element d6 are larger than the threshold, therefore, these elements are selected as a pattern of the selected feature.

In this case, the threshold is defined to be 80% of the maximum value of the absolute values of the differences, however, this is an example, and it is not limited to 80%.

Figure 7:
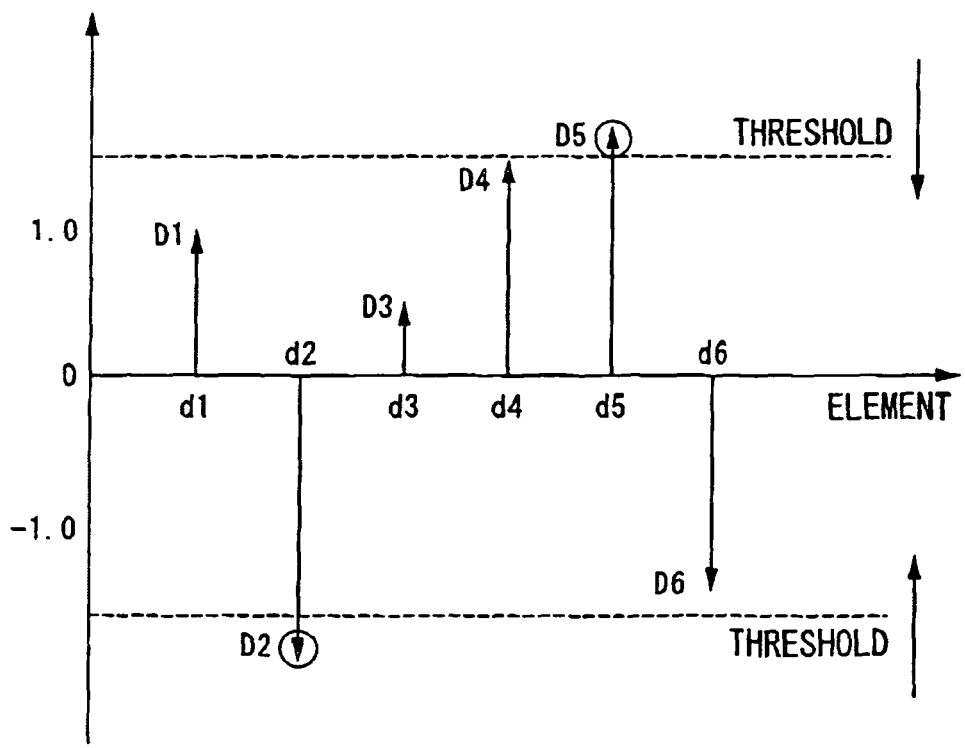
FIG. 7 is a graph used for an explanation of setting a threshold of the image signal search system in one embodiment of the present invention.

It can be appropriate to provide a lower limitation for each element beforehand and to operate to decrease the threshold gradually until the element satisfying the lover limitation (one or more than one) is selected. For example, in an example in FIG. 7, it shows a case of selecting the largest two elements and by decreasing the threshold gradually, the absolute value D2 of the difference between the element d2 and "0" and the absolute value D5 of the difference between the element d5 and "0" that are the maximum of the absolute values of the differences are selected as the pattern of the selected features.

It is recommended that the target feature area selection portion 35 calculate average values of each element of the feature vectors among a predetermined range in the target feature, select elements from the target normalized features if an absolute value of the element divided by the average value is larger than a predetermined threshold, and calculate the target area selection feature constructed from a multidimensional vector of the selected elements.

Similarly, it can be appropriate for the stored feature area selection portion 36 to calculate average values of each element of the feature vectors in the stored features above among a predetermined range, select elements from the stored normalized features if an absolute value of the element divided by the average value is larger than a predetermined threshold, and calculate the stored area selection feature constructed from a multidimensional vector of the selected elements.

It can be appropriate for, for example, the above-described threshold to be set to 80% of a value which is the maximum value among absolute values of differences between values of the elements of the normalized feature vector and the average values if the elements having large absolute values of differences between values of the elements of the normalized feature vector and the average values are selected.

In this case, it can be appropriate to provide a lower limit for the elements and to operate to decrease the threshold gradually until the element larger than the lower limit is selected.

It can be appropriate for the target feature area selection portion 35 to calculate the target area selection features constructed from a multidimensional vector of the selected elements by inputting the target features and the target normalized features, calculating a standard deviation of each element of the feature vector in a predetermined range (a fixed division) of the target features, multiplying the standard deviations above by the elements of the target normalized features at the corresponding position of the array, calculating the absolute value of the multiplied values as a statistic, and selecting the maximum element or multiple elements from the maximum element (for example, 2) from the target normalized features.

Similarly, it is recommended that the stored feature area selection portion 36 calculate the stored area selection features constructed from a multidimensional vector of the selected elements by inputting the stored features and the stored normalized features, calculating a standard deviation of each element of the feature vector in a predetermined range (a fixed division) of the stored features, multiplying the standard deviations above by the elements of the stored normalized features at the corresponding position of the array, calculating the absolute value of the multiplied values as a statistic, and selecting the maximum element or multiple elements from the maximum element (for example, 2) from the stored normalized features.

Figure 8:
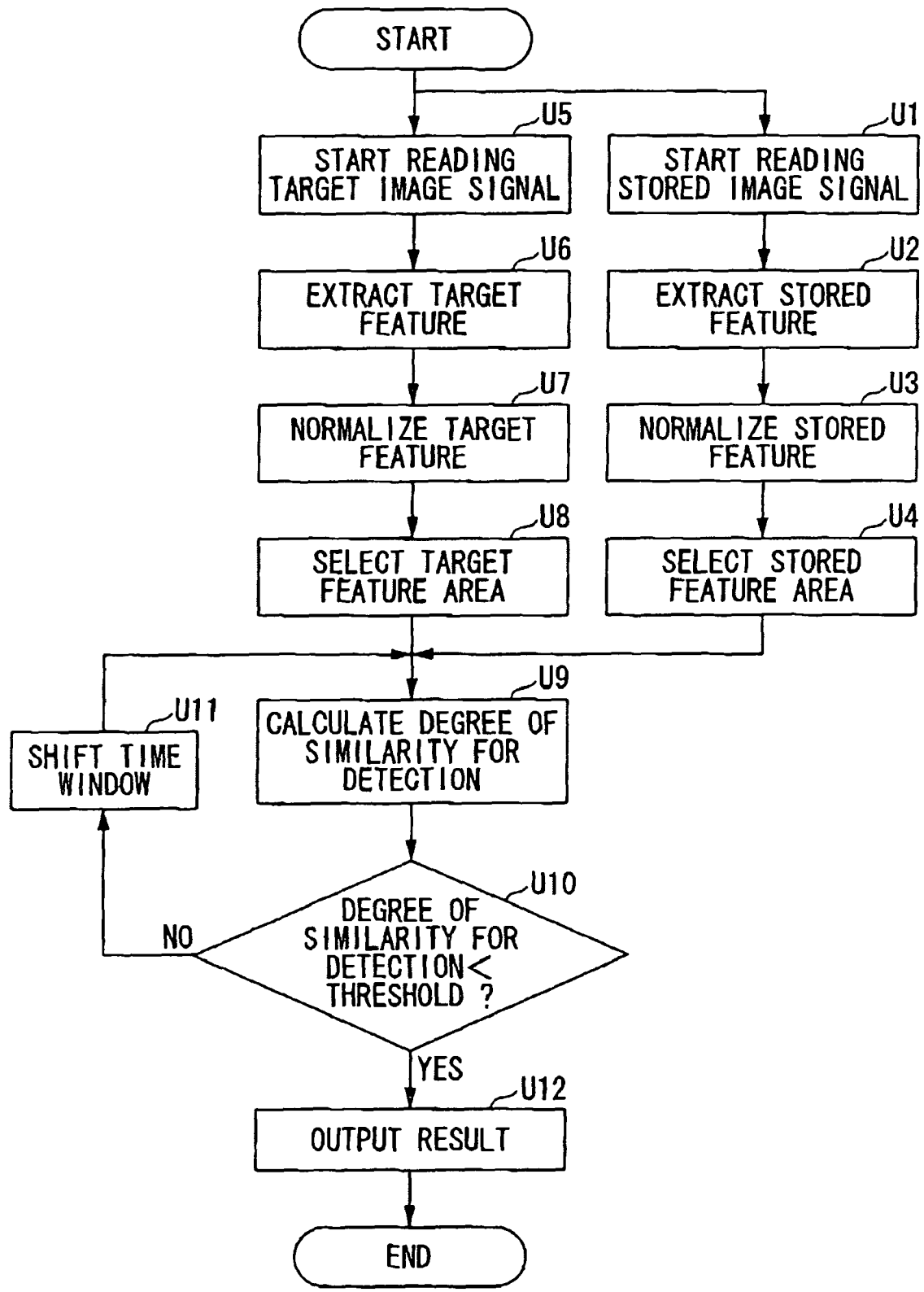
FIG. 8 is a flowchart showing an example of operation of the image signal search system shown in FIG. 5.

Next, referring to the figures, the operation of the image signal search system in this embodiment is explained. FIG. 8 is a flowchart showing an example of operation of the image signal search system shown in FIG. 5.

In the following explanation, an embodiment is described using information of average values of each color of RGB in multiple regions divided from one frame.

In FIG. 8, the stored feature calculation portion 32 reads the specified stored image signal and outputs it (step U1), and operates a feature extraction on the input stored image signal.

Figures 9, 10:
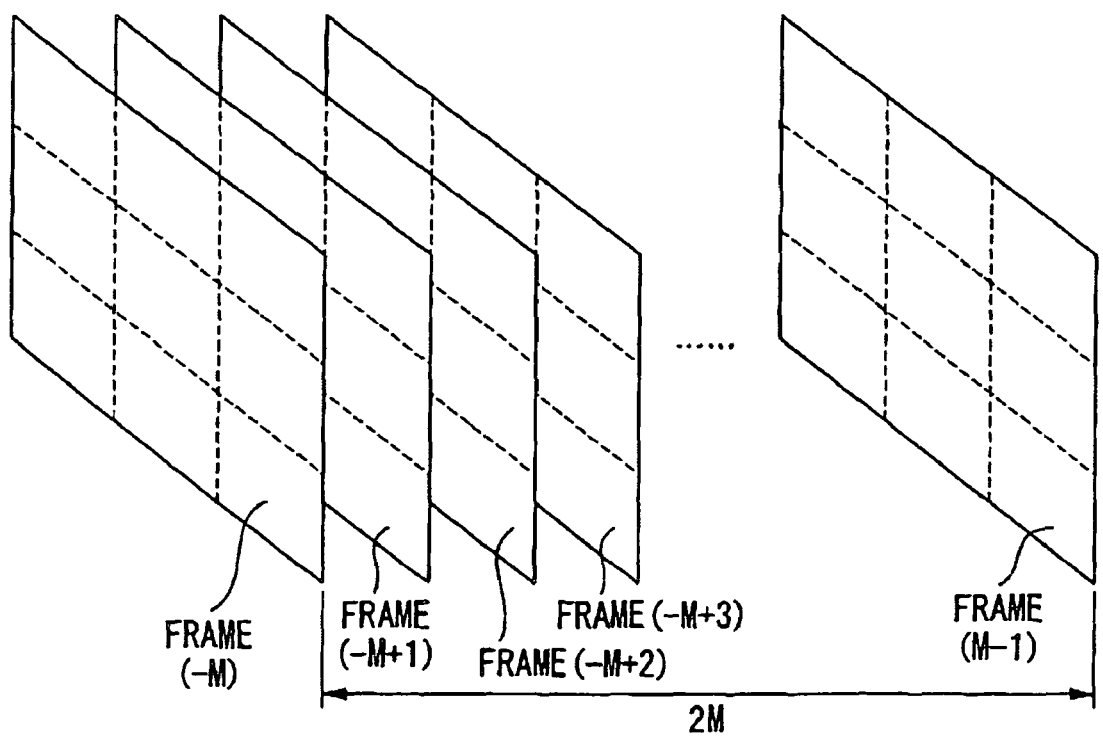
FIG. 9 is a figure of a sub screen of the image signal search system in one embodiment of the present invention.
FIG. 10 is a figure for explanation of the relationship between local time and frames in the image signal search system in one embodiment of the present invention.

In this operation, the stored feature calculation portion 32, based on time-series data of the stored image, as shown in FIG. 9, for example, divides one frame of the stored image into 3 vertically and horizontally and 9 areas totally, and calculates average values of pixels of RGB colors in the divisions (areas) respectively. In an i-th frame, average values of RGB in a first sub window are expressed as $(x_{i,1}, x_{i,2}, x_{i,3})$, average values of RGB in a second sub window are expressed as $(x_{i,4}, x_{i,5}, x_{i,6})$, average values of RGB in a first sub window are expressed as $(x_{i,7}, x_{i,8}, x_{i,9})$, and in the following, similarly multidimensional vectors having elements which are average RGB values of the sub windows are generated. Such multidimensional vectors are called local area primary color features. In this example, the above-described $x_{i,1}$ and the like are elements of the local area primary color features.

A multidimensional vector having a total of 27 dimensions generated from average values of RGB in 9 areas is extracted as a stored feature. In this case, the feature vector is generated per one frame (step U2).

Moreover, extraction methods of the stored feature include a MPEG (Moving Picture Coding Experts Group) encoding method (including movement compensation, DCT (Discrete Cosine Transform) and variable length coding) and a method using an amplitude component of Fourier transform that is a compression technology for moving digital pictures.

The stored feature normalization portion 34 reads the stored feature from the stored feature calculation portion 32, and calculates an average value and a standard deviation of a predetermined and fixed division in respect to each element of the feature vector of this stored feature.

For example, the stored feature normalization portion 34 calculates an average value and a standard deviation from a value of a certain time division per RGB color in each area, and normalizes using the calculated average value and standard deviation.

A k-th element of a local area primary color feature after normalization, which is called a normalized local primary feature, by the stored feature normalization portion 34 is shown in formula (31).

$$y_{i,k} = \frac{1}{\sigma_{i,k}} x_{i,k} - m_{i,k} \quad (31)$$

It should be noted that in the formula 31, $x_{(i+j),k}$ is a k-th element of the local area feature of the (i+j)th frame when serial numbers are appended to all frames. "j" is a relative number to a center frame in the frames of a predetermined time period, j is an integer and satisfies $-M \leq j \leq M-1$ when 2M frames are included in the predetermined time period. "i" is a serial number of the center frame of the frames in the predetermined time period, and is same as the serial number when j=0. "$m_{i,k}$" is an average value of $x_{(i,j),k}$ which satisfies $-M \leq j \leq M-1$ and is expressed in a formula (32). "$\sigma_{i,k}$" is a standard deviation in respect to $x_{(i+j),k}$ which satisfies $-M \leq j \leq M-1$ and is calculated in accordance with formula (33).

$$m_{i,k} = \frac{1}{2M} \sum_{j=-M}^{M-1} x_{(i+j),k} \quad (32)$$

$$\sigma_{i,k}^2 = \frac{1}{2M} \sum_{j=-M}^{M-1} (x_{(i+j),k} - m_{i,k})^2 \quad (33)$$

If a time window corresponding to 2M frames is set in order to operate a statistical procedure in the local time period, as shown in FIG. 10, feature vectors as much as 2M are generated. The feature vector is generated by, as shown in FIG. 9, dividing one frame into 9 areas and equalizing in respect to each RGB pixel in each area, and is made from 27 elements. Therefore, when the time windows corresponding to 2M frames are set, 2M feature vectors are generated, and these feature vectors made from 2M frames can be expressed as a matrix with 2M rows and N columns. It should be noted that N is a number of elements of a feature vector generated per one frame. N can be expressed by N=3* n when n is an integer showing a number of sub windows upon dividing one frame. It should be noted that the number of the frames in the time window above is expressed by an even number such as 2M, however, it is not limited to be the even number and it can be an odd number.

$$\begin{pmatrix} x_{0,1} & x_{0,2} & x_{0,3} & x_{0,4} & x_{0,5} & x_{0,6} & \cdots & x_{0,N} \\ x_{1,1} & x_{1,2} & x_{1,3} & x_{1,4} & x_{1,5} & x_{1,6} & \cdots & x_{1,N} \\ \cdots & \cdots & \cdots & \cdots & \cdots & \cdots & \cdots & \cdots \\ x_{(2M-1),1} & x_{(2M-1),2} & x_{(2M-1),3} & x_{(2M-1),4} & x_{(2M-1),5} & x_{(2M-1),6} & \cdots & x_{(2M-1),N} \end{pmatrix} \quad (34)$$

The time window set in a next step is set at a position shifted as much as one frame. A time-series array of the multidimensional vectors generated from elements of the normalized local area primary color feature calculated in accordance with the formulas (31)-(33) is defined as a stored normalized feature.

Next, the stored feature area selection portion 36 reads and inputs the stored feature from the stored feature calculation portion 32 and the stored normalized feature from the stored feature normalization portion 34, and calculates standard deviation $\sigma_{i,k}$ for each of the elements of the multidimensional vector of the stored feature at a fixed segment of the array of each element (the feature vector generated from RGB primary colors of the local area) using the formulas (32) and (33). The same can be achieved by reading the stored normalized feature and the standard deviation from the stored feature normalization portion 34 to the stored feature area selection portion 36.

The stored feature area selection portion 36, as shown in a formula (35) below, multiplies the standard deviation $\sigma_{i,k}$ by each element $y_{i,k}$ and calculates an absolute value of it.

$$z_{i,k} = |y_{i,k} \cdot \sigma_{i,k}| = |x_{i,k} - m_{i,k}| \quad (35)$$

The stored feature area selection portion 36, from the statistics $z_{i,k}$ that are multiplication results between the calculated element and the standard deviation, selects multiple, for example 2, elements from the top in respect to each element per fixed segment. The fixed segments (time window or number of frames) for selecting the statistics $z_{i,k}$ can be determined independently from the time window upon calculating the element $y_{i,k}$ of the normalized local area primary color feature and they do not need to be the same. In this case, the number of frames included in the time window above is M'.

In other words, the feature vector in local time can be expressed as a matrix shown in a formula (36). Among the row elements of this matrix, P elements, for example P=2, are selected in a descending order, and P is a positive integer corresponding to the fixed number above.

As shown below, a matrix of the stored area feature is calculated by adding the matrix shown in the formula (36) to the selection mask shown in the formula (37).

$$Z_S = Z + Z_0 \quad (38)$$

$Z_S$: Stored area selection feature

The stored feature area selection portion 36, among the fixed segment above, outputs a multidimensional vector generated from the elements selected from the stored normalized features per element, as the stored area selection feature.

Upon this operation, the stored feature area selection portion 36 operates procedures of sending the calculated stored area selection feature directly to the feature comparison portion 37 or of registering it at the stored area selection feature data base 38 once.

In a case that the feature comparison portion 37 compares the stored area selection feature and the target area selection feature in real time, the stored feature area selection portion 36 outputs the stored area selection feature of the inputted stored image signal. In a case that data of the stored image signal is registered at the stored area selection feature data base 38, the stored feature area selection portion 36, without sending the stored area selection feature to the feature comparison portion 37, registers it at the stored area selection feature data base 38 corresponding to, for example, a name of a provider of an image advertisement, a program name or a title of a movie.

The target feature calculation portion 31 reads the specified target image signal and outputs it (step U5), and operates a feature extraction on the input target image signal.

In this operation, the target feature calculation portion 31, as with the stored feature calculation portion 32, based on time-series data of the target image, for example, divides one frame of the target image into 3 vertically and horizontally $$Z = \begin{pmatrix} z_{i,1} & z_{i,2} & z_{i,3} & z_{i,4} & z_{i,5} & z_{i,6} & \cdots & z_{i,N} \\ z_{i+1,1} & z_{i+1,2} & z_{i+1,3} & z_{i+1,4} & z_{i+1,5} & z_{i+1,6} & \cdots & z_{i+1,N} \\ \cdots & \cdots & \cdots & \cdots & \cdots & \cdots & \cdots & \cdots \\ z_{i+(M'-1),1} & z_{i+(M'-1),2} & z_{i+(M'-1),3} & z_{i+(M'-1),4} & z_{i+(M'-1),5} & z_{i+(M'-1),6} & \cdots & z_{i+(M'-1),N} \end{pmatrix} \quad (36)$$

Such selection can be operated by adding a matrix (selection mask) in which the elements corresponding to the selected (M'×P) elements are "0" and other elements are ($-z_{i,k}$). For example, the selection mask for selecting $z_{i,1}$, $z_{i,3}$, $z_{i+1,2}$, $z_{i+1,N}$, $z_{1+(M'-1),2}$, $z_{1+(M'-1),3}$ is such as shown below.

and 9 areas totally, and calculates average values of pixels of RGB colors in the divisions (areas) respectively. A multidimensional vector having totally 27 dimensions generated from average values of RGB in 9 areas is extracted as a target feature (step U6).

$$Z_0 = \begin{pmatrix} 0 & -z_{i,2} & 0 & -z_{i,4} & -z_{i,5} & -z_{i,6} & \cdots & z_{i,N} \\ -z_{i+1,1} & 0 & -z_{i+1,3} & -z_{i+1,4} & -z_{i+1,5} & z_{-i+1,6} & \cdots & 0 \\ \cdots & \cdots & \cdots & \cdots & \cdots & \cdots & \cdots & \cdots \\ -z_{i+(M'-1),1} & 0 & 0 & -z_{i+(M'-1),4} & -z_{i+(M'-1),5} & -z_{i+(M'-1),6} & \cdots & -z_{i+(M'-1),N} \end{pmatrix}. \quad (37)$$

Moreover, extraction methods of the target feature include a MPEG encoding method (including movement compensation, DCT and variable length coding) and a method using amplitude component of Fourier transform that is a compression technology for moving digital pictures.

The target feature normalization portion 33 reads the target feature from the target feature calculation portion 31, and calculates an average value and a standard deviation of a predetermined and fixed division in respect to each element of the feature vector of this target feature.

In other words, the target feature normalization portion 33, as with the stored feature normalization portion 34, defines an array of multidimensional vectors in time-series (in an order expressed by k) calculated in accordance with the formulas (31)-(33) as a target normalized feature (step U7).

Next, the target feature area selection portion 35 reads and inputs the target feature from the target feature calculation portion 31 and the target normalized feature from the target feature normalization portion 33, as with the stored feature area selection portion 36, multiplies the standard deviation $\sigma_{i,k}$ in each element calculated in a fixed segment of the target feature and defines the multiplication result as a statistic. The same can be achieved by reading the target normalized feature and the standard deviation from the target feature normalization portion 33 to the target feature area selection portion 35.

The target feature area selection portion 35, among the fixed segment above, selects two largest elements from the statistics above, and outputs a multidimensional vector generated from the elements selected from the target normalized features per element, as the target area selection feature (step U8).

The feature comparison portion 37 reads the target area selection feature and the stored area selection feature output from the target feature area selection portion 35 and the stored feature area selection portion 36 respectively.

The feature comparison portion 37 inputs the target image signal and the stored image signal simultaneously, except for determining the similarity in real time, and reads the stored area selection features for comparison from the stored area selection feature data base 38 one by one.

In this case, the feature comparison portion 37, with respect to the stored area selection feature, sets the array of the feature vectors having the same length as the target area selection feature given at the target feature area selection portion 35 as the comparison segment.

That is, the feature comparison portion 37 sets the target area selection feature generated from the multiple fixed divisions above as the comparison segment, in the stored area selection features, applies the length of the array generated from the same number of the fixed regions as the target area selection feature to the comparison segment corresponding to the target area selection feature, and compares both comparison segments in accordance with the degree of similarity one by one.

The feature comparison portion 37 calculates the degree of similarity for detection between the target area selection feature and a comparison area in the comparison segment of the stored area selection feature in accordance with formula (39) below. The comparison segment (time window or number of frames) used at the feature comparison portion 37 can be determined independently from the time segment (time window) used at the stored area selection portion 36 or the target area selection portion 35 and the time segment (time window) used at the stored or target feature normalization portion 33, and it does not need to be the same time segment.

The feature comparison portion 37 calculates the Euclid distance between the normalized local area primary color features $y_{q\_1,k}$ of the target area selection feature and $y_{s\_1,k}$ of the stored area selection feature if they match in the comparison segment, sums up values calculated by multiplying a predetermined fixed value "a" to a number of elements that do not match, and outputs them as the degree of similarity for detection S (step U9).

It should be noted that in respect to the selection mask for generating the stored area selection feature and the target area selection feature, if the elements having the same i and k (the elements at the same position) are "0", then the elements are called "matched", and other elements are called "unmatched".

$$S = \sum_{k=q\cap s} (y_{q\_i,k} - y_{s\_i+r,k})^2 + \qquad (39)$$

$$a(\max(|q|, |s|) - |q \cap s|) \; x \cap y\text{:Elements common in } x \text{ and } y$$

"q" and "s" are a selected point of an area in the target feature and a selected point of an area in the stored feature respectively, and "r" is an integer which means that it is appropriate even when the frame numbers at the target feature and the stored feature are not the same. It is possible that "a" is, for example, the maximum value of differences of the Euclid distances of $y_{i,k}$, that is, a square of the quantization level number of $y_{i,k}$. "x" is a number of elements in a selected point of areas, and max(x, y) is defined as a following formula.

$$\max(x, y) = \begin{cases} x & (x \geq y) \\ y & (\text{otherwise}) \end{cases} \qquad (310)$$

For example, if the target area selection feature has 15 seconds length, then the feature comparison portion 37 extracts 150 feature vectors in all at intervals of 0.1 second as the elements of the array. The image in the frame is divided at each sampling and an average number of pixels is calculated for each RGB, therefore, two from 4050 dimensions (150× 27) made from these vectors from the top of the strength of RGB colors in each area (extracted by the target feature area selection portion 35) are applied as the target vectors used for comparing which are the multidimensional vectors including 54 elements.

As with the target vector described above, the feature comparison portion 37 sets comparison segments applying 15 seconds as one unit from the top of data in the stored area selection feature, extracts 150 feature vectors in all at intervals of 0.1 second from the array of the feature vectors, applies the highest two strengths of RGB colors (extracted by the stored feature area selection portion 36) in each area from 150×27=4050 dimensions generated from them because the image of the frame is divided at each sampling and an average number of pixels of each RGB and generates a multidimensional vector generated from 54 elements as a stored vector for comparison.

The feature comparison portion 37 compares the target area selection feature and the stored area selection feature. In other words, using the formula (39), the degree of similarity for detection S between the target vector and the stored vector above is calculated and compared with a predetermined search threshold (step U10). After comparing, if the degree of similarity for detection S calculated in accordance with the formula (39) is larger (less similarity) than the predetermined search threshold, then a feedback procedure is operated by shifting the time window (step U11).

In step U11, the degree of similarity for detection S between the target vector and the stored vector above is calculated along with shifting the comparison segment (fir example, shifting frames one by one) gradually from the top of the stored area selection feature. After operating the comparison procedure between the target area selection feature and the stored area selection features up to the end of the stored area selection features, if the areas of the stored area selection features with the degree of similarity for detection S at each comparison segment lower than the predetermined search threshold are detected, then this comparison segment is output as the search result (step U12).

It should be noted that a number of frames of the target image signal does not need to be same as a number of frames of the stored image signal upon comparing.

As explained above, in the embodiment of the present invention, the comparison is operated by selecting only elements with statistically strong features from the stored image signal and the target image signal.

It can be appropriate for the feature comparison portion 37 to output the area of the comparison segment of the stored area selection feature with the lowest degree of similarity for detection in the comparison results as a search result.

It is possible that if the multiple comparison segments have degrees of similarity lower than the search threshold, then the feature comparison portion 37 outputs the highest N (from the bottom) comparison segments in respect to the degree of similarity.

It can be appropriate that if no comparison segment is lower than the search threshold, then the feature comparison portion 37 notifies the information indicating no such area, reads new stored area selection features of the stored image signal from the stored area selection feature data base 38, and operates search procedures after step U9 continuously until the stored area selection feature including the comparison segment lower than the search threshold above is detected.

It is recommended to install the target feature calculation portion 31, the target feature normalization portion 33 and the target area selection portion 35 in FIG. 5 into user terminals (for example, personal computers) of all users beforehand, and to provide the image signal detection server including the stored feature calculation portion 32, the stored feature normalization portion 34, the stored feature area selection portion 36, the feature comparison portion 37 and the stored area selection feature data base 38 at a service provider distributing the images.

The structure is designed such that the target area selection features are generated from the image signals as the target image signals which the user receives with their cellular phones with a video camera and the like, these target area selection features are sent to the image signal detection server above via the Internet and the like, and it is requested to search for the stored image signals similar to these target area selection features. In this case, the same regulations, such as the length of the array of the feature vectors of the fixed segment for calculating the stored area selection features and the target area selection features, are applied to both the image signal detection server and the terminals beforehand.

Next, an embodiment to which the image signal search system above is applied is explained. The image signal search system of the present invention, using piecemeal image signals including reflections or interruptions recorded in the real world, can be applied to a search for images that match the image signals and operate an information search.

For example, the user receives the CM from a big screen on a street using a cellular phone including a video camera and transmits it to an image signal search service and the like. It is possible to have a configuration such that a image signal search service provider searches for images similar to or the same as this image signal from a data base, and provides information related to the image (for example, product information, product characteristics, a service, a filmed location, actors, homepages and the like) to the user requiring a fee or for free.

In an input method of the image, it is preferable that the image to be searched for is recorded by setting a finder or a screen of a terminal with a video camera to a frame of the image to be recorded (the target image signal), or by specifying a range in moving image frames of recorded images in accordance with a menu operation or a manual trace using a pen-based input and the like.

Moreover, by applying the present invention, it is possible to search for images of a home video dubbed many times or images with low bit rate which are difficult to search for in prior arts, therefore, it is broadly applicable to a copyright management system for moving pictures on the Internet, a CM (a commercial film, a TV advertisement and the like) information search service and the like.

For other cases, it may be applied to, using an image of a moving picture filmed by a user with a video camera, cutting and editing a clip which is similar to the image and which is included in a distributed movie or a distributed program.

Fourth Embodiment

Hereafter, a fourth embodiment of the present invention is explained referring to the figures.

Figure 11:
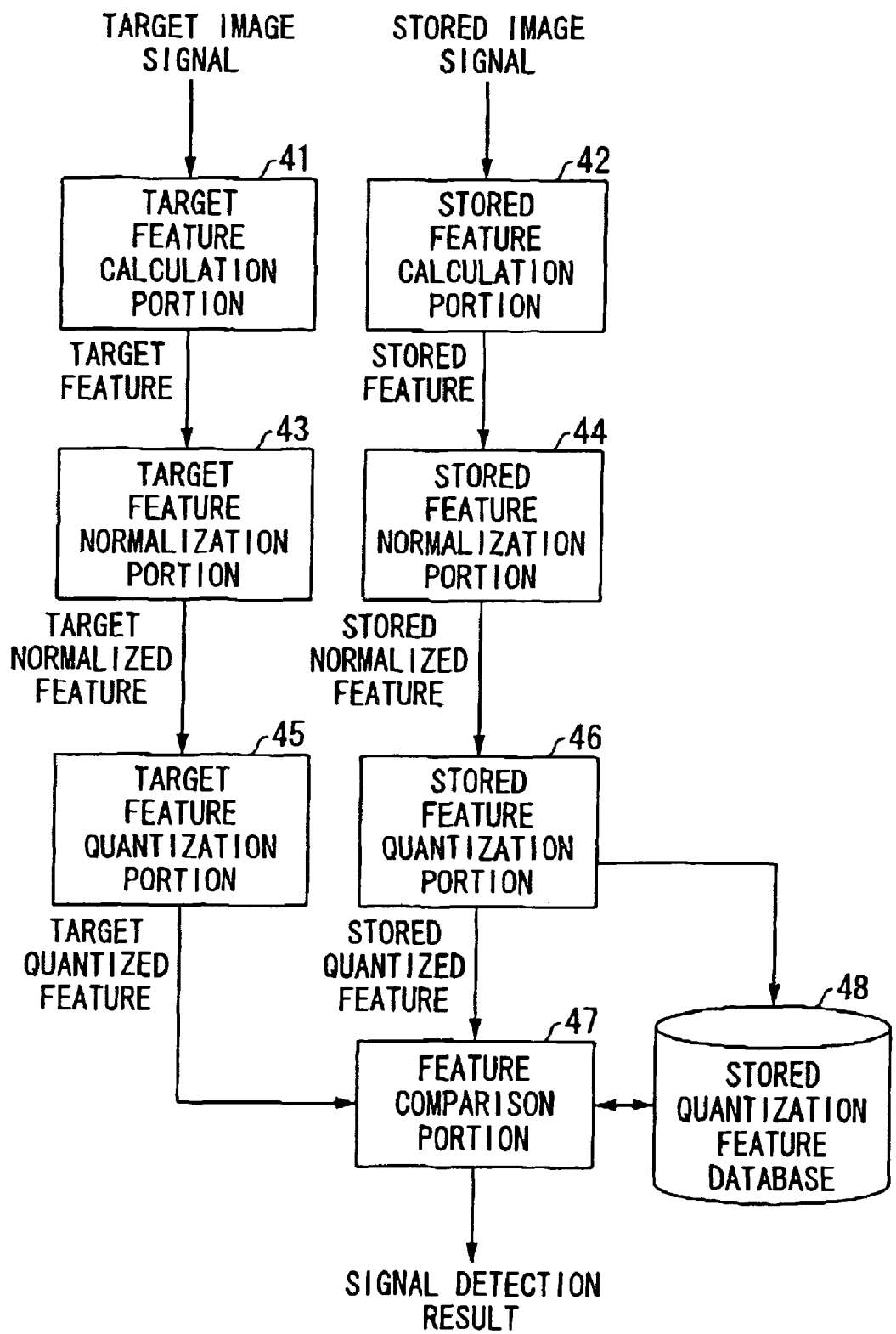
FIG. 11 is a block diagram of a structure example of an image signal search system in one embodiment of the present invention.

FIG. 11 is a block diagram of a structure of an image signal search system in one embodiment of the present invention applied to image signals with high accuracy against a reflection or an interruption.

The image signal detection system shown in FIG. 11 realizes signal detection applied to the image signals with high accuracy against reflections or interruptions, and is constructed from a target feature calculation portion 41, a stored feature calculation portion 42, a target feature normalization portion 43, a stored feature normalization portion 44, a target feature quantization portion 45, a stored feature quantization portion 46, a feature comparison portion 47, and a target quantization feature database 48, inputs stored time-series signals which are required to be searched for and a target time-series signal which is to be searched for, and outputs parts of time-series signals similar to the target time-series signals.

The target time-series signals are discrete data and are calculated by sampling the target sound signals with a predetermined interval in accordance with time-series. The target feature calculation portion 41 inputs the target image signal, obtains feature vectors by generating multidimensional vectors from the features extracted from the target time-series signals, and calculates target features constructed from the feature vectors.

The stored time-series signals are discrete values and are calculated by sampling the stored image signals with a predetermined interval in accordance with time-series. Similar to the target feature calculation portion 41, the stored feature calculation portion 42, for example extracts power spectrum values and the like per frequency for each of samplings from the stored time-series signal as the features, obtains feature vectors by generating multidimensional vectors from the extracted features, and calculates stored features constructed from the feature vectors.

The target feature normalization portion 43, based on the above-described target features, using statistics (target statistics) calculated from target features of surroundings including a neighboring area close to the target feature, normalizes elements of the feature vectors independently and respectively, and calculates target normalized features including feature vectors constructed from normalized values.

The stored feature normalization portion 44, based on the above-described stored features, using statistics (stored statistics) calculated from stored features of surroundings including a neighboring area close to the stored feature, normalizes elements of the feature vectors independently and respectively, and calculates stored normalized features including feature vectors constructed from normalized values.

It should be noted that "neighboring" in "neighboring stored features to the stored features" expressed above, for example, corresponds to "at a discrete time of day before or after" upon expressing frames at a discrete time of day before or after the frame which is a frame of the discrete time of day taken by sampling from the image signal in accordance with the time of day. Using the example above, "multiple stored features of surroundings" corresponds to "at a discrete time of day".

The target feature quantization portion 45 operates a scalar quantization on each element of the above-described target normalized feature using the same or independently predetermined threshold, and calculates a target quantized feature constructed from a multidimensional vector including elements having values calculated by this quantization.

The stored feature quantization portion 46 operates a scalar quantization on each element of the above-described stored normalized features using the same or respectively prepared threshold, and calculates a stored quantization feature constructed from a multidimensional vector including elements having values calculated by this quantization.

It should be noted that a degenerated vector of the stored feature and a degenerated vector of the target feature are vectors calculated in same manner as above.

The predetermined threshold above for the quantization can be calculated by binarizing the target normalized features and the stored normalized features, and applying a point minimizing a mean square error between representative values of codes and an original element value. As a representative value, for example, for two codes, a value which is as large as the threshold plus 1 is applied to one of them, and a value which is as large as the threshold minus 1 is applied to another.

The feature check portion 47 sets a predetermined range in the stored quantization features above as a comparison segment, sets a comparison segment to be compared having the same length as the comparison segment in the target quantization features, calculates the degree of similarity between the comparison segment and the comparison segment to be compared, compares it to a predetermined search threshold, and detects whether or not they are similar.

The feature check portion 47, after the comparison procedure of the comparison segment above, in order to set a new comparison segment, operates shifting to a neighboring region with the same time width in the array.

The stored quantized feature data base 48 stores the stored quantization features calculated beforehand with the stored feature calculation portion 42, the stored feature normalization portion 44, and the stored feature quantization portion 46, corresponding to the titles. Using an example of applying multiple CM (Commercial Message) images as the stored image signals, the stored quantized feature data base 48 stores the stored quantized features calculated beforehand in correspondence with CM provider names.

In this example, the stored quantized feature data base 48 stores the stored quantized features calculated beforehand, however, it is appropriate to provide a data base for storing the stored image signals (original image signals).

Figure 12:
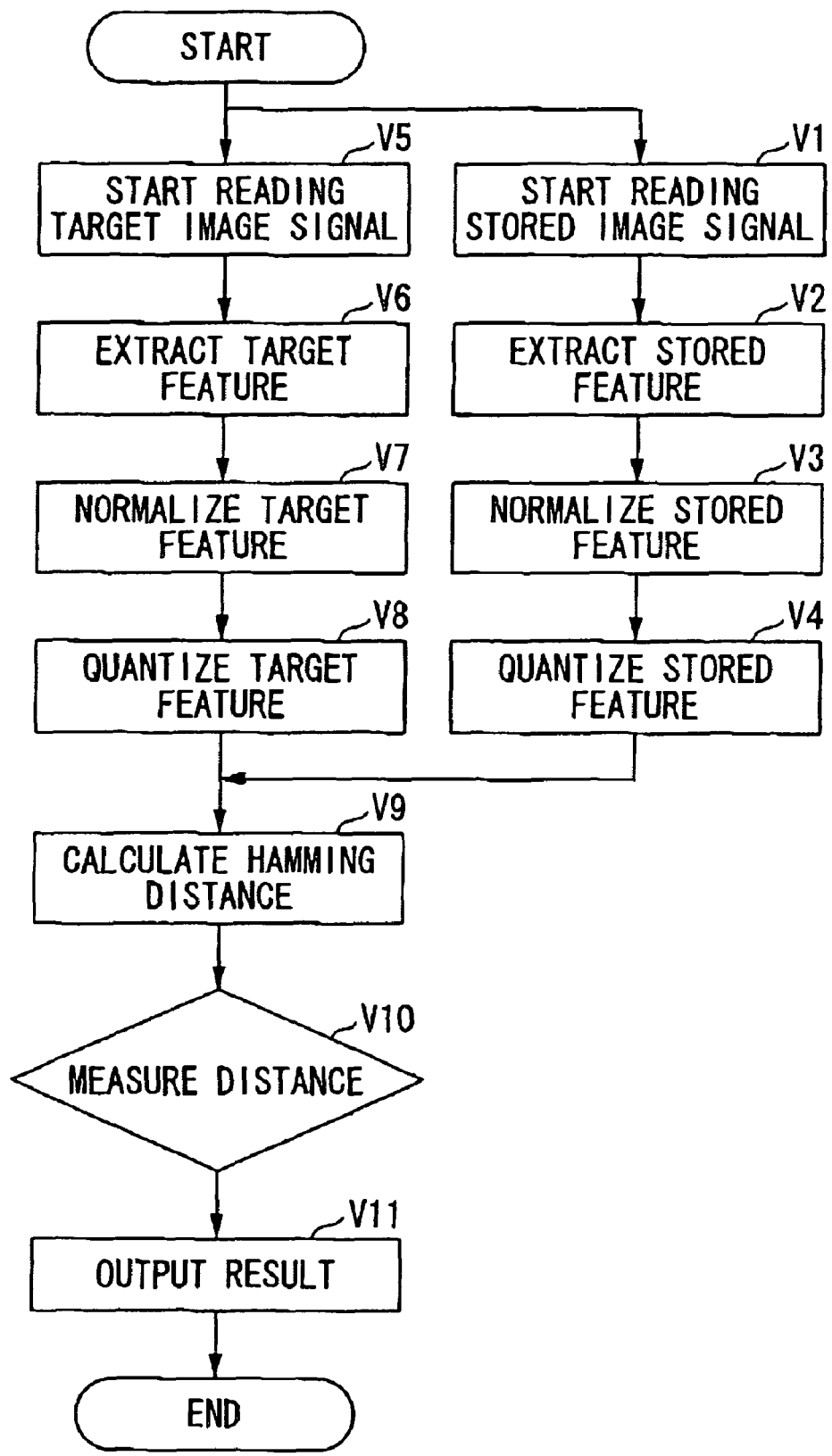
FIG. 12 is a flowchart showing an example of operation of the image signal search system shown in FIG. 11.

Next, referring to the figures, the operation of the image signal search system in this embodiment is explained. FIG. 12 is a flowchart showing an example of operation of the image signal search system shown in FIG. 11.

In the following explanation, an embodiment is explained using information of average values of each color of R (Red) G (Green) B (Blue) in multiple regions divided from one frame.

In FIG. 12, the stored feature calculation portion 42 reads the specified stored image signal and outputs it (step V1), and operates a feature extraction on the input stored image signal.

In this operation, the stored feature calculation portion 42, based on time-series data of the stored image divides one frame of the stored image into n areas (for example, 3 vertically and horizontally, and 9 areas totally) and calculates average values of pixels of RGB colors in the divided areas respectively.

Figures 13, 14:
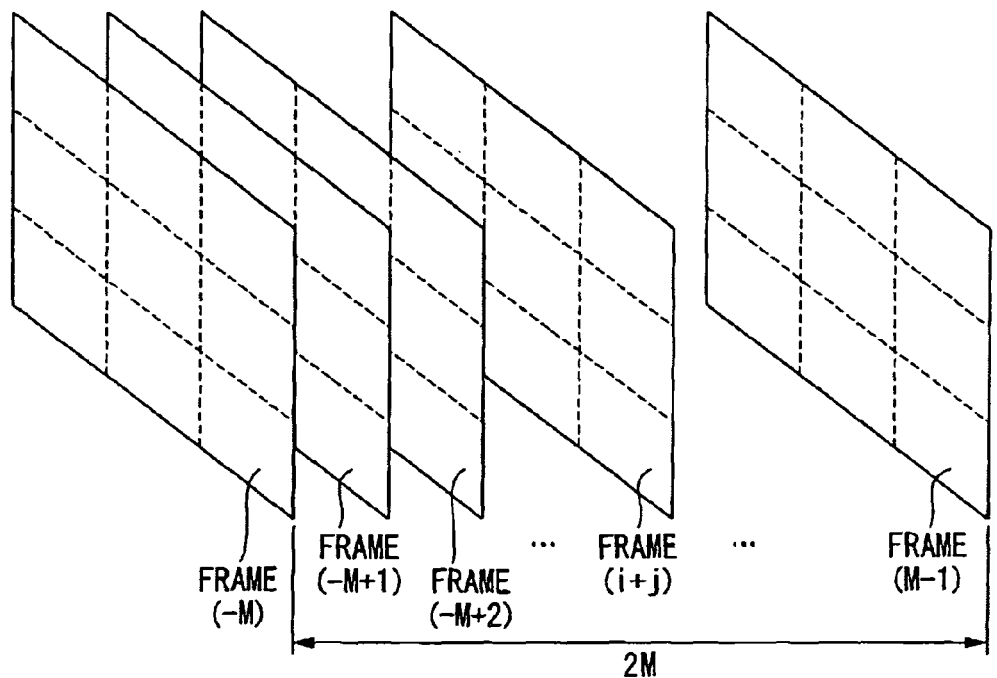
FIG. 13 is a figure for explanation of the relationship between a time window and frames in the image signal search system in one embodiment of the present invention.
FIG. 14 is a figure of a sub screen of the image signal search system in one embodiment of the present invention.

That is, when setting 2M frames from a frame (−M) to a frame (M−1) as shown in FIG. 13, in a frame 0 (0 is a relative number among the frames of the time window and it is a 0-th frame) among them, as shown in FIG. 14, the frame is divided into n sub-windows. An average value ($x_{i,1}$, $x_{i,2}$m $x_{i,3}$) of pixels of each color of RGB in a first sub window of the 0-th frame is calculated, an average value ($x_{i,4}$, $x_{i,5}$, $x_{i,6}$) of pixels of each color of RGB in a second sub window is calculated, an average value ($x_{i,7}$, $x_{i,8}$$x_{i,9}$) of pixels of each color of RGB in a third sub window is calculated, and in the following, similarly an average value ($x_{i,(3n-2)}$, $x_{i,(3n-1)}$, $x_{1,3n}$) of pixels of each color of RGB in a n-th sub window is calculated. A first suffix is a serial number assigned to all frames, and a second suffix is the number of elements in the frame. The first suffix can be expressed as (i+j), which is a sum of the serial number i assigned to all frames and j that shows a relative position against the i-th frame.

Therefore, for example, in a case of n=9, a number of dimensions are calculated in respect to each frame (3×9=27), and a multidimensional vector having 27 dimensions calculated in such manner is extracted and is the stored feature. Such multidimensional vectors are called local area primary color features. In this example, the above-described $x_{i,1}$ and the like are elements of the local area primary color features.

Moreover, there are extraction methods of the stored feature include a MPEG (Moving Picture Coding Experts Group) encoding method (including movement compensation, DCT (Discrete Cosine Transform) and variable length coding) and a method using an amplitude component of Fourier transform that is a compression technology for moving digital pictures.

The stored feature normalization portion 44 reads the stored feature from the stored feature calculation portion 42, and calculates an average value and a standard deviation of a predetermined and fixed division in respect to each element of the feature vector of this stored feature.

For example, the stored feature normalization portion 14 calculates an average value and a standard deviation from a value of a certain time division per each color of RGB, and normalizes using the calculated average value and standard deviation.

A k-th element of a local area primary color feature $y_{i,k}$ after normalization by the stored feature normalization portion 44, called a normalized local color feature, is shown as formula (41).

$$y_{i,k} = \frac{1}{\sigma_{i,k}}(x_{i,k} - m_{i,k}) \quad (41)$$

$$m_{i,k} = \frac{1}{2M}\sum_{j=-M}^{M-1} x_{(i+j),k} \quad (42)$$

$$\sigma_{i,k}^2 = \frac{1}{2M}\sum_{j=-M}^{M-1}(x_{(i+j),k} - m_{i,k})^2 \quad (43)$$

It should be noted that in the formula (42), $x_{(i+j),k}$ is a k-th element of the local area feature of the (i+j)th frame when serial numbers are appended to all frames. "j" is a relative number to a center frame in the frames of a predetermined time period, j is an integer and satisfies $-M \leq j \leq M-1$ when 2M frames are included in the predetermined time period. "i" is a serial number of the center frame of the frames in the predetermined time period, and is the same as the serial number when j=0. "$m_{ik}$" is an average value of $x_{(i+j),k}$ which satisfies $-M \leq j \leq M-1$. "$\sigma_{ik}$" is a standard deviation in respect to $x_{(i+j),k}$ which satisfies $-M \leq j \leq M-1$ in formula (43).

One frame is specified as a center frame, a statistical operation (normalization) is operated using the local area prime color features of the frames before and after the center frame, and the local area prime color feature of the center frame is calculated. By shifting frames one by one upon specifying the center frame, the local area prime color feature can be calculated for all frames. This step is a step of mapping the local area prime color feature to a normalized local area feature. The mapping of the stored feature is called a normalized stored feature Y (step V3).

$$Y = (y_{i,1}, y_{i,2}, y_{i,3}, \ldots, y_{i,N}) \quad (44)$$

It should be noted that N is a number of elements of a feature vector generated per one frame. N can be expressed by N=3*n when the frame is divided by n.

Next, the stored feature quantization portion 46 reads and inputs the stored feature from the stored feature normalization portion 44, and quantizes per element of the multidimensional vector of the stored normalized feature using a threshold larger than or equal to 1.

For example, the threshold is expressed as $t_1, t_2, \ldots, t_R$, and by quantizing the vector Y shown in the formula (44), using R thresholds as shown below, $Y_{i,k}$ is (R+1)-ary coded.

$$z_{i,k} = \begin{cases} 0 & y_{i,k} \leq t_1 \\ 1 & t_1 < y_{i,k} \leq t_2 \\ \vdots & \vdots \\ R-1 & t_{R-1} < y_{i,k} \leq t_R \\ R & t_R < y_{i,k} \end{cases} \quad (45)$$

Hereafter, in order to explain simply, it is explained in a case of binary coding (binarization) by using a threshold t. Binary coding by using the threshold t is as shown below.

$$z_{i,k} = \begin{cases} 0 & y_{i,k} \leq t \\ 1 & y_{i,k} > t \end{cases} \quad (46)$$

The matrix shown in the formula (44) is binary coded using the threshold t and it is defined as a quantized feature Z, then the quantized feature Z is expressed as below.

$$Z = (z_{i,1}, z_{i,2}, z_{i,3}, \ldots, z_{i,N}) \quad (47)$$

The stored feature quantization portion 46 outputs this multidimensional vector Z or a new multi dimensional vector generated by a time series of the multidimensional vectors (that is, Z for multiple frames), as the stored quantized feature (step V4).

The stored feature quantization portion 46 directly sends the calculated stored quantization features to the feature comparison portion 47 or registers them to the stored quantized feature data base 48.

When the feature comparison portion 47 compares the stored quantized features with the target quantized feature in real time, the stored feature quantization portion 46 outputs the inputted stored quantized features of the stored image signals to the feature comparison portion 47.

When data of the stored image signals is stored in the stored quantized feature data base 48, the stored feature quantization portion 46 stores the image quantization features into the stored quantized feature data base 48 corresponding to, for example, the provider name of a movie advertisement, a program title or a movie title without outputting to the feature comparison portion 47.

The target feature calculation portion 41 reads the specified target image signal and outputs it (step V5), and operates a feature extraction on the input target image signal.

In this operation, the target feature calculation portion 41, as with the stored feature calculation portion 42, based on time-series data of the target image, for example, divides one frame of the target image into n areas (for example, 3 vertically and horizontally and 9 areas totally), and calculates average values of pixels of RGB colors in the divided areas respectively.

A multidimensional vector having, for example, 27 dimensions (when n=9) generated from average values of RGB in each area is extracted as a target feature (step V6).

Moreover, extraction methods of the target feature include a MPEG encoding method (including movement compensation, DCT and variable length coding) and a method using an amplitude component of Fourier transform that is a compression technology for moving digital pictures.

The target feature normalization portion 43 reads the target feature from the target feature calculation portion 41, and calculates an average value and a standard deviation of a predetermined and fixed division in respect to each element of the feature vector of this target feature.

In other words, the target feature normalization portion 43, as with the stored feature normalization portion 44, defines an array of multidimensional vectors in time-series (in an order expressed with k) calculated in accordance with the formulas (41)-(43) as a target normalized feature (step V7).

Next, the target feature quantization portion 45 reads and inputs the target feature from the target feature normalization portion 43, generates a matrix shown in the formula (44), for example, quantizes into binary using the formula (46) per the elements of this matrix using a predetermined threshold as a boundary, and calculates the quantized feature shown in the formula (47) as with the stored feature quantization portion 46. This quantized feature is output as the target quantized feature (step V8).)

Next, the feature comparison portion 47 reads the target quantized feature and the stored quantized features calculated by the target feature quantization portion 45 and the stored feature quantization portion 46 respectively.

The feature comparison portion 47 inputs the target image signal and the stored image signal simultaneously, except for determining the similarity in real time, and reads the stored quantized features for comparison from the stored quantized feature data base 48 one by one.

In this case, the feature comparison portion 47, in respect to the stored quantized feature, sets an array of the target vector having the same length as the target quantized feature given by the target feature quantization portion 45 as the comparison segment.

The feature comparison portion 47 calculates the degree of similarity between the target quantized feature and the stored quantized feature in the comparison segment above. As the degree of similarity, the Hamming distance between both feature vectors is calculated (step V9).

The feature comparison portion 47 extracts elements from multiple parts of the array of the feature vectors of the target quantized features and they are defined to be the feature vector as the elements of the array.

For example, if the target quantized feature has 15 seconds length, then 150 feature vectors are extracted in all at intervals of 0.1 second as the elements of the array. The image in the frame is divided at each sampling and an average number of pixels is calculated for each RGB, therefore, 4050 dimensions (150×27) made from these vectors are applied as the target vectors used for comparing at the feature comparison portion 47.

As with the target vector described above, the feature comparison portion 47 sets comparison segments applying 15 seconds as one unit from the top of data in the stored area selection feature, extracts 150 feature vectors in all at intervals of 0.1 second from the array of the feature vectors, divides the image of the frame at each sampling, and in order to calculate an average number of pixels of each RGB, applies a vector made from these vectors with 4050 dimensions (150×27) as a stored vector for comparing.

If the feature comparison portion 47 has the target vector by extracting the elements of multiple parts from the array of the feature vector of the target quantized feature, it can be appropriate for the target feature quantization portion 45 to extract the feature vector as an element of the array from the target normalized feature, that is, the target feature quantization portion 45 extracts 150 parts in all with 0.1 second intervals, operates the scalar quantization, and outputs as the target vector to the feature comparison portion 47.

The feature comparison portion 47 while shifting the comparison segment one by one from the top of the stored quantized features, operates a comparison procedure by calculating the Hamming distance to the target quantized feature, in other words, calculates the Hamming distance between the target vector above and the stored vector (step V10).

After comparing up to the end of the stored quantized features, referring to the Hamming distances, the feature comparison portion 47 outputs the area of the comparison segments with the minimum Ramming distance as the search result (step V11).

It can be appropriate that if a search threshold for the Hamming distance is given, the feature comparison portion 47 compares this search threshold and the Hamming distance of the selected comparison segment (step V10) and outputs only the area of the comparison segments lower than the search threshold as a search result (step V11).

It should be noted that regarding (R+1)-ary coding, in a case of not being two dimensional, the Lie distance defined next can be applied instead of the Hamming distance. It should be noted that in a next formula (48), $\| z_{q,i,k} - z_{sr,k} \|$ is a smaller one between $(z_{qi,k} - z_{sr,k}) \bmod (R+1)$ and $(z_{qi,k} - z_{sr,k}) \bmod (R-1)$. "r" is a mark introduced to express that they do not need to be the same frame numbers for q and s.

$$d_L = \sum_{(i,r)} \sum_{k=1}^{N} \| z_{q\_i,k} - z_{s\_r,k} \| \tag{48}$$

As described above, in the embodiment of the present invention, the stored feature and the target feature, made from the multidimensional vectors, are extracted from the stored image signal and the target image signal, the quantized feature is calculated by quantizing this multidimensional vector, and this stored quantized feature and the target quantized feature are compared by applying the Hamming distance.

It is possible that if the multiple comparison segments have Hamming distances lower than the search threshold, then the feature comparison portion 47 outputs the highest P (P is a predetermined positive integer) comparison segments (from the bottom) in respect to Hamming distance.

It is recommended that if no comparison segment is lower than the search threshold, then the feature comparison portion 47 notifies the information indicating no such area, reads new stored quantized features of the stored image signal from the stored quantized feature data base 48, and operates search procedures after step V9 continuously until the stored quantized feature including the comparison segment lower than the search threshold above is detected.

It can be appropriate to install the target feature calculation portion 41, the target feature normalization portion 43 and the target quantization portion 45 in FIG. 11 into user terminals (for example, personal computers) of all users beforehand, and to provide the image signal detection server including the stored feature calculation portion 42, the stored feature normalization portion 44, the stored feature quantization portion 46, the feature comparison portion 47 and the stored quantized feature data base 48 at a service provider distributing the images.

The structure is designed such that the target quantized features are generated from the image signals as the target image signals which are received by the users with their cellular phones provided with a video camera and the like, these target quantized features are sent to the image signal detection server above via the Internet and the like, and it is requested to search for the stored image signals similar to these target quantized features. In this case, the same regulations, such as the length of the array of the feature vectors of the fixed segment for calculating the stored quantized features and the target quantized features, are applied to both the image signal detection server and the terminals beforehand.

Next, an embodiment to which the image signal search system above is applied is explained. The image signal search system of the present invention, using piecemeal image signals including reflections or interruptions recorded in the real world, can be applied to search for images that match the image signals and operate an information search.

For example, the user receives the CM from a big screen on a street using a cellular phone including a video camera and transmits it to an image signal search service and the like. It is possible to have a configuration such that a image signal search service provider searches for images similar to or the same as this image signal from a data base, and provide information related to the image (for example, product information, product characteristics, a service, a filmed location, actors, homepages and the like) to the user requiring a fee or for free.

In an input method of the image, it is preferable that the image to be searched for is recorded by setting a finder or a screen of a terminal with a video camera to a frame of the image to be recorded (the target image signal), or by specifying a range in moving image frames of recorded images in accordance with a menu operation or a manual trace using a pen-based input and the like.

Moreover, by applying the present invention, it is possible to search for images of a home video dubbed many times or images with low bit rate which are difficult to search for in prior arts, therefore, it is broadly applicable to a copyright management system for moving pictures on the Internet, a CM (a commercial film, a TV advertisement and the like) information search service and the like.

For other cases, it may be applied to, using an image of a moving picture filmed by a user with a video camera, cutting and editing a clip which is similar to the image and which is included in a distributed movie or a distributed program.

Fifth Embodiment

Figure 15:
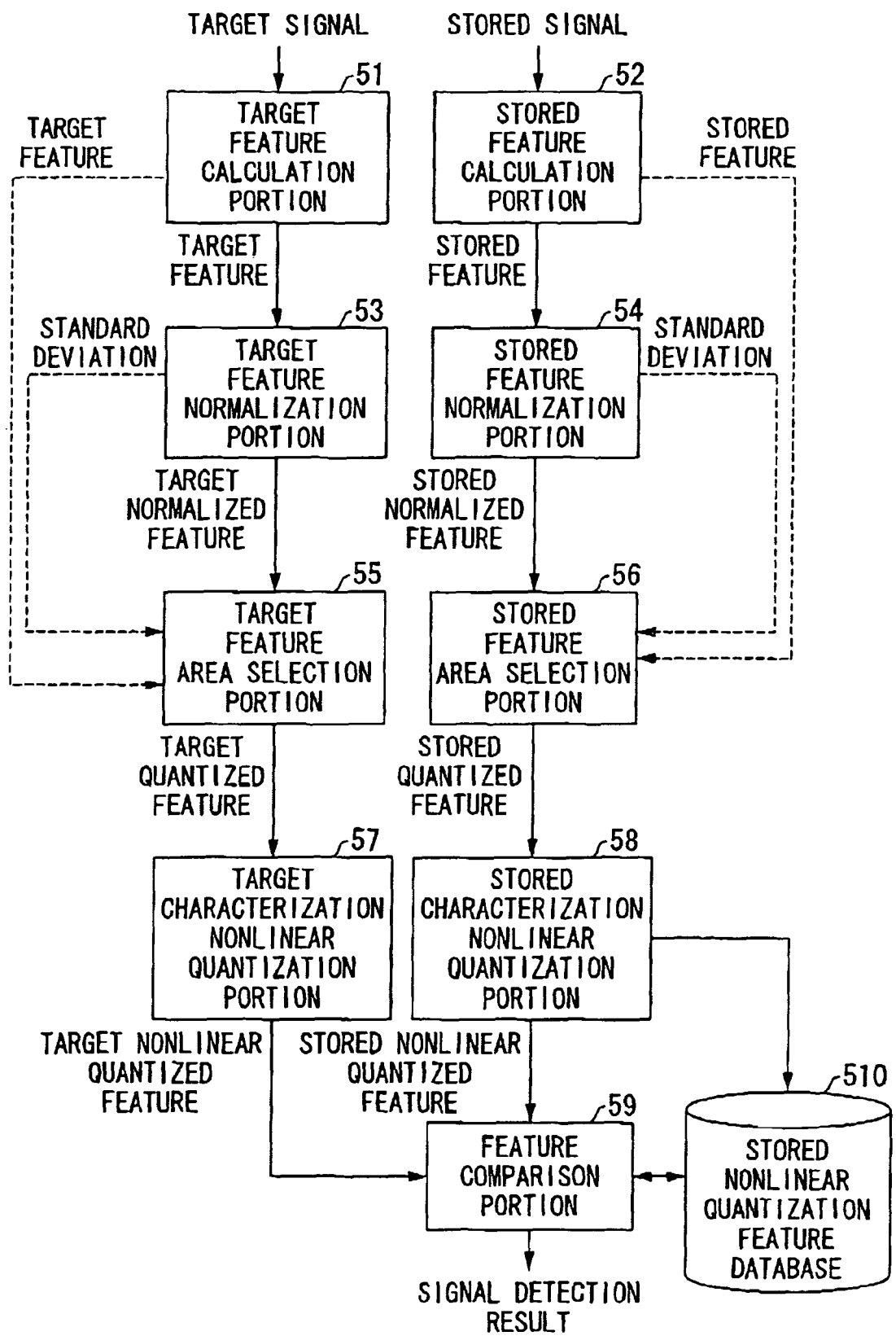
FIG. 15 is a block diagram of a structure example of a signal search system in one embodiment of the present invention.

FIG. 15 shows the fifth embodiment of the present invention and is a block diagram showing a structure of a highly accurate signal detection system with high accuracy against noises or distortions. Here, the signal is time series data, and is general data which can be played with a playback apparatus. For example, in respect to music, it is analog data that is the music itself, data recorded in a CD (Compact Disc), WAV file data, MP3 (MPEG-1 Audio Layer 3) file data and the like.

For example, in respect to images, it is data analog data that is the image itself, digital data represented by MPEG2 (Moving Picture Coding Experts Group 2) file data and the like. Here it is explained in respect to a case where a target signal for detection is the image signal and the sound signal.

The signal detection system shown in FIG. 15 realizes highly accurate signal detection with high accuracy against noise and distortions of the time series signals, and is constructed from a target feature calculation portion 51, a stored feature calculation portion 52, a target feature normalization portion 53, a stored feature normalization portion 54, a target feature area selection portion 55, a stored feature area selection portion 56, a target feature nonlinear quantization portion 57, a stored feature nonlinear quantization portion 58, a feature comparison portion 59, and a stored nonlinear quantization feature database 510, inputs stored time-series signals (stored signals) which are required to be searched for and a target time-series signal (target signal) which is to be searched for, and outputs parts of stored time-series signals similar to the target time-series signal. Based on the target signal, a search in the stored signal is operated, therefore, the target signal is shorter than the stored signal.

The target time-series signals are discrete values and are calculated by sampling the target sound signals with a predetermined interval in accordance with time-series. The target feature calculation portion 51, for example in a case of the sound signal, extracts power spectrum values per frequency for each of samplings from the target time-series signal, obtains feature vectors by generating multidimensional vectors from the extracted features, and calculates target features constructed from the feature vectors. In a case of the image signal, it divides a frame, extracts an average value of pixels in the divided area, calculates a feature vector by generating a multidimensional vector from the extracted feature, and calculates a target feature generated from this feature vector.

The stored time-series signals are discrete values and are calculated by sampling the stored signals with a predetermined interval in accordance with the time-series. Similar to the target feature calculation portion 51, the stored feature calculation portion 52, for example extracts power spectrum values per frequency for each of samplings from the stored time-series signal, obtains feature vectors by generating multidimensional vectors from the extracted features, and calculates stored features constructed from the feature vectors. In a case of the image signal, it divides a frame, extracts an average value of pixels in the divided area, calculates a feature vector by generating a multidimensional vector from the extracted feature, and calculates a stored feature generated from this feature vector.

The target feature normalization portion 53, based on the above-described target features, using statistics calculated from surrounding multiple target features including neighboring target features, normalizes elements of the feature vectors independently and respectively, and calculates target normalized features including multidimensional vectors constructed from normalized values.

The stored feature normalization portion 54, based on the above-described stored features, using statistics calculated from surrounding multiple stored features including neighboring stored features, normalizes elements of the feature vectors independently and respectively, and calculates stored normalized features including multidimensional vectors constructed from normalized values.

The target feature area selection portion 55 calculates predetermined statistics based on the above-described target normalized features, selects the element from the target normalized features if the statistic is larger than a predetermined threshold, and calculates a target area selection feature constructed from a multidimensional vector of the selected elements.

The stored feature area selection portion 56 calculates predetermined statistics based on the above-described stored features, selects the element from the stored normalized features if the statistic is larger than a predetermined threshold, and calculates a stored area selection feature constructed from a multidimensional vector of the selected elements.

Figure 16:
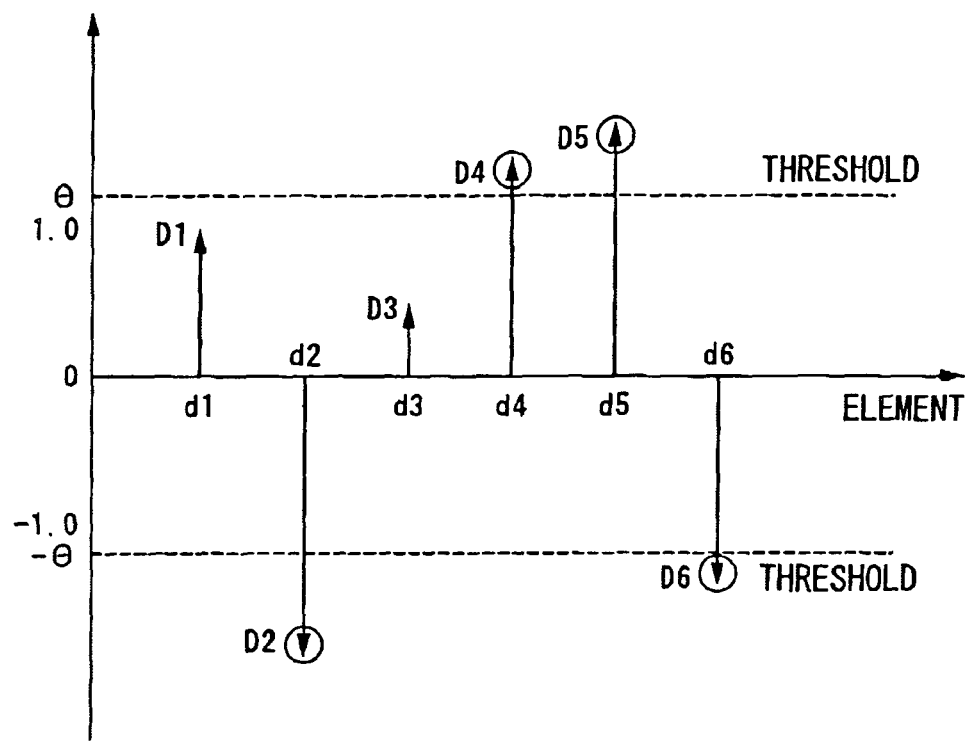
FIG. 16 is a graph used for an explanation of setting a threshold of the signal search system in one embodiment of the present invention.
Figure 17:
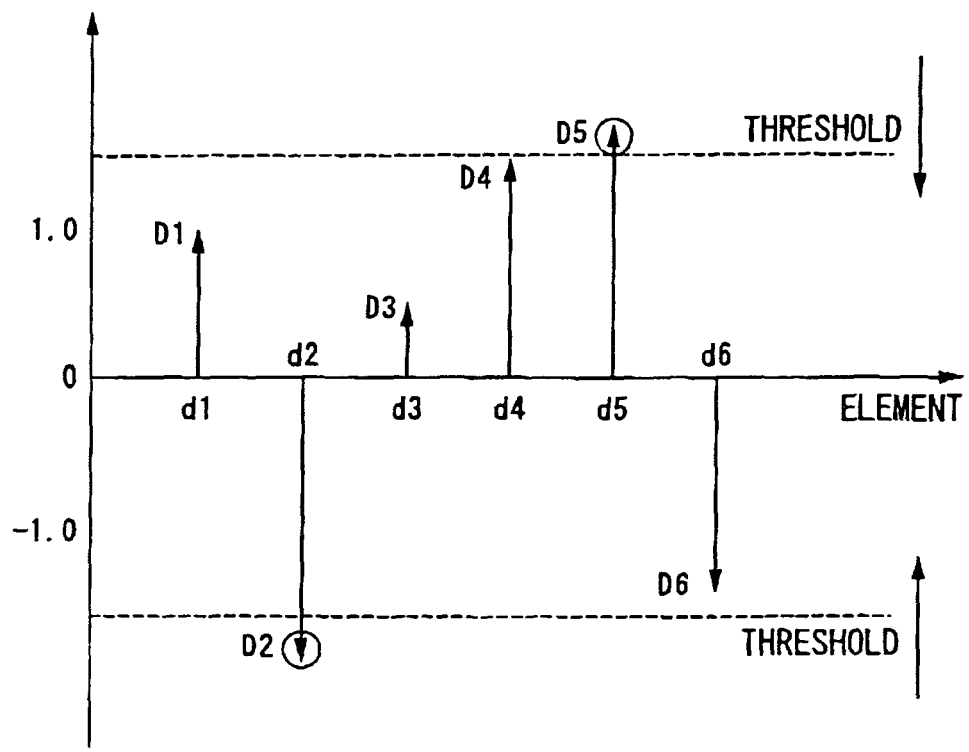
FIG. 17 is a graph used for an explanation of setting a threshold of the signal search system in one embodiment of the present invention.

Referring to FIG. 16 and FIG. 17, one threshold setting in the target feature area selection portion 55 and the stored feature area selection portion 56 is explained.

For example, when the elements with large absolute values of differences between values of elements of the normalized feature vector and a standard value (in this case, "0") calculated by a statistical operation are selected, it can be an idea to have the threshold that is an 80% value of the maximum value of the absolute value of the differences between the values of the elements of the normalized feature vector and "0", and to select the elements larger than the threshold from the elements.

In FIG. 16, the absolute values of the differences between the elements d1-d6 of the normalized feature vector and "0" are D1-D6. The maximum value of the absolute values D1-D6 of the differences is selected and the threshold is determined to be, for example, 80% of it.

As shown in FIG. 16, the maximum value of the absolute values of the differences is the absolute value D2 of the difference of the element d2. Therefore, $|\theta|$ is defined to be 80% of the absolute value of the difference from D2. That is, $$|\theta|=0.8*D2$$

The absolute values D1-D6 of the differences from the elements d1-d6 and the threshold $|\theta|$ are compared and extracted if larger than the threshold. The selected values are checked with circles.

In FIG. 16, the absolute value D2 of the difference of the element d2, the absolute value D4 of the difference of the element d4, the absolute value D5 of the difference of the element d5, and the absolute value D6 of the difference of the element d6 are larger than the threshold, therefore, these elements are selected as a pattern of the selected feature.

In this case, the threshold is defined to be 80% of the maximum value of the absolute values of the differences, however, this is an example, and it is not limited to be 80%

It can be appropriate to provide a lower limitation for each element beforehand and to operate to decrease the threshold gradually until the element satisfying the lower limitation (one or more than one) is selected. For example, in an example in FIG. 17, it shows a case of selecting the largest two elements and by decreasing the threshold gradually, and the absolute value D2 of the difference between the element d2 and "0" and the absolute value D5 of the difference between the element d5 and "0" that are maximum of the absolute values of the differences are selected as the pattern of the selected features.

It is appropriate for the target feature area selection portion 55 to calculate average values of each element of the feature vectors among a predetermined range in the array in respect to the target feature, select elements from the target normalized features if an absolute value of the element divided by the average value is larger than a predetermined threshold, and calculate the target area selection feature constructed from a multidimensional vector of the selected elements.

Similarly, it can be appropriate for the stored feature area selection portion 56 to calculate average values of each element of the feature vectors among a predetermined range in the array in respect to the stored features above, select elements from the stored normalized features if an absolute value of the element divided by the average value is larger than a predetermined threshold, and calculate the stored area selection feature constructed from a multidimensional vector of the selected elements.

The "array" above is an array in which the feature vectors are ordered one by one in the sampling in accordance with an order of sampling in time series, and "the feature vectors among a predetermined range" are the feature vectors in a predetermined time span (hereinafter, predetermined division) in the array.

It can be appropriate for, for example, the above-described threshold to be set to be 80% of a value which is the maximum value among absolute values of differences between values of the elements of the normalized feature vector and the average values if the elements having large absolute values of differences between values of the elements of the normalized feature vector and the average values are selected.

In this case, it can be appropriate to provide a lower limit for the elements and to operate to decrease the threshold gradually until the element larger than the lower limit is selected.

It can be appropriate for the target feature area selection portion 55 to calculate the target area selection features constructed from a multidimensional vector of the selected elements by inputting the target features and the target normalized features, calculating a standard deviation of each element of the feature vector in a predetermined range (a fixed division) in the array of the target features, multiplying the standard deviations above to the elements of the target normalized features at the corresponding position of the array, calculating the absolute value of the multiplied values as a statistic, and selecting the maximum element or multiple elements from the maximum element (for example, 2) from the target normalized features.

Similarly, it is recommended that the stored feature area selection portion 56 calculate the stored area selection features constructed from a multidimensional vector of the selected elements by inputting the stored features and the stored normalized features, calculating a standard deviation of each element of the feature vector in a predetermined range (a fixed division) in the array of the stored features, multiplying the standard deviations above to the elements of the stored normalized features at the corresponding position of the array, calculating the absolute value of the multiplied values as a statistic, and selecting the maximum element or multiple elements from the maximum element (for example, 2) from the stored normalized features.

The target feature nonlinear quantization portion 57, using Voronoi tessellation upon the target area selection feature, quantizes the feature vector based on a distance from one or more than one Voronoi boundary surfaces neighboring the Voronoi area to which the feature vector belongs. In this quantization, the distances from the Voronoi boundary surfaces are nonlinear-quantized by using a sigmoid function or a segmental linear function, and define a combination of quantized values as a target nonlinear quantized feature.

It is appropriate for a scalar nonlinear quantization to be operated on the elements of the vector of the target area selection feature using the sigmoid function or the segmental linear function, and the target nonlinear quantized feature, generated from a multidimensional vector including elements that are values to which the nonlinear quantization is operated in multiple gradations, is calculated.

As with the target feature nonlinear quantization portion 57, using Voronoi tessellation upon the stored area selection feature, the stored feature nonlinear quantization portion 58 quantizes the feature vector based on a distance from one or more than one Voronoi boundary surfaces neighboring the Voronoi area to which the feature vector belongs. In this quantization, the distances from the Voronoi boundary surfaces are nonlinear-quantized by using a sigmoid function or a segmental linear function, and define a combination of quantized values as a stored nonlinear quantized feature.

It is appropriate for a scalar nonlinear quantization to be operated on the elements of the vector of the stored area selection feature using the sigmoid function or the segmental linear function, and the stored nonlinear quantized feature, generated from a multidimensional vector including elements that are values to which the nonlinear quantization is operated in multiple gradations, is calculated.

In these target nonlinear quantization feature and the stored nonlinear quantization feature, respectively in a time-series order by sampling, the feature vectors obtained by sampling are arranged in arrays sequentially.

The feature check portion 59, in respect to the feature vectors which are arranged in an array of time series in the stored nonlinear quantization features above, sets a predetermined range of this array as a comparison segment, sets a comparison segment to be compared having the same length as the comparison segment in the target nonlinear quantization features, calculates the degree of similarity between the comparison segment and the comparison segment to be compared, compares it to a predetermined search threshold, and detects whether or not they are similar.

The feature check portion 59, after the comparison procedure of the comparison segment above, in order to set a new comparison segment, shifts to a neighboring region with the same time width in the array.

The stored nonlinear quantized feature data base 510, in respect to music, CM and the like distributed many times, stores the stored nonlinear quantization features calculated beforehand with the stored feature calculation portion 52, the stored feature normalization portion 54, the stored feature area selection portion 56 and the stored feature nonlinear quantization portion 58, corresponding to the titles or CM provider names.

In this example, the stored nonlinear quantized feature data base 510 stores the nonlinear quantized features calculated beforehand, however, it is appropriate to provide a data base for storing the stored signals (original signals).

Figure 18:
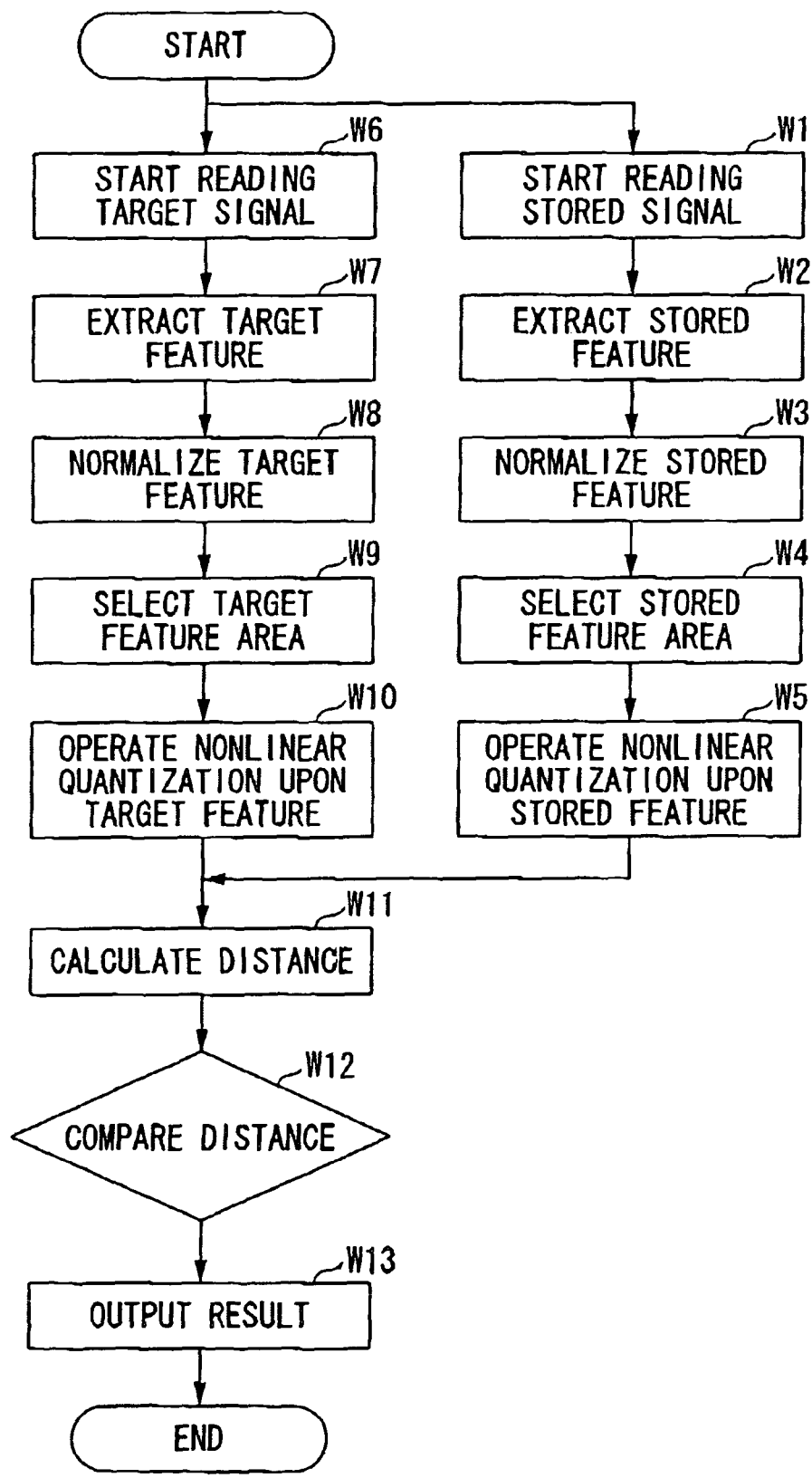
FIG. 18 is a flowchart showing an example of operation of the signal search system shown in FIG. 11.

Next, referring to the figures, the operation of the signal search system in this embodiment is explained. FIG. 18 is a flowchart showing an example of operation of the signal detection system shown in FIG. 15.

The stored feature calculation portion 52 reads the specified stored signal and outputs it (step W1), and operates a feature extraction on the input stored signal.

With respect to the feature extraction of the stored feature calculation portion 52, a case in which the input signal is the sound signal and another case in which the input signal is the image signal are shown below. When the sound signal is to be detected, the stored feature calculation portion 52, using the amplitude component of the Fourier-transformed sound signals, for example, sampled at 8000 Hz, operates Fourier transformation on a 1-second segment of the sound signals, divide 0-4000 Hz into 32 frequency band segments, and extracts a multidimensional vector with 32 dimensions per 0.1 second as a feature vector that is the stored feature and constructed from average power of the amplitude component in each segment (step W2).

When the image signal is to be detected, the stored feature calculation portion 52, based on time-series data of the stored image, for example, divides one frame of the stored image into 3 vertically and horizontally and 9 areas totally, and calculates average values of pixels of RGB colors in the divisions (areas) respectively. A multidimensional vector having a total of 27 dimensions generated from average values of RGB in 9 areas is extracted as a stored feature (step W2). In this case, the feature vector is generated per one frame.

Figures 19, 20:
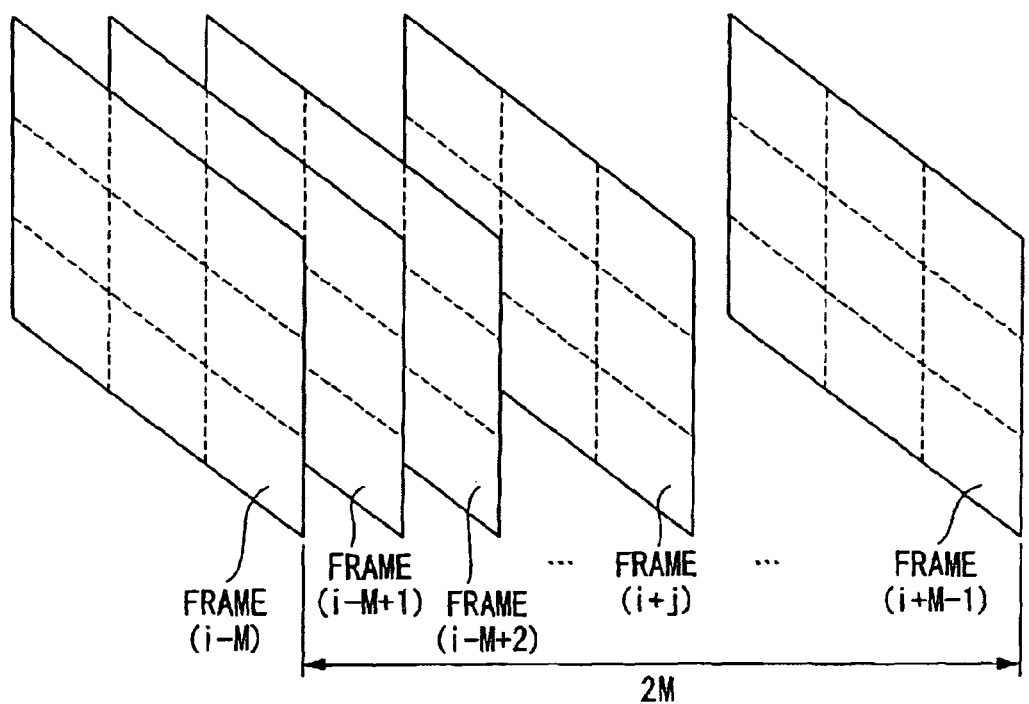
FIG. 19 is a figure for explanation of the relationship between a time window and frames in the signal search system in one embodiment of the present invention.
FIG. 20 is a figure of a sub screen of the signal search system in one embodiment of the present invention.

That is, when setting 2M frames from a frame (i−M) to a frame (i+M−1) as shown in FIG. 19 (i is a frame number of the top frame), in a frame (i+0) among them (hereafter, it can be expressed as "frame i"), as shown in FIG. 20, the frame is divided into n sub-windows. An average value $(x_{i,1}, x_{i,2}, x_{i,3})$ of pixels of each color of RGB in a first sub window of the frame i is calculated, an average value $(x_{i,4}, x_{i,5}, x_{i,6})$ of pixels of each color of RGB in a second sub window is calculated, an average value $(x_{i,7}, x_{i,8}, x_{i,9})$ of pixels of each color of RGB in a third sub window is calculated, and in the following, similarly an average value $(x_{i,(3n-2)}, x_{i(3n-1)}, x_{i,3n})$ of pixels of each color of RGB in a n-th sub window is calculated. A first suffix is a serial number assigned to the frames, and a second suffix is the number of elements in the frame.

In the explanation above, each element has an R value, a G value and a B value, however, it is appropriate that each element has one of them.

Therefore, for example, in a case of n=9, a number of (3×9=27) values are calculated with respect to each frame, and a multidimensional vector having 27 dimensions calculated in such a manner is extracted and is the stored feature (step W2). Such multidimensional vectors are called local area primary color features. In this example, the above-described $x_{i,1}$ and the like are elements of the local area primary color features.

Moreover, extraction methods of the stored feature include a MPEG (Moving Picture Coding Experts Group) encoding method (including movement compensation, DCT (Discrete Cosine Transform) and variable length coding) and a method using an amplitude component of Fourier transform that is a compression technology for moving digital pictures.

In FIG. 15, the stored feature normalization portion 54 reads the stored feature from the stored feature calculation portion 52, and calculates an average value and a standard deviation of a predetermined and fixed division in respect to each element of the feature vector of this stored feature.

For example, when using the image signal, the stored feature normalization portion 54 calculates an average value and a standard deviation from a value of a certain time division per each color of RGB in each area, and normalizes using the calculated average value and standard deviation. A k-th element of a local area primary color feature $y_{i,k}$ after normalization by the stored feature normalization portion 54, called a normalized local color feature, is shown as formula (51).

$$y_{i,k} = \frac{1}{\sigma_{i,k}}(x_{i,k} - m_{i,k}) \quad (51)$$

$$m_{i,k} = \frac{1}{2M}\sum_{j=-M}^{M-1} x_{(i+j),k} \quad (52)$$

$$\sigma_{i,k}^2 = \frac{1}{2M}\sum_{j=-M}^{M-1} (x_{(i+j),k} - m_{i,k})^2 \quad (53)$$

It should be noted that in the formula 52, $x_{(i+j),k}$ is a k-th element of the local area feature of the (i+j)th frame when serial numbers are appended to all frames. "j" is a relative number to a center frame in the frames of a predetermined time period, j is an integer and satisfies $-M \leq j \leq M-1$ when 2M frames are included in the predetermined time period. "i" is a serial number of the center frame of the frames in the predetermined time period, and is the same as the serial number when j=0. "$m_{ik}$" is an average value of $x_{(i+j),k}$ which satisfies $-M \leq j \leq M-1$. "$\sigma_{ik}$" is a standard deviation in respect to $x_{(i+j),k}$ which satisfies $-M \leq j \leq M-1$ in formula (53).

A time series array of the multidimensional vectors calculated in accordance with the formulas (51)-(53), which is a multidimensional vector generated by preparing multidimensional vectors generated from the elements of the frames ordered in ascending order of k, and by ordering them in an ascending order of the frame numbers, is the stored normalized feature (step W3).

Next, the stored feature area selection portion 56 reads and inputs the stored feature from the stored feature calculation portion 52 and the stored normalized feature from the stored feature normalization portion 54, and calculates standard deviation $\sigma_{i,k}$ for each of the elements of the multidimensional vector of the stored feature at a fixed segment of each element using the formulas (52) and (53). The same can be achieved by reading the stored normalized feature and the standard deviation from the stored feature normalization portion 54 to the stored feature area selection portion 56. Because the standard deviation calculated by the stored feature normalization portion 54 and the deviation calculated based on the stored feature calculated by the stored feature calculation portion 52 are the same value.

The stored feature area selection portion 56, as shown in formula (54) below, multiplies the standard deviation $\sigma_{i,k}$ to each element $y_{i,k}$ and calculates an absolute value of it.

$$z_{i,k} = |y_{i,k} \cdot \sigma_{i,k}| \quad (54)$$

The stored feature area selection portion 56, from the statistics zi, k that are multiplication results between the calculated element and the standard deviation, selects multiple, for example 2, vectors from the top in respect to each element per fixed segment (step W4).

The stored feature nonlinear quantization portion 58, applying the Voronoi tessellation upon each element of the multidimensional vector of the stored area selection feature, operates a nonlinear quantization calculation based on a distance calculated from the feature vector and the Voronoi boundary surface (step W5).

Figure 21:
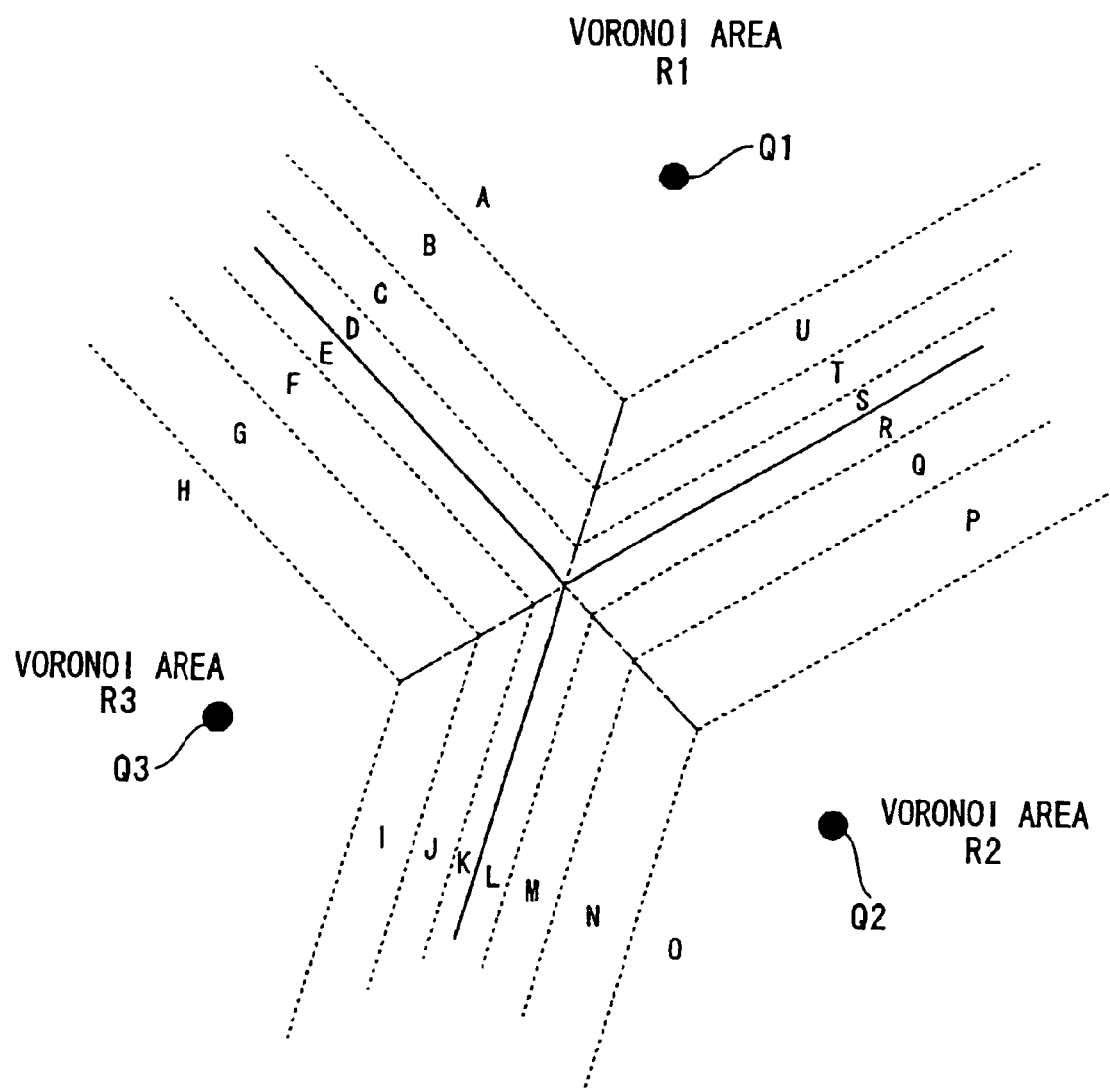
FIG. 21 is a figure for explanation of nonlinear-quantization in one embodiment of the present invention.

Referring to FIG. 21, Voronoi tessellation is explained. FIG. 21 shows a Voronoi boundary for a two-dimensional feature vector and a nonlinear quantization of its distance. In FIG. 21, Q1, Q2 and Q3 are generatrices in Voronoi areas. Using a well-known vector quantization method, these generatrices are determined beforehand by giving a learning signal. Voronoi areas R1, R2 and R3 are set by enclosing the generatrices Q1, Q2 and Q3 with a Voronoi polyhedron.

It is detected in which Voronoi areas R1, R2 and R3 the feature vector belongs to. The closest Voronoi boundary is selected from the Voronoi boundaries (shown as solid lines) neighboring the area. Using a nonlinear function f(x) upon a distance x from the selected Voronoi boundary, the quantization is operated by assigning a sign respectively per value of x corresponding to a predetermined value with respect to f(x). In FIG. 21, broken lines are nonlinear parting lines, and dashed lines are hyperplanes dividing an area between two Voronoi boundaries. As the nonlinear function, for example, a sigmoid function below can be used.

$$f(x) = \frac{1}{1+\exp(-x)} \quad (55)$$

For example, as shown in FIG. 21, distances from the Voronoi boundaries are nonlinearly divided and symbols A-U are assigned. In this operation, a sign length is determined in order to avoid assigning the same signs to all the tessellated areas in the divided Voronoi area.

It is appropriate to apply a sectional linear function as the nonlinear function.

$$f(x) = \begin{cases} \dfrac{x}{0.2} & (0 \leq x < 0.2) \\ \dfrac{x-0.2}{0.3}+1.0 & (0.2 \leq x < 0.5) \\ \dfrac{x-0.5}{0.5}+2.0 & (0.5 \leq x < 1.0) \\ x+2.0 & (1.0 \leq x) \end{cases} \quad (56)$$

It is appropriate to operate scalar quantization upon each element when the feature vector is quantized. It is appropriate to apply a quantization method of collecting some of the elements as a vector.

The stored feature nonlinear quantization portion 58 operates procedures of sending the calculated stored nonlinear quantized feature in accordance with the nonlinear quantization calculation above directly to the feature comparison portion 59 or of registering it at the stored nonlinear quantization feature database 510 once.

In a case where the feature comparison portion 59 compares the stored nonlinear quantized feature and the target nonlinear quantized feature in real time, the stored feature nonlinear quantization portion 58 outputs the stored nonlinear quantized feature of the inputted stored signal. In a case where data of the stored signal is registered at the stored nonlinear quantization feature database 510, the stored feature nonlinear quantization portion 58, without sending the stored nonlinear quantized feature to the feature comparison portion 59, registers it at the stored nonlinear quantization feature database 510 making correspondence to, for example, a name of a provider of an advertisement, a program name or a title of a movie.

The target feature calculation portion 51 reads the specified target signal and outputs it (step W6), and operates a feature extraction on the input target signal.

When the sound signal is to be detected, the target feature calculation portion 51, using the amplitude component of the Fourier-transformed sound signals, for example, sampled at 8000 Hz, operates Fourier transformation on a 1-second segment of the sound signals, divides 0-4000 Hz into 32 frequency band segments, and extracts a multidimensional vector with 32 dimensions per 0.1 second as a feature vector that is the target feature and constructed from average power of the amplitude component in each segment (step W7).

When the image signal is to be detected, the target feature calculation portion 51, based on time-series data of the target image, for example, divides one frame of the target image into 3 vertically and horizontally and 9 areas totally, and calculates average values of pixels of RGB colors in the divisions (areas) respectively.

A multidimensional vector having a total of 27 dimensions generated from average values of RGB in 9 areas is extracted as a target feature (step W7). In this case, the feature vector is generated per one frame.

The target feature normalization portion 53 reads the stored feature from the target feature calculation portion 51, and calculates an average value and a standard deviation of a predetermined and fixed division in respect to each element of the feature vector of this target feature.

In other words, the target feature normalization portion 53, as with the stored feature normalization portion 54, obtains a time series array of the multidimensional vectors (ordered by k) is the target normalized feature (step W8) calculated in accordance with the formulas (51)-(53).

Next, the target feature area selection portion 55 reads and inputs the target feature from the target feature calculation portion 51 and the target normalized feature from the target feature normalization portion 53, as with the stored feature area selection portion 56, calculates standard deviation $\sigma_{i,k}$ at a fixed segment of the target feature, multiplies them per each elements and obtains the multiplication results as the statistics. The same can be achieved by reading the target normalized feature and the standard deviation from the target feature normalization portion 53 to the target feature area selection portion 55. Because the standard deviation calculated by the target feature normalization portion 53 and the deviation calculated based on the target feature calculated by the target feature calculation portion 51 are the same value.

The target feature area selection portion 55, from the statistics $z_{i,k}$ that are multiplication results between the calculated element and the standard deviation, selects multiple, for example 2, vectors from the top in respect to each element per the fixed segment (step W9).

The target feature nonlinear quantization portion 57, applying the Voronoi tessellation upon each element of the multidimensional vector of the target area selection feature, operates a nonlinear quantization calculation based on a distance calculated from the feature vector and the Voronoi boundary surface. The target nonlinear quantized feature calculated in accordance with the nonlinear quantization calculation above is output to the feature comparison portion 59 (step W10).

Next, the feature comparison portion 59 reads the target nonlinear quantized feature and the stored nonlinear quantized features calculated by the target nonlinear feature quantization portion 57 and the stored nonlinear feature quantization portion 58 respectively. The feature comparison portion 59 inputs the target signal and the stored signal simultaneously, except for determining the similarity in real time, and reads the stored nonlinear quantized features for comparison from the stored nonlinear quantized feature data base 510 one by one.

In this case, the feature comparison portion 59, in respect to the stored nonlinear quantized feature, sets an array of the target vector having the same length as the target nonlinear quantized feature given by the target nonlinear feature quantization portion 57 as the comparison segment.

The feature comparison portion 59 calculates the degree of similarity between the target nonlinear quantized feature and the comparison segment above. The feature comparison portion 59 calculates the Hamming distance between both feature vectors as the degree of similarity (step W11).

The feature comparison portion 59 extracts multiple elements from the array of the feature vectors of the target nonlinear quantized feature and obtains them as the feature vector. For example, if the target nonlinear quantized feature has 15 seconds length, then the feature comparison portion 59 extracts 150 feature vectors at intervals of 0.1 second as the elements of the array from the array of the feature vectors of this target nonlinear quantized feature. Because the frequency bands are divided into 32 at each sampling, the target vector having 4800 (150×32) dimensions generated from them is applied for comparison used at the feature comparison portion 59.

As with the target vector described above, the feature comparison portion 59 sets comparison segments applying 15 seconds as one unit from the top of data in the stored nonlinear quantized feature, extracts 150 feature vectors in all at intervals of 0.1 second from the array of the feature vectors, because the frequency bands are divided into 32 at each sampling, and applies a multidimensional vector having 150× 32=4800 dimensions generated from these vectors as the stored vector for comparison at the feature comparison portion 59.

If the feature comparison portion 59 has the target vector by extracting the elements of multiple parts from the array of the feature vector of the target nonlinear quantized feature, it can be appropriate that the target nonlinear feature quantization portion 57 extracts the feature vector as an element of the array from the area selection feature, that is, the target nonlinear feature quantization portion 57 extracts 150 parts in all with 0.1 second intervals, operates the nonlinear quantization, and outputs as the target vector to the feature comparison portion 59.

If a search threshold for the Hamming distance is given, the feature comparison portion 59 compares this search threshold and the Hamming distance of the selected comparison segment (step W12) and obtains a search result.

In step W12, the Hamming distance between the target nonlinear quantized feature and the stored nonlinear quantized feature above is calculated along with shifting the comparison segment gradually from the top of the stored area selection feature. After operating the comparison procedure up to the end, if the areas of the stored area selection features having the Hamming distance at each comparison segment lower than the predetermined search threshold are detected, then this comparison segment is output as the search result (step W13).

As described above, in the embodiment of the present invention, the stored feature and the target feature, made from the multidimensional vectors, are calculated from the stored image signal and the target image signal, the multidimensional vector is normalized, the elements are selected, the stored nonlinear quantized feature and the target nonlinear quantized feature are calculated by quantizing, and these stored nonlinear quantized feature and the target nonlinear quantized feature are compared by applying the Hamming distance.

Figure 22:
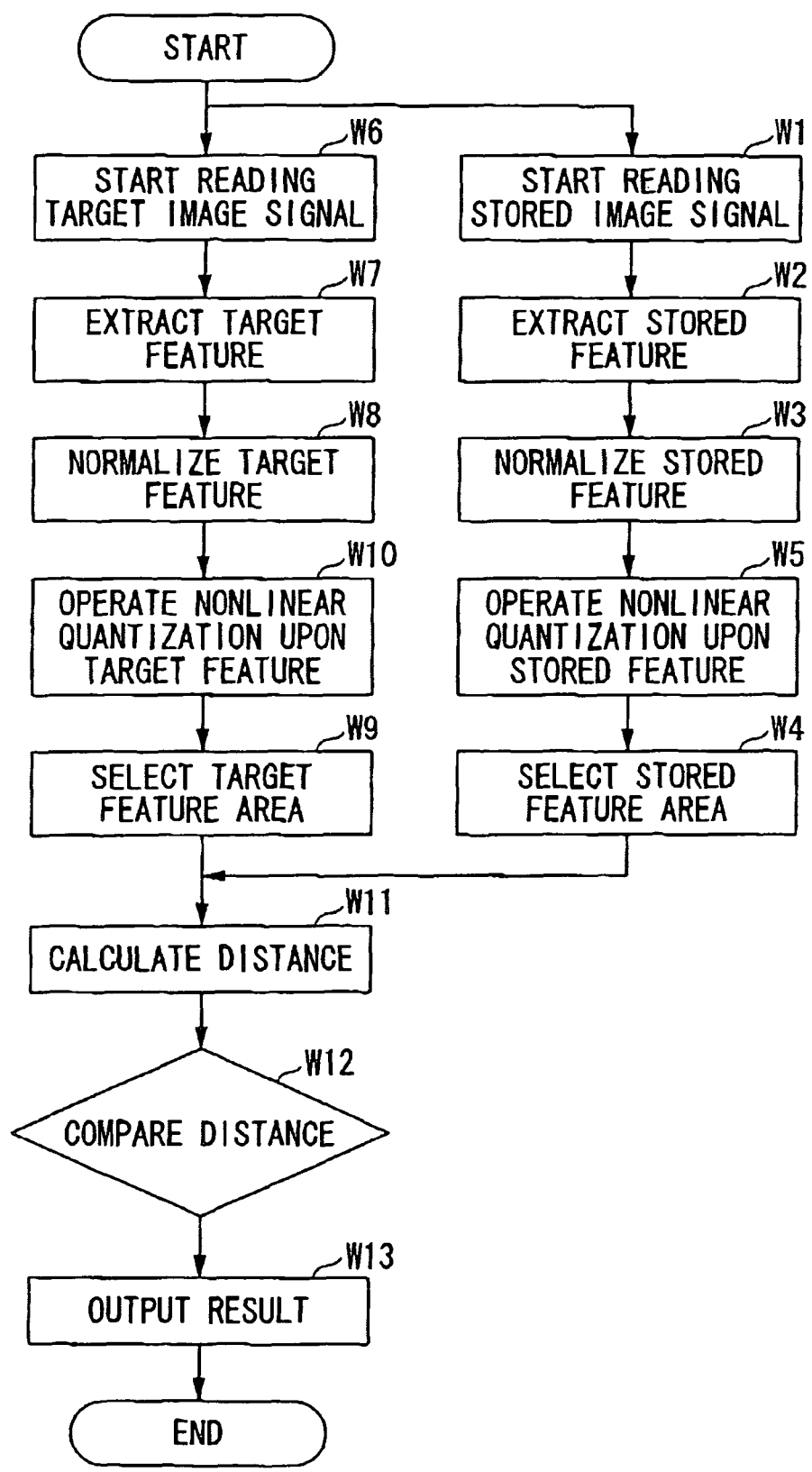
FIG. 22 is a flowchart showing another example of operation of the signal search system shown in FIG. 11.

In the example above, after selecting areas, the nonlinear quantization is operated, however, as shown in FIG. 22, it is appropriate to select areas (steps W4 and W9) after operating the nonlinear quantization (steps W5 and W10).

It is possible to determine a time span with respect to the comparison segment (time window or number of frames) used at the feature comparison portion 59 independently from the time span used at the stored feature area selection portion 56 or the target feature area selection portion 55 or the time span used at the stored feature normalization portion 54 or the target feature normalization portion 53, that is, the same time span does not need to be used.

It can be appropriate that if a search threshold for the Hamming distance is given, the feature comparison portion 59 compares this search threshold and the Hamming distance of the selected comparison segment and outputs only the area of the comparison segments lower than the search threshold as a search result.

It is possible that if the multiple comparison segments have Hamming distances lower than the search threshold, then the feature comparison portion 59 outputs the highest L (from the bottom) comparison segments in respect to the Hamming distance.

It is appropriate that if no comparison segment is lower than the search threshold, then the feature comparison portion 59 notifies the information indicating no such area, reads new stored nonlinear quantized features of the stored signal from the stored nonlinear quantized feature data base 510, and operates search procedures after step W10 continuously until the stored nonlinear quantized feature including the comparison segment lower than the search threshold above is detected.

It is appropriate to install the target feature calculation portion 51, the target feature normalization portion 53, the target feature area selection portion 55 and the target nonlinear quantization portion 57 in FIG. 15 into user terminals (for example, personal computers) of all users beforehand, and to provide the signal detection server including the stored feature calculation portion 52, the stored feature normalization portion 54, the stored feature area selection portion 56, the stored nonlinear feature quantization portion 58, the feature comparison portion 59 and the stored nonlinear quantized feature data base 510 at a service provider who operates the distribution.

The structure can be designed such that the target nonlinear quantized features are generated from the signals as the target signals which the user receives with their cellular phones and the like, these target nonlinear quantized features are sent to the signal detection server above via the Internet and the like, and it is requested to search for the stored signals similar to these target nonlinear quantized features. In this case, the same regulations, such as the length of the array of the feature vectors of the fixed segment for calculating the stored nonlinear quantized features and the target nonlinear quantized features, are applied to both the signal detection server and the terminals beforehand.

Next, an embodiment is described of a case in which the signal detection system above is applied. The search system of the present invention, using piecemeal signals including noise or distortions recorded in the real world, can be applied to search signals that match or have similarity and operate an information search.

For example, the user receives music played as a BGM (Back Ground Music) in a cafe or music or an image of a CM on a big screen on a street with the cellular phone and transmits it to a signal search service. It is possible to have a configuration such that a signal search service provider searches for information similar to or the same as this signal from a data base, and provides related information (for example, a name of the music, a name of a player, a program, a product, concert information, homepages and the like) to the user requiring a fee or for free.

In a case of searching of the image signals, upon inputting the image signals, it is preferable that the image to be searched for is recorded by setting a finder or a screen of a terminal with a video camera having a sound recording function to a frame of the image to be recorded (the target image signal), or by specifying a range in moving image frames of recorded images in accordance with a menu operation or a manual trace using a pen-based input and the like.

When the search system of the embodiments above is constructed practically, it is appropriate that computer programs for realizing functions of the systems are recorded in a computer-readable medium, and the signal detection operation or the stored signal storing operation into the data base are operated by a computer system reading the programs in the medium and executing them. "Computer system" here includes the OS (Operating System) and the hardware such as peripheral equipment. "Computer system" includes WWW (World Wide Web) system having a homepage provision environment (or display environment). "Computer readable medium" is a portable medium such as a flexible disc, a magneto-optical disc, a ROM (Read Only Memory), a CD-ROM (Compact Disc Read Only Memory) and the like, or a storage apparatus such as a hard disc installed in the computer. Moreover, "computer readable medium" includes a volatile memory inside the computer systems used for a server or a client to which the programs are transmitted via network like the Internet or a communication line like a telephone line, which saves the programs for a certain time period.

The program above can be transmitted from the computer storing this program in the storage apparatus or the like via a transmission medium or via transmission waves in the transmission medium to another computer system "Transmission medium" transmitting the program is a medium such as a network (communication network) like the Internet or a communication line (line) like a telephone line that has a function to transmit information. It can be appropriate for the above program to be a program for realizing a part of the above-described functions. Moreover, it can be appropriate for the program to be a so-called a difference file (difference program) which realizes the above functions by being combined with a program already stored in the computer.

In the embodiments above, as a capture device used by a user in order to capture music, it is appropriate for, for example, a microphone provided to a mobile terminal such as a cellular phone, an IC recorder and the like, or a line input from a TV, a radio and the like to be used A method for providing a service to users in the first embodiment above, for example, provides the following operation steps.

First, a sound captured by a cellular phone operated by a user is transmitted via a voice communication of the cellular phone. Next, on a receiving side, a feature extraction operation is operated upon data of the sound received from the cellular phone, and searching is operated based on the extraction result. On the receiving side, list information of search results is generated and the list information is transmitted to the cellular phone.

The cellular phone receives the list information and displays it on its display portion. The user recognizes the display portion of the cellular phone and requests the cellular phone for downloading of music and the like. It is appropriate that the following operations be the same as downloading of the music in conventional operations.

It is appropriate for the user to use a personal computer instead of the cellular phone in the above method of providing services. In this case, the feature of the sound can be extracted on the personal computer, and it is appropriate that the extracted feature be transmitted via the Internet and the search be operated at the receiving side.

It is appropriate that in the above method of providing services, the feature of the sound be extracted on the cellular phone and the search be operated at the receiving side after transmitting the extraction results of the features via a method such as a packet transmission like i mode (registered trade mark), a dialup communication or a wireless LAN (Local Area Network).

It is appropriate that in the above method of providing services, the sound be filed and the feature extraction and the search be operated at the receiving side after transmitting it via the Internet using HTTP (Hyper Text Transport Protocol), SMTP (Simple Mail Transfer Protocol) and the like.

In the embodiments above, as a capture device used by a user in order to capture images, it is appropriate that, for example, a camera provided to a mobile terminal, a digital camera, a web camera connected to a personal computer or an image input from a TV, a radio and the like be used.

A method for providing a service to users in the third embodiment above, for example, provides the following operation steps.

First, an image captured by a cellular phone with its TV phone function is transmitted in accordance with a request from a user. Next, on a receiving side, a feature extraction operation is operated upon data of the image received from the cellular phone, and searching is operated based on the extraction result. On the receiving side, list information of search results is generated and the list information is transmitted to the cellular phone.

The cellular phone receives the list information and displays it on its display portion. The user recognizes the display portion of the cellular phone and requests the cellular phone for downloading of images and the like. It is appropriate that the following operations can be the same as downloading of the image in conventional operations.

It is appropriate for the user to use a personal computer instead of the cellular phone in the above method of providing services. In this case, the feature of the image can be extracted on the personal computer, and it is appropriate that the extracted feature be transmitted via the internet and the search be operated at the receiving side.

It is appropriate that in the above method of providing services, the feature of the image be extracted on the cellular phone and the search be operated at the receiving side after transmitting the extraction results of the features via a method such as a packet transmission like i mode registered trade mark), a dialup communication or a wireless LAN.

It is appropriate that in the above method of providing services, the image be filed and the feature extraction and the search be operated at the receiving side after transmitting it via the internet using HTTP, SMTP and the like.

In the above method of providing services, it is appropriate that the cellular phone notify the search results by sounds via voice communication and moreover, it notify additional information. In this case, it is appropriate that the search results from the receiving side be transmitted using HTTP or SMTP to the cellular phone, and the cellular phone display the search results in a text form and notify it to the user. It is appropriate that the additional information include the name of artists of the music or the movie, titles, related URL and the like. When the search results are related to CM, it is appropriate that the additional information above include information of a product and the like of the CM. When the search results include abstract information or related information in accordance with the MPEG7, it is appropriate that the cellular phone display the abstract information and the related information.

INDUSTRIAL APPLICABILITY

In accordance with the present invention, after receiving images displayed in the real world, CM and the like with a mobile terminal, by using the received image signal, it is possible that the same image be searched for from a very large image CM data base.

In other words, in accordance with the present invention, after receiving the image signal of CM displayed in the real world, the sound signal of the music and the like with a mobile terminal, by using the received image signal and sound signal (the target signal: the image signal or the sound signal requested to be searched for), it is possible that the same image or music be searched for from a data base storing a huge amount of images or music.

The invention claimed is:

1. A signal detection system that searches for a part of a stored signal similar to a target signal, comprising:
    a stored feature calculation portion that calculates a stored feature from the stored signal;
    a target feature calculation portion that calculates a target feature from the target signal; and
    a feature comparison portion that calculates a degree of similarity using both a vector generated by degenerating the stored feature based on statistics of the stored feature calculated beforehand and a vector generated by degenerating the target feature based on statistics of the target feature calculated beforehand, wherein
    the signal detection system is a sound signal detection system that searches for a part of a stored sound signal that is the stored signal similar to a target sound signal that is the target signal having a shorter or same length as the stored sound signal,
    the stored feature calculation portion that calculates the stored feature from time-series data of the stored sound signal,
    the target feature calculation portion that calculates the target feature from time-series data of the target sound signal,
    the sound signal detection system further comprises:
        a stored feature area selection portion that calculates predetermined statistics from the stored feature, selects an element from the stored features corresponding to the statistics larger than a predetermined threshold, and calculates a stored area selection feature generated from a vector of the selected element; and
        a target feature area selection portion that calculates predetermined statistics from the target feature, selects an element from the target features corresponding to the statistics larger than a predetermined threshold, and calculates a target area selection feature generated from a vector of the selected element, and
    the feature comparison portion sets a comparison segment in the stored area selection feature, calculates a degree of similarity between the target area selection feature and the comparison segment of the stored area selection feature, repeats calculating while shifting the comparison segment one by one in the stored area selection feature, and searches for an area of the stored area selection feature similar to the target area selection feature.

2. The sound signal detection system according to claim 1, wherein:
    the target feature area selection portion and the stored feature area selection portion, in order to obtain the statistics upon searching for an area, calculate average values of the elements respectively from neighboring feature vectors as the statistics upon selecting the area, select a area with a feature based on values calculated by subtracting the averages value from the elements respectively, and calculate an area selection feature made from a vector having values of the elements of the selected area.

3. The sound signal detection system according to claim 2 wherein:
    the target feature area selection portion and the stored feature area selection portion calculate average values of the elements respectively from the neighboring feature vectors as the statistics upon selecting the area, select a point if an absolute value of a value by subtracting the average value from the element is larger than a predetermined threshold, and use an area selection feature generated from the value of the element of the selected point.

4. The sound signal detection system according to claim 2, wherein:
    the target feature area selection portion and the stored feature area selection portion calculate average values of the elements respectively from the neighboring feature vectors as the statistics upon selecting the area, select one or a plurality of the elements from top with respect to absolute values of values by subtracting the average values from the elements, and use an area selection feature generated from vectors of the selected elements.

5. The sound signal detection system according to claim 1, further comprising:
    a stored feature normalization portion that calculates predetermined statistics from the stored feature and other stored features neighboring the stored features at a sampling time, normalizes elements respectively in the vector of the stored feature, and calculates a stored normalized feature generated from a vector having elements of numbers calculated by normalizing; and
    a target feature normalization portion that calculates predetermined statistics from the target feature and other target features neighboring the target features at a sampling time, normalizes elements respectively in the vector of the target feature, and calculates a target normalized feature generated from a vector having elements of numbers calculated by normalizing.

6. The sound signal detection system according to claim 1, further comprising:
   a user terminal that requests a search for the stored signal similar to the target sound signal; and
   a signal detection server that searches for a part of the stored sound signal similar to the target sound signal having the shorter or same length as the stored sound signal, wherein:
   the user terminal includes the target feature calculation portion and the target feature area selection portion; and
   the signal detection server includes the stored feature calculation portion, the stored feature area selection portion and the feature comparison portion.

7. A signal detection server that searches for a part of a stored signal similar to a target signal input from a user terminal, comprising:
   a user signal input portion that receives a target feature of the target signal from the user terminal;
   a stored feature calculation portion that calculates a stored feature from the stored signal; and
   a feature comparison portion that calculates a degree of similarity using both a vector generated by degenerating the stored feature based on statistics of the stored feature calculated beforehand and a vector generated by degenerating the target feature based on statistics of the target feature calculated beforehand, wherein
   the signal detection server is a sound signal detection server that searches for a part of a stored sound signal that is the stored signal similar to a target sound signal that is the target signal input from the user terminal having a shorter or same length as the stored sound signal,
   the user signal input portion of the user terminal comprises:
      a target feature calculation portion that calculates a target feature generated from a feature vector from time-series data of the target sound signal; and
      a target feature area selection portion that calculates predetermined statistics from the target feature, selects an element from the target features corresponding to the statistics larger than a predetermined threshold, and calculates a target area selection feature that is the target feature generated from a vector of the selected element,
   the stored feature calculation portion that calculates the stored feature generated from a feature vector from time-series data of the stored sound signal,
   the sound signal detection server further comprises a stored feature area selection portion that calculates predetermined statistics from the stored feature, selects an element from the stored features corresponding to the statistics larger than a predetermined threshold, and calculates a stored area selection feature generated from a vector of the selected element, and
   the feature comparison portion that sets a comparison segment in the stored area selection feature, calculates a degree of similarity between the target area selection feature and the comparison segment of the stored area selection feature, repeats calculating while shifting the comparison segment one by one in the stored area selection feature, and searches for an area of the stored area selection feature similar to the target area selection feature.

8. A signal detection method that searches for a part of a stored signal similar to a target signal, comprising steps of:
   a target feature calculation step that calculates a target feature from the target signal;
   a target statistics calculation step that calculates target statistics from the target feature; and
   a feature comparison step that calculates a degree of similarity using both a vector generated by degenerating a stored feature based on statistics of the stored feature calculated beforehand and a vector generated by degenerating the target feature based on the target statistics, wherein
   the signal detection method is a sound signal detection method that searches for a part of a stored sound signal that is the stored signal similar to a target sound signal that is the target signal input from the user terminal having shorter or same length as the stored sound signal,
   the stored feature calculation step that calculates the stored feature generated from a feature vector from time-series data of the stored sound signal,
   the target feature calculation step that calculates a target feature generated from a feature vector from time-series data of the target sound signal,
   the signal detection method further comprises:
      a stored feature area selection step that calculates predetermined statistics from the stored feature, selects an element from the stored features corresponding to the statistics larger than a predetermined threshold, and calculates a stored area selection feature generated from a vector of the selected element; and
      a target feature area selection step that calculates predetermined statistics from the target feature, selects an element from the target features corresponding to the statistics larger than a predetermined threshold, and calculates a target area selection feature that is the target feature generated from a vector of the selected element, and
   the feature comparison step that sets a comparison segment in the stored area selection feature, calculates a degree of similarity between the target area selection feature and the comparison segment of the stored area selection feature, repeats calculating while shifting the comparison segment one by one in the stored area selection feature, and searches for an area of the stored area selection feature similar to the target area selection feature.

9. A signal detection system that searches for a part of a stored signal similar to a target signal, comprising:
   a stored feature calculation portion that calculates a stored feature from the stored signal;
   a target feature calculation portion that calculates a target feature from the target signal; and
   a feature comparison portion that calculates a degree of similarity using both a vector generated by degenerating the stored feature based on statistics of the stored feature calculated beforehand and a vector generated by degenerating the target feature based on statistics of the target feature calculated beforehand, wherein
   the signal detection system is a sound signal detection system that searches for a part of a stored sound signal that is the stored signal similar to a target sound signal that is the target signal having shorter or same length as the stored sound signal,
   the stored feature calculation portion calculates the stored feature from time-series data of the stored sound signal,
   the target feature calculation portion calculates the target feature from time-series data of the target sound signal,
   the sound signal detection system further comprises:
      a stored feature normalization portion that calculates predetermined statistics from the stored feature, normalizes the statistics per the elements of the vector of the stored feature and calculates a stored area selection feature generated from a vector including elements of the normalized values;

a target feature normalization portion that calculates predetermined statistics from the target feature, normalizes the statistics per the elements of the vector of the target feature and calculates a target area selection feature generated from a vector including elements of the normalized values;

a stored feature quantization portion that calculates a stored quantized feature generated from elements calculated by quantizing the stored normalized feature; and a target feature quantization portion that calculates a target quantized feature generated from elements calculated by quantizing the target normalized feature, and the feature comparison portion sets a comparison segment in the stored quantized feature, calculates a degree of similarity between the target quantized feature and the comparison segment of the stored quantized feature, repeats calculating while shifting the comparison segment one by one in the stored quantized feature, and searches for an area of the stored quantized feature similar to the target quantized feature.

10. The sound signal detection system according to claim 9, wherein:

the feature vector is a vector including an element of a strength information per frequency sampled in a predetermined span; and the statistics are an average value and a dispersion of the feature vector in the comparison segment.

11. The sound signal detection system according to claim 9, wherein:

the target feature quantization portion and the stored feature quantization portion apply a binary vector calculated by operating scalar quantization upon the elements of the normalized features using a predetermined threshold, as the quantized features.

12. The sound signal detection system according to claim 9, wherein:

the target feature quantization portion and the stored feature quantization portion apply a vector including signs as elements calculated by operating vector quantization upon the plurality of elements of the vector of the normalized features, as the quantized features.

13. The sound signal detection system according to claim 9, further comprising:

a user terminal that requests a search of the stored signal similar to the target sound signal; and a signal detection server that searches for a part of the stored sound signal similar to the target sound signal having a shorter or same length as the stored sound signal, wherein:

the user terminal includes the target feature calculation portion, the target feature normalization portion and the target feature quantization portion; and the signal detection server includes the stored feature calculation portion, the stored feature normalization portion, the stored feature quantization portion and the feature comparison portion.

14. A signal detection server that searches for a part of a stored signal similar to a target signal input from a user terminal, comprising:

a user signal input portion that receives a target feature of the target signal from the user terminal;

a stored feature calculation portion that calculates a stored feature from the stored signal; and a feature comparison portion that calculates a degree of similarity using both a vector generated by degenerating the stored feature based on statistics of the stored feature calculated beforehand and a vector generated by degenerating the target feature based on statistics of the target feature calculated beforehand, wherein the signal detection server is a sound signal detection server that searches for a part of a stored sound signal that is the stored signal similar to a target sound signal that is the target signal input from the user terminal having a shorter or same length as the stored sound signal, the user terminal comprises:

a target feature calculation portion that calculates a target feature generated from a feature vector from time-series data of the target signal that is a target sound signal;

a target feature normalization portion that calculates predetermined statistics from the target feature, normalizes the statistics per the elements of the vector of the target feature and calculates a target area selection feature generated from a vector including elements of the normalized values; and a target feature quantization portion that calculates a target quantized feature generated from elements calculated by quantizing the target normalized feature, the stored feature calculation portion calculates the stored feature from time-series data of the stored sound signal, the sound signal detection server further comprises:

a stored feature normalization portion that calculates predetermined statistics from the stored feature, normalizes the statistics per the elements of the vector of the stored feature and calculates a stored area selection feature generated from a vector including elements of the normalized values; and a stored feature quantization portion that calculates a stored quantized feature generated from elements calculated by quantizing the stored normalized feature, and the feature comparison portion sets a comparison segment in the stored quantized feature, calculates a degree of similarity between the target quantized feature and the comparison segment of the stored quantized feature, repeats calculating while shifting the comparison segment one by one in the stored quantized feature, and searches for an area of the stored quantized feature similar to the target quantized feature.

15. A signal detection method that searches for a part of a stored signal similar to a target signal, comprising steps of:

a target feature calculation step that calculates a target feature from the target signal;

a target statistics calculation step that calculates target statistics from the target feature; and a feature comparison step that calculates a degree of similarity using both a vector generated by degenerating a stored feature based on statistics of the stored feature calculated beforehand and a vector generated by degenerating the target feature based on the target statistics, wherein the signal detection method is a sound signal detection method that searches for a part of a stored sound signal that is the stored signal similar to a target sound signal that is the target signal input from the user terminal having shorter or same length as the stored sound signal, the stored feature calculation step calculates the stored feature from time-series data of the stored sound signal, the target feature calculation step calculates the target feature from time-series data of the target sound signal, the sound signal detection method further comprises:

a stored feature normalization step that calculates predetermined statistics from the stored feature and other stored features neighboring the stored features at a sampling time, normalizes elements respectively in the vector of the stored feature, and calculates a stored normalized feature generated from a vector having elements of numbers calculated by normalizing;

a target feature normalization step that calculates predetermined statistics from the target feature and other target features neighboring the target features at a sampling time, normalizing elements respectively in the vector of the target feature, and calculates a target normalized feature generated from a vector having elements of numbers calculated by normalizing;

a stored feature quantization step that calculates a stored quantized feature generated from elements calculated by quantizing the stored normalized feature; and a target feature quantization step that calculating a target quantized feature generated from elements calculated by quantizing the target normalized feature, and the feature comparison step setting a comparison segment in the stored quantized feature, calculating a degree of similarity between the target quantized feature and the comparison segment of the stored quantized feature, repeating calculating while shifting the comparison segment one by one in the stored quantized feature, and searching for an area of the stored quantized feature similar to the target quantized feature.

16. A signal detection apparatus that searches for a part of a stored signal similar to a target signal, comprising:

a target feature calculation unit that calculates a target feature from the target signal;

a target statistics calculation unit that calculates target statistics from the target feature;

a stored statistics calculation unit that calculates stored statistics from a stored feature based on the stored signal;

a feature comparison unit that calculates a degree of similarity using both a vector generated by degenerating the stored feature based on the stored statistics and a vector generated by degenerating the target feature based on the target statistics;

a target feature normalization unit that calculates a target normalized feature using the target statistics and the target feature;

a target area selection nonlinear quantization unit that inputs the element of the target normalized feature, calculates an element of a selected target nonlinear quantized feature, and generates a target vector;

a stored feature normalization unit that calculates a stored normalized feature using the stored statistics and the stored feature; and a stored area selection nonlinear quantization unit that inputs the stored normalized feature, calculates an element of a selected stored nonlinear quantized feature and generates a stored vector, wherein the feature comparison unit sets a comparison segment in the stored vector, calculates a degree of similarity between the elements of the stored vector in the comparison segment and at least a portion of the elements of the target vector, and repeats calculating the degree of similarity while shifting the comparison segment one by one.

17. The signal search apparatus according to claim 16, wherein the target area selection nonlinear quantization unit and the stored area selection nonlinear quantization unit operate Voronoi tessellation upon a multi dimensional vector, and operate nonlinear quantization upon a distance from a Voronoi boundary surface to which the multidimensional vector belongs.

18. The signal search apparatus according to claim 16, wherein the target area selection nonlinear quantization unit comprises:

a target feature area selection unit that selects elements corresponding to statistics larger than a predetermined threshold and calculates a target area selection feature generated from a vector including the elements; and a target feature nonlinear quantization unit that operates nonlinear quantization upon a feature vector.

19. The signal search apparatus according to claim 16, wherein the stored area selection nonlinear quantization unit comprises:

a stored feature area selection unit that selects elements corresponding to statistics larger than a predetermined threshold and calculates a stored area selection feature generated from a vector including the elements; and a stored feature nonlinear quantization unit that operates nonlinear quantization upon a feature vector.

20. A signal detection method that searches for a part of a stored signal similar to a target signal, comprising steps of:

a target feature calculation step that calculates a target feature from the target signal;

a target statistics calculation step that calculates target statistics from the target feature;

a feature comparison step that calculates a degree of similarity using both a vector generated by degenerating a stored feature based on statistics of the stored feature calculated beforehand and a vector generated by degenerating the target feature based on the target statistics;

a target feature normalization step that calculates a target normalized feature using the target statistics and the target feature;

a target area selection nonlinear quantization step that inputs the element of the target normalized feature, calculates an element of a selected target nonlinear quantized feature, and generates a target vector;

a stored statistics calculation step that calculates stored statistics from the stored feature;

a stored feature normalization step that calculates a stored normalized feature using the stored statistics and the stored feature; and a stored area selection nonlinear quantization step that inputs the stored normalized feature, calculates an element of a selected stored nonlinear quantized feature and generates a stored vector, wherein the feature comparison step that sets a comparison segment in the stored vector, and calculates a degree of similarity between the elements of the stored vector in the comparison segment and at least a portion of the elements of the target vector.

21. A computer program product stored on a computer readable medium of a signal search apparatus which searches for a part of a stored signal similar to a target signal, comprising:

target feature calculation instructions for calculating a target feature from the target signal;

target statistics calculation instructions for calculating target statistics from the target feature;

stored statistics calculation instructions for calculating stored statistics from a stored feature based on the stored signal;

feature comparison instructions for calculating a degree of similarity by using both a vector generated by degenerating the stored feature based on the stored statistics and a vector generated by degenerating the target feature based on the target statistics;

target feature normalization instructions for calculating a target normalized feature by using the target statistics and the target feature;

target area selection nonlinear quantization instructions for inputting the element of the target normalized feature, calculating an element of a selected target nonlinear quantized feature and generating a target vector;

stored feature normalization instructions for calculating a stored normalized feature by using the stored statistics and the stored feature; and stored are selection nonlinear quantization instructions for inputting the stored normalized feature, calculating an element of a selected stored nonlinear quantized feature and generating a stored vector, wherein the feature comparison instructions set a comparison segment in the stored vector, calculate a degree of similarity between the elements of the stored vector in the comparison segment and at least a portion of the elements of the target vector, and repeat calculating the degree of similarity while shifting the comparison segment one by one.

* * * * *